(12) United States Patent
Simonyi

(10) Patent No.: US 6,189,143 B1
(45) Date of Patent: *Feb. 13, 2001

(54) METHOD AND SYSTEM FOR REDUCING AN INTENTIONAL PROGRAM TREE REPRESENTED BY HIGH-LEVEL COMPUTATIONAL CONSTRUCTS

(75) Inventor: Charles Simonyi, Medina, WA (US)

(73) Assignee: Microsoft Corporation, Redmond, WA (US)

( * ) Notice: Under 35 U.S.C. 154(b), the term of this patent shall be extended for 0 days.

This patent is subject to a terminal disclaimer.

(21) Appl. No.: 08/884,441

(22) Filed: Jun. 27, 1997

Related U.S. Application Data

(60) Division of application No. 08/431,049, filed on Apr. 28, 1995, which is a continuation-in-part of application No. 08/145,689, filed on Oct. 29, 1993, now abandoned.

(51) Int. Cl.[7] .................................................... G06F 9/445

(52) U.S. Cl. ........................ 717/7; 717/4; 717/5; 717/6; 717/8; 717/9

(58) Field of Search ................................... 395/706, 707, 395/708; 717/1, 2, 3, 4, 5, 6, 7, 8, 9, 10, 11

(56) References Cited

U.S. PATENT DOCUMENTS

| 4,782,444 | 11/1988 | Munshi et al. | 364/300 |
|---|---|---|---|
| 4,827,404 | 5/1989 | Barstow et al. | 364/200 |
| 5,148,513 | 9/1992 | Koza et al. | 395/13 |

(List continued on next page.)

FOREIGN PATENT DOCUMENTS

| 0 361 737 | 4/1990 | (EP) | G06F/9/44 |
|---|---|---|---|
| 0 546 794 | 6/1993 | (EP) . | |

OTHER PUBLICATIONS

Hendren et al., "Supporting Array Dependence Testing for an Optimizing C Compiler", in Compiler Construction 5 th International Conference by Fritzson, Springer–Verlag, pp. 309–323, Apr. 4, 1994.*

Aho, Alfred V. et al., *Compilers, Principles, Techniques, and Tools*, Addison–Wesley Publishing Company, Reading, MA, 1988, pp. 6–8, 287–291.

Pintelas, P. et al., "A Comparative Study of Five Language Independent Programming Environments," Journal of Systems and Software, Jan. 1991, USA, vol. 14, No. 1, pp. 3–15.

(List continued on next page.)

*Primary Examiner*—Tariq R. Hafiz
*Assistant Examiner*—Ted T. Vo
(74) *Attorney, Agent, or Firm*—Schwegman, Lundberg, Woessner & Kluth, P.A.

(57) ABSTRACT

A method and system is described for generating executable code for a computer program, A programmer creates an intentional program tree using a syntax-independent editor. The editor allows a programmer to directly manipulate the intentional program tree. The intentional program tree has nodes. Each node represents a high-level computational construct of the computer program. For each node representing a high-level computational construct, the system transforms the node into an implementation of the high-level computational construct using low-level computational constructs. For each node representing a low-level computational construct, the system generates executable code that implements the low-level computational construct. The system further provides that where a high-level computational construct has a plurality of implementations of the high-level computational construct, the system transforms the nodes by selecting one of the implementations and transforms the node in accordance with the selected implementation. The system further provides that the implementation is selected by automatically analyzing semantics of the intentional program tree.

64 Claims, 35 Drawing Sheets

U.S. PATENT DOCUMENTS

| | | | |
|---|---|---|---|
| 5,161,216 | | 11/1992 | Reps et al. ............................ 395/375 |
| 5,175,843 | | 12/1992 | Casavant et al. ..................... 395/500 |
| 5,191,646 | | 3/1993 | Naito et al. ........................... 395/161 |
| 5,327,561 | | 7/1994 | Choi et al. ............................ 395/700 |
| 5,343,554 | | 8/1994 | Koza et al. ............................. 395/13 |
| 5,408,603 | | 4/1995 | Van de Lavoir et al. ........... 395/161 |
| 5,438,331 | | 8/1995 | Gilligan et al. ........................ 341/35 |
| 5,790,863 | * | 8/1998 | Simonyi .................................. 717/7 |
| 5,813,019 | * | 9/1998 | Van De Vanter .................... 707/512 |
| 5,857,212 | | 1/1999 | Van De Vanter .................... 707/519 |
| 5,911,072 | * | 6/1999 | Simonyi .................................. 717/1 |

OTHER PUBLICATIONS

Teitelbaum, T. et al., "The Cornell Program Synthesizer: A Syntax–Directed Programming Environment," Communications of the ACM, Sep. 1981, USA, vol. 24, No. 9, pp. 563–573.

Basset, Paul G., "Frame–Based Software Engineering," *IEEE Software,* Jul. 1987, pp. 9–16.

Feather, Martin S., *A Survey and Classification of some Program Transformation Approaches and Techniques,* Elsevier Science Publishers B. V. (North–Holland), 1987, pp. 165–195.

Garlan, David et al., "A Transformation Approach to Generating Application–Specific Environments," *ACM,* Dec. 1992, pp. 68–77.

"Guidelines for Software Refinery Language Models," Reasoning Systems, Palo Alto, California, May 2, 1991, 29 pages.

Habermann, A. Nico, and David Notkin, "Gandalf: Software Development Environments,"*IEEE Transactions on Software Engineering SE–12*(12):1117–1127, 1986.

Kotik, Gordon B., and Lawrence Z. Markosian, "Automating Software Analysis and Testing Using a Program Transformation System,"*Proc. $14^{th}$ Int'l Comp. Software and Applications Conference,* pp. 1–10, 1990.

Reps, Thomas, and Tim Teitelbaum, "The Synthesizer Generator,"*SIGPLAN Notices 19*(5):42–48, 1984.

Reps, Thomas, and Tim Teitelbaum, "The Synthesizer Generator Reference Manual," 3d ed., Springer–Verlag, N.Y., pp. 1–10, 54–85, 90–111, 1985.

Snelting, G., "Experiences with the PSG—Programming System Generator," Institut fü r Systemarchitektur, Technische Hochschule Darmstadt, 1985, pp. 148–162.

Teitelbaum, Tim. and Thomas Reps, "The Cornell Program Synthesizer: A Syntax–Directed Programming Environment,"*Communication of the ACM 24*(9):563–573, Sep. 1981.

\* cited by examiner-

| Tree Component | Value |
|---|---|
| tcOp | |
| tcOpnd[0] | |
| ... | |
| tcOpnd[w] | |
| tcDni | |
| tcAnnot | |
| tcConst | |

*FIG. 4*

METHOD AND SYSTEM FOR REDUCING AN INTENTIONAL PROGRAM TREE REPRESENTED BY HIGH-LEVEL COMPUTATIONAL CONSTRUCTS

CROSS-REFERENCE TO RELATED APPLICATIONS

This application is a divisional of U.S. patent application No. 08/431,049, filed Apr. 28, 1995, which is a continuation-in-part of U.S. patent application No. 08/145,689, filed Oct. 29, 1993, now abandoned.

TECHNICAL FIELD

The present invention relates generally to a computer method and system for generating a computer program and, more specifically, to a computer method and system that supports extensible computational constructs for use in creating a computer program.

BACKGROUND OF THE INVENTION

Computer programs are generally written in a high-level programming language (e.g., Pascal and C). Compilers are then used to translate the instructions of the high-level programming language into machine instructions, which can be executed by a computer. The compilation process is generally divided into 6 phases:

1. Lexical analysis
 2. Syntactic analysis
 3. Semantic analysis
 4. Intermediate code generation
 5. Code optimization
 6. Final code generation Lexical analysis involves scanning the computer program and recognizing components or tokens of the high-level language. During this phase, the compiler converts the computer program into a series of tokens that are processed during syntactic analysis. For example, during lexical analysis, the compiler would recognize the statement cTable=1.0;

as the variable(cTable), the operator(=), the constant(1.0), and a semicolon. A variable, operator, constant, and semi-colon are tokens of the high-level language. During syntactic analysis, the compiler processes the tokens and generates a syntax tree to represent the program. A syntax tree is a tree structure in which operators and operands are stored in nodes. In the above example, the operator (=) has two operands: the variable (cTable) and the constant (1.0). During semantic analysis, the compiler modifies the syntax tree to ensure semantic correctness. For example, if the variable (cTable) is an integer and the constant (1.0) is real, then during semantic analysis an operator for real to integer conversion would be added to the syntax tree. During intermediate code generation, code optimization, and final code generation, the compiler generates machine instructions to implement the program represented by the syntax tree. The machine instructions can then be executed by the computer.

SUMMARY OF INVENTION

The present invention provides a method and system for generating executable code for a computer program. In a preferred embodiment, the system receives an intentional program tree that has nodes. Each node represents a high-level computational construct of the computer program. For each node representing a high-level computational construct, the system transforms the node into an implementation of the high-level computational construct using low-level computational constructs. For each node representing a low-level computational construct, the system generates executable code that implements the low-level computational construct. The system further provides that where a high-level computational construct has a plurality of implementations of the high-level computational construct, the system transforms the nodes by selecting one of the implementations and transforms the node in accordance with the selected implementation. The system further provides that the implementation is selected by automatically analyzing semantics of the intentional program tree.

BRIEF DESCRIPTION OF DRAWINGS

FIG. 4 is a diagram of the layout of a tree element.

DETAILED DESCRIPTION OF THE INVENTION

Overview

The present invention provides a method and system for generating a computer program. In a preferred embodiment, the system, referred to as an intentional programming system (IP system), provides for:

1. creating a computer program in a manner that is independent of any programming language syntax;
2. displaying representations of a computer program in various programming language formats;
3. adding new computational constructs that can be used in creating a computer program;
4. specifying computational constructs as a programmer's "intent," rather than a programming-language based implementation of the programmer's intent; and
5. adding multiple implementations of an intent that are customized to the environment in which the intent is used.

A programmer uses the IP system to generate an intentional program. A intentional program is represented by an intentional program tree (IP tree), which is high-level program tree that is a syntax-independent representation using high-level computational constructs. The IP tree represents the programmer's intent, rather than an implementation of the programmer's intent. A programmer creates an IP tree using the syntax-independent editor of the IP system. The editor allows a programmer to directly manipulate the IP tree, which is in contrast to conventional programming systems in which a programmer manipulates a textual representation of the program that is later converted into a syntax tree during compilation. Because the program is stored in an IP tree in a syntax-independent manner, the editor allows the programmer to select in which of various programming languages the computer program is to be displayed. After an IP tree is created, the IP system transforms the IP tree into a reduced program tree (RP tree), which is a low-level program tree, in a process that is called reduction. The reduction process replaces expressions of the programmer's intents (i.e., high-level computational constructs) with a representation of one of the possibly multiple implementations of those intents using low-level computational constructs (e.g., add two integers, shift left one bit). A low-level computational construct is a construct that is typically provided by conventional syntax-based programming languages. A preferred set of low-level computational constructs is provided by BCPL (see Richards, M., "BCPL: A Tool For Compiler Writing and Systems Programming," *Proceeding AFIPS*, vol. 34, (SJCC) New Jersey, AFIPS Press, 1969, pp. 557–566). The IP system then uses the RP tree to generate executable code that is the actual implementation of the programmer's intent. In addition, the IP system allows a programmer to define new high-level computational constructs. Each new high-level computational construct represents a programmer's intent and can be used when creating an IP tree.

Figure 1A:
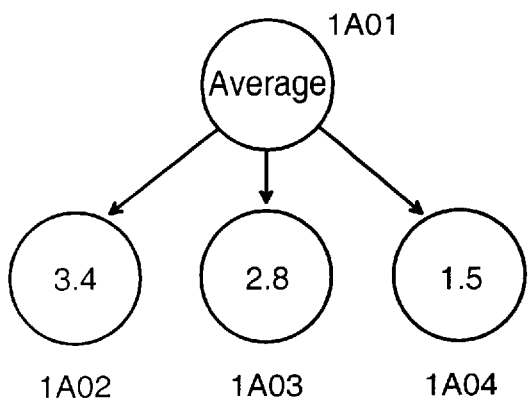
FIGS. 1A and 1B are diagrams of an IP subtree and the corresponding RP subtree.
Figure 1B:
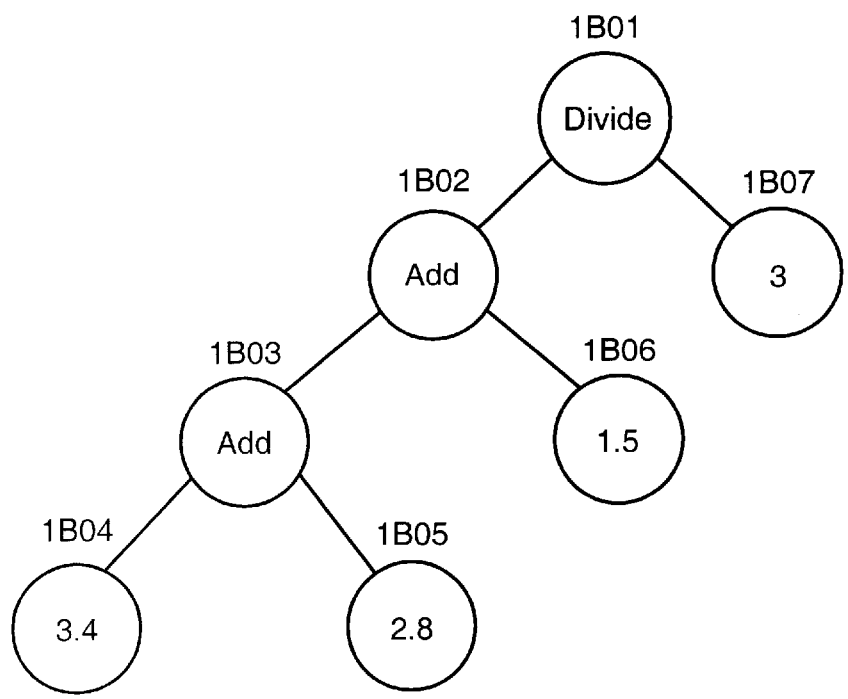
Figure 1C:
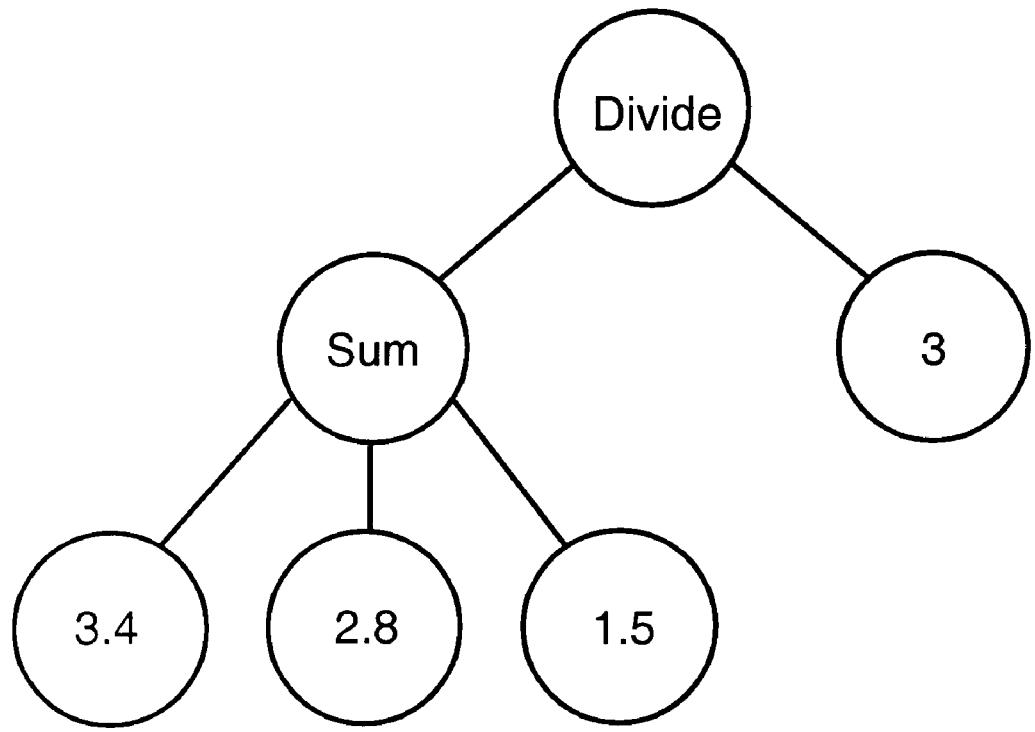
FIG. 1C is a diagram of an IP subtree that may reduce to the RP subtree of FIG. 1B.

An IP tree is a tree data structure in which the nodes (tree elements) represent the high-level computational constructs used to form the computer program. For example, it may be a programmer's intent to calculate the average of a list of numbers. The programmer's intent is represented by a subtree of the IP tree with a tree element that indicates that the average (an operator) is to be calculated and that points to other tree elements (the operands) that each indicates one of the numbers in the list. The root of the IP subtree represents the high-level computational construct "Average" and its child tree elements represent high-level computational constructs that generate the value of each number. During reduction, this IP subtree is transformed into a subtree containing tree elements representing low-level computational constructs that form an implementation of the programmer's intent to calculate an average. FIGS. 1A and 1B are diagrams of an IP subtree and the corresponding RP subtree. The IP subtree of FIG. 1A contains a tree element 1A01 that represents the high-level computational construct "Average" and three tree elements 1A02, 1A03, and 1A04 that represent the numbers 3.4, 2.8, and 1.5. The RP subtree of FIG. 1B contains tree elements 1B01–1B07 that represent low-level computational constructs. The tree elements 1B01–B03 represent arithmetic low-level computational constructs (operators), and the tree elements 1B04–1B07 represent their operands. The IP subtree represents the programmer's intent at a higher level than that of the RP subtree. It is clear from the IP subtree of FIG. 1A that the programmer's intent is to calculate the average of three numbers, but that intent is not clear from the RP subtree of FIG. 1B. FIG. 1C is a diagram of an IP subtree that may also reduce to the RP subtree of FIG. 1B. The programmer's intent that is expressed by the IP subtree of FIG. 1C is to add a list of numbers and then divide by 3 regardless of how many numbers are in the list. Thus, it is ambiguous from the RP tree alone what is the programmer's intent. That is, the programmer's intent could have been to calculate the average of a list of numbers or to add a list of numbers and then divide by three. An accurate expression of the programmer's intent is especially important when maintaining a computer program. For example, if the maintaining programmer does not know the intent of RP subtree of FIG. 1B, then the maintaining programmer does not know whether to change tree element 1B07 to a "4" or leave it as a "3" when a new number is added to the list.

High-Level (IP) versus Low-Level (RP) Computational Constructs

In a preferred embodiment, the low-level computational constructs correspond to those computational constructs typically supported by current programming languages. These typical low-level computational constructs include arithmetic operators (e.g., "+", "−", "/", "^"), data access operators (e.g., ".", "→", "[]"), type operators (e.g., "int", "class", "struct"), and program control operators (e.g., "for", "while", function invocation). In one embodiment, the low-level (RP) computational constructs are the computational constructs supported by the C programming language. In this way, the semantic analysis, the intermediate code generation, the code optimization, and the final code generation of an existing C compiler can be used to process an RP tree.

The high-level (IP) computational constructs correspond to any computational construct that can be inserted into an IP tree. For example, "average," "sort," "Fourier transform," and "display" would each be a high-level computational construct. The high-level computational constructs can be system defined, that is, predefined by the IP system, or programmer defined, that is, defined by a programmer to represent the programmer's intent. Typically, each low-level computational construct is also a high-level computational construct. For example, the computational construct "addition" is both high-level and low-level.

Architecture

Figure 2A:
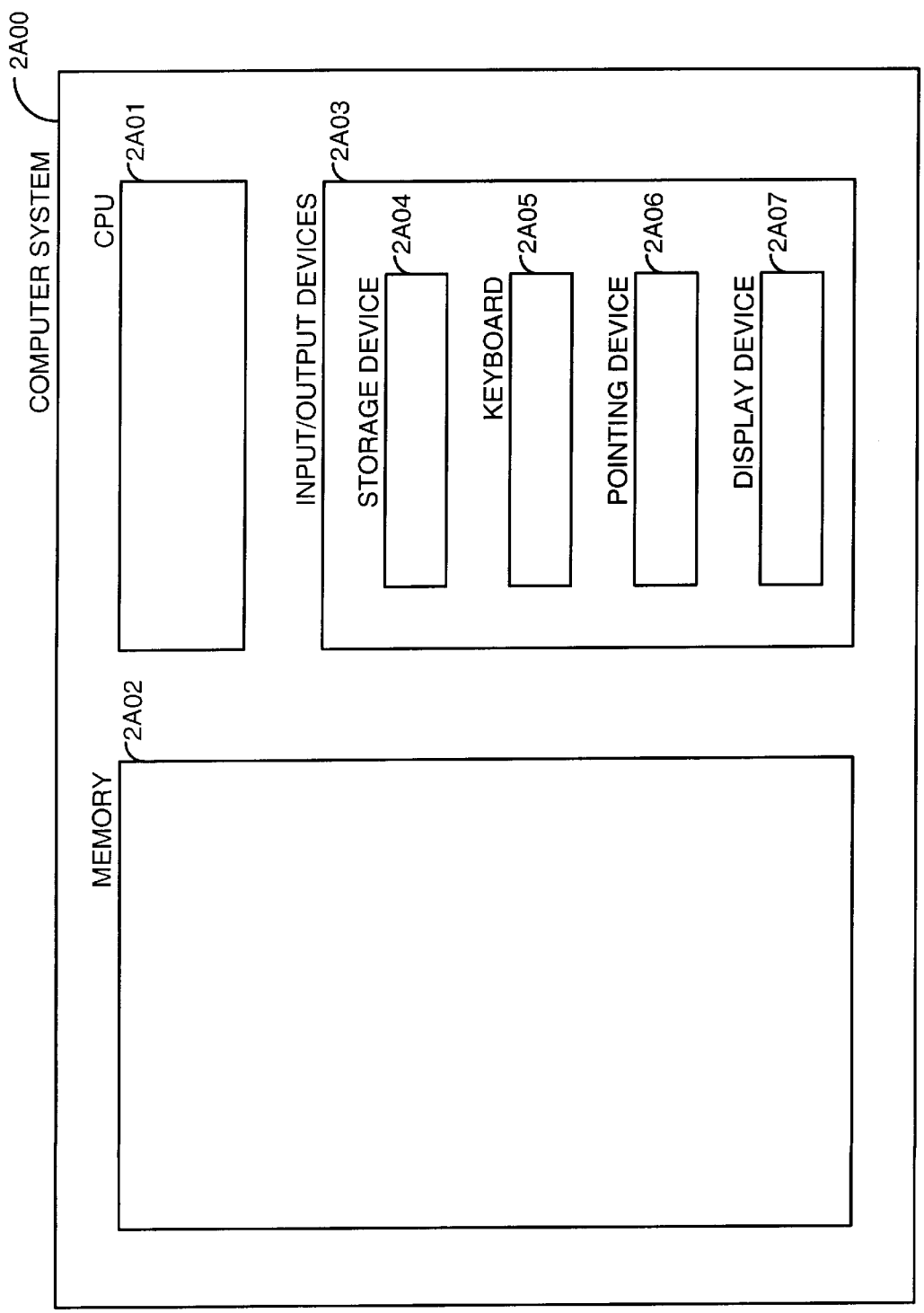
FIG. 2A is a high-level block diagram of the general-purpose computer system upon which the IP system preferably operates.

FIG. 2A is a high-level block diagram of the general-purpose computer system upon which the IP system preferably operates. The computer system 2A00 contains a central processing unit (CPU) 2A01, a computer memory (memory) 2A02, and input/output devices 2A03. The computer programs of the IP system reside in the memory and execute on the CPU. Among the input/output devices is a storage device 2A04, such as a hard disk drive, a keyboard 2A05, a pointing device 2A06, such as a mouse, and a display device 2A07, such as a monitor.

Figure 2B:
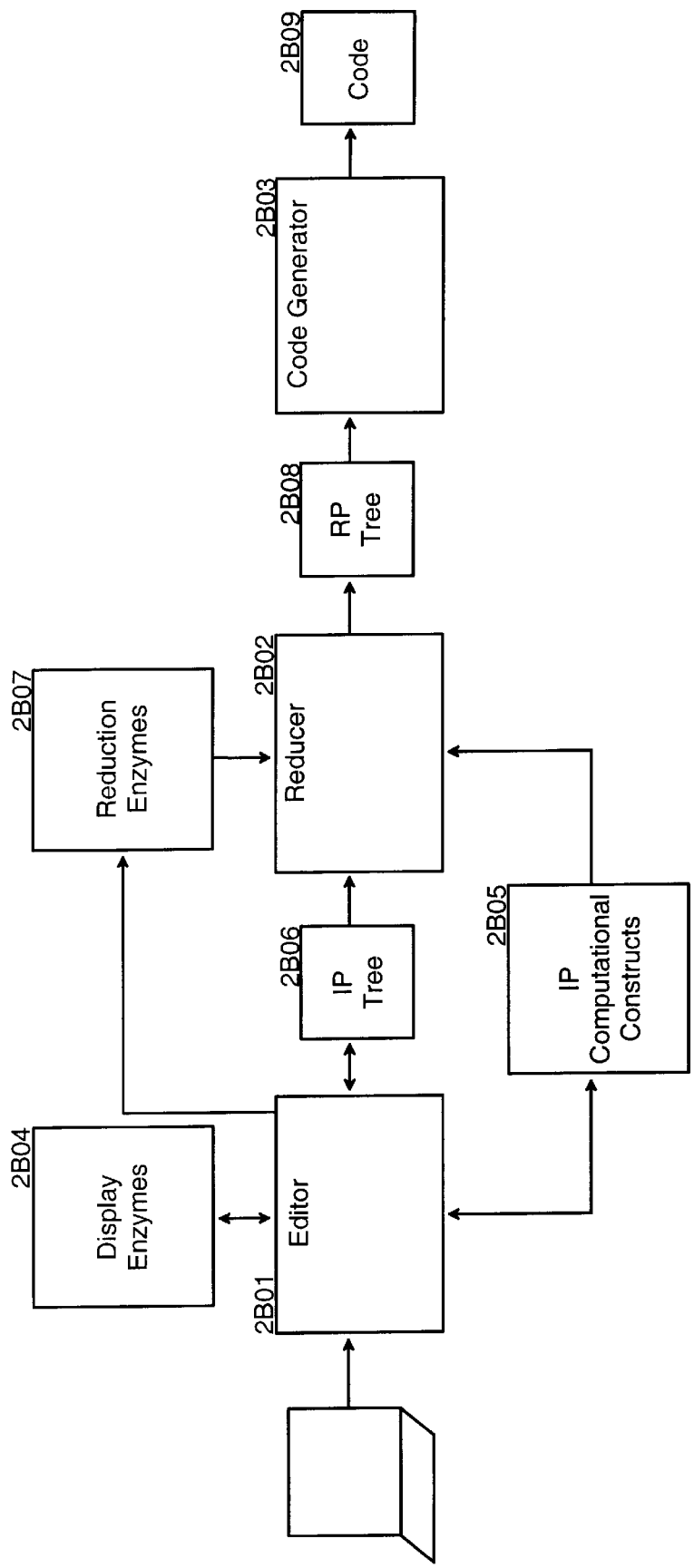
FIG. 2B is a block diagram of the components of the IP system.

FIG. 2B is a block diagram of the components of the IP system. The main components are the editor 2B01, the reducer 2B02, and the code generator 2B03. The editor provides a graphical user interface through which a user inputs an intentional program in a syntax-independent manner by direct manipulation of the IP tree 2B06. The editor can be used to create and install display enzymes 2B04, reduction enzymes 2B07, and IP computational constructs 2B05. Each IP computational construct has a corresponding display enzyme that controls the displaying of a representation of the construct. (The term "enzyme" refers to a function or a method that uses the IP tree or subtree as input.) An IP computational construct may have multiple display enzymes that each display the IP computational construct in a different format. For example, an IP computational construct may have a display enzyme for a C++ format, a Lisp format, or a tree format that displays a graphical representation of the IP tree. A user of the IP system would select the desired display format. Each IP computational construct also has one or more reduction enzymes that control the reduction of the IP computational construct to RP computational constructs. In one embodiment, the IP system has a table of IP computational constructs that contains a description of each of the constructs that are available to be used in an IP tree. Once an IP tree is created using the IP computational constructs, it can be reduced to a RP tree 2B08 by reducer 2B02. The reducer inputs the IP tree and the reduction enzymes and applies the reduction enzymes to the IP tree to generate the RP tree. The RP tree is then input to a standard code generator 2B03 to generate executable code for the intentional program.

IP Tree

An IP tree is a tree data structure that contains nodes (tree element). Each node contains an operator field (i.e., operator tree component) and may contain operand fields and other fields depending on the contents of the operator field. The operator field contains a reference to a node corresponding to a declaration of an IP computational construct or a program-defined declaration (e.g., "int x"). The operand fields contain references to subtrees of the IP tree that represent operands for the node.

Each IP tree includes an IP set of "IP declaration nodes" that are defined by the IP system. An IP declaration node is a node with an operator field that references the "declaration" IP computational construct. The IP declaration nodes preferably include the computational constructs found in conventional programming. For example, the declaration nodes include computational constructs that correspond to mathematical operations, function invocation, and data typing. Each IP declaration node has a display enzyme and a reduction enzyme associated with it. The display enzyme is a routine that controls the display of nodes that have operator fields that reference the IP declaration node. The reduction enzyme is a routine that controls the reduction of nodes that have operator fields that reference the IP declaration node.

Figure 3:
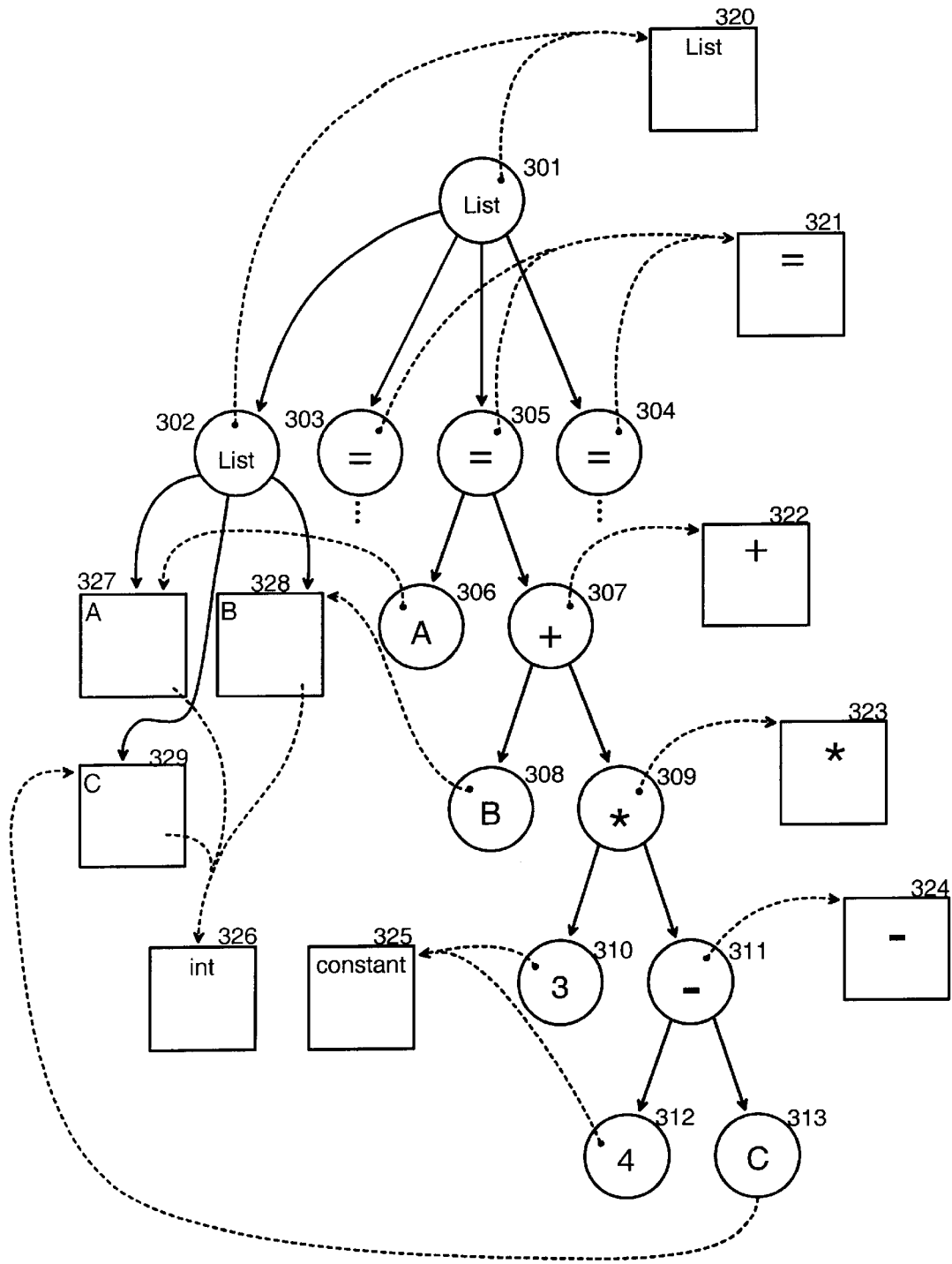
FIG. 3 is a diagram of a portion of a sample IP tree.

FIG. 3 is a diagram of a portion of a sample IP tree. This sample IP tree corresponds to the following computer code:

{int A, B, C, D; intA,B,C,D; B=4; A=B+3* (4-C); D=A/2; }_

The sample IP tree contains the nodes 301–313 and 320–329. Nodes 301–313 are non-declaration nodes, which are represented by circles, and nodes 320–329 are declaration nodes, which are represented by squares. The declaration nodes 320–326 are IP declaration nodes. The declaration node 320 represents a list (e.g., a compound statement), the declaration node 321 represents the assignment operator, the declaration nodes 322–324 represent arithmetic operators, the declaration node 325 represents a constant data type, and declaration node 326 represents an integer data type. Declaration nodes 327–329 correspond to the declaration statement (i.e., "int A, B, C, D;") for those variables. The declaration nodes that correspond to declaration statements in the program are referred to as "program-defined" declaration nodes. The nodes connected by the solid lines form a tree data structure, and all the nodes form a graph data structure.

A programmer can create this sample IP tree by adding the nodes in various orderings. The following describes the creation of the sample IP tree by adding nodes in a top-down, left-to-right order. The programmer first creates node 301 and set its operator (IP computational construct) to point to the "list" declaration node, which is an IP declaration node. The programmer then creates nodes 302, 303, 304, and 305 to represent each of the statements in the compound statement. (The subtree of nodes 303 and 304 are not shown.) The node 301 points to each of its operands, nodes 302, 303, 304, and 305. That is, the node 301 has the operator of list and operands of each statement in the list. The programmer sets the operator of node 302 to point to the list declaration node 320 and of nodes 303, 304, and 305 to point to the assignment declaration node 321. The programmer then creates the program-defined declaration nodes 327–329 for the variables "A," "B," and "C" and sets node 302 to point to the declaration nodes 327–329 as operands. Each declaration node 327–329 has an operand that points to declaration node 326 (indirectly through nodes that are not shown) specifying the type of the variable. The programmer then creates node 306 and sets its operator to point to the declaration node 327 for the variable "A." The programmer then creates node 307 and sets its operator to point to the declaration node 322 for the addition operator. The programmer then sets the operands of node 305 to point to nodes 306 and 307. The programmer continues creating nodes 308–313 and setting their operators and operands in a similar manner.

An IP tree is preferably stored in memory as a collection of nodes called tree elements (TEs). Each tree element contains various tree components (fields) that contains the data of the tree element. The tree components are: operator, operand [i], and property [i]. The operator tree component ("tcOp") and operand tree components ("tcOpnd[i]") contain pointers to other tree elements that describe the operator and operands. For example, a tree element representing the addition ("+") computational construct, contains in its operator ree component a pointer to a declaration tree element that defines the addition computational construct and contains in its operand tree components a pointer to a tree element for each operand. Operator tree components point to declaration tree elements. The property tree components contain various properties of the tree element. For example, an annotation property is stored in the annotation tree component ("tcAnnot"), a name property is stored in the name tree component ("tcDni"), and a constant value property is stored in the constant tree component ("tcConst"). The name and constant tree components contain the name and constant values, rather than a pointer to a tree element. The operand and annotation tree components, on the other hand, contain pointers to other tree elements that form a tree structure. The operator tree components contain pointers to other tree elements in graph structure, rather than a tree structure.

FIG. 4 is a diagram of the layout of a tree element 401. The column labeled "tree component" contains the name of the tree component and the column labeled "value" contains the value of the tree component. For example, the operator tree component ("tcOp") in tree element 401 would contain a pointer to a declaration tree element for an IP or program-defined declaration.

Figure 5:
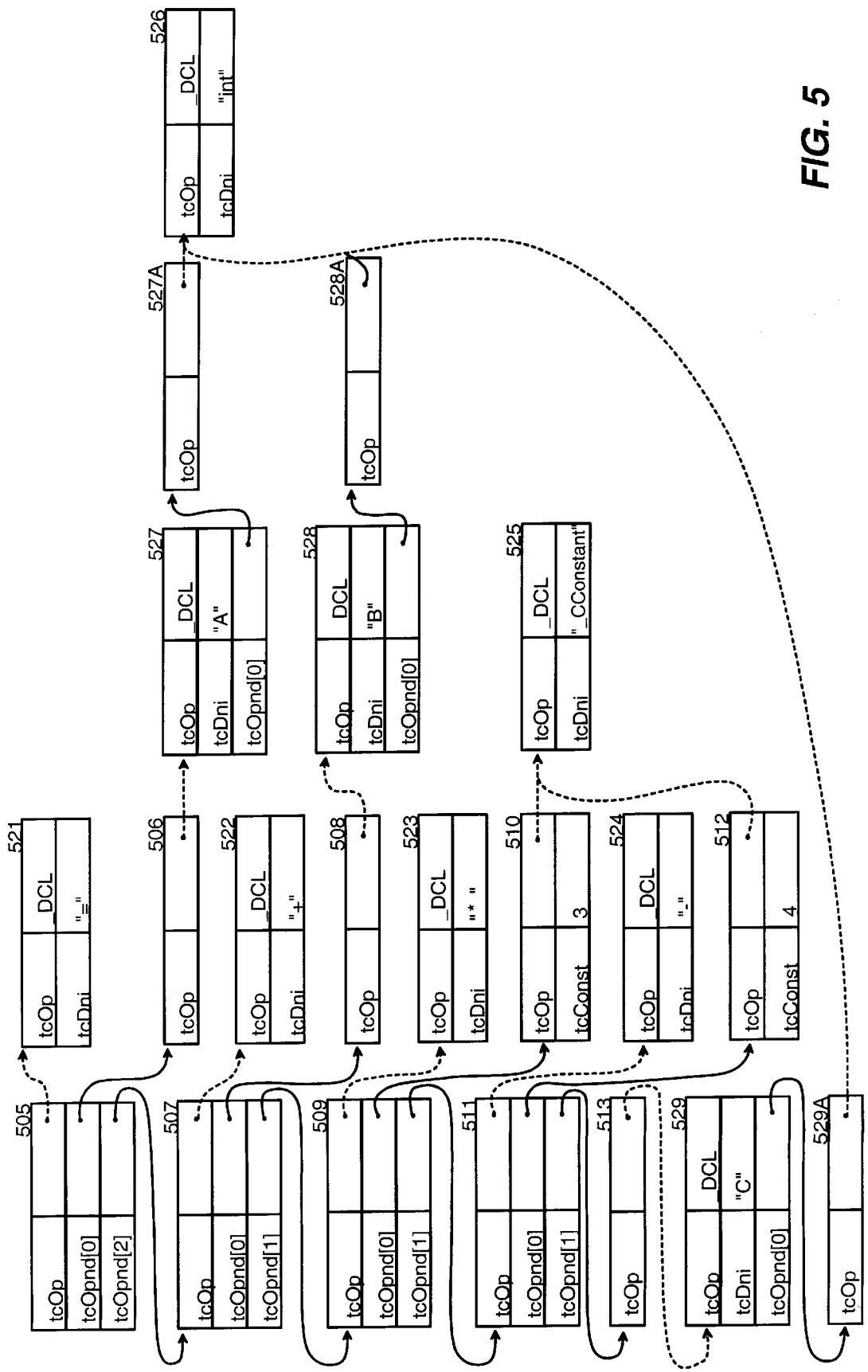
FIG. 5 is a diagram of the IP subtree of FIG. 3 showing the tree components of each tree element.

FIG. 5 is a diagram of the IP subtree of FIG. 3 showing the tree components of each tree element. Each of the tree elements is labeled with numbers that correspond to the nodes of FIG. 3. For example, tree element 505 corresponds to the node 305. The pointers from the operand tree components ("tcOpnd[i]") are shown in solid lines, and the pointers from the operator tree components ("tcOp") to declaration nodes are shown in dashed lines. The tree elements starting at tree element 505 that are connected by solid lines form a tree data structure. That is, a tree is formed by tree elements 505–513 and the solid lines that connect these tree elements. Tree element 505 contains an operator tree component that points to a declaration tree element 521 for the assignment ("=") computational construct. The tree element 505 also contains operand tree components that point to tree elements 506 and 507 that represent the variable "A" and the expression "B+3*(4-C)," respectively. The operator tree component of tree element 506 points to the declaration tree element 527 for the variable "A." The program-defined declaration tree element 527 was added to the IP tree to declare the variable "A" as an integer. The name tree component ("tcDri") of the tree element 527 contains the name of the variable "A." The operand tree component of the declaration tree element 527 points to the tree element 527A whose operator tree component points to the IP declaration tree element 526 for the type "int." Thus, the variable "A" is declared to be an integer. The other tree elements of FIG. 5 are not explicitly described herein but have a similar description to those tree elements described above.

An IP declaration tree element represents the definition of an IP computational construct. Part of that definition consists of information describing the IP computational construct, such as its print name (e.g., "+"), the name space in which it occurs (e.g., module), its volatility (e.g., constant or variable), and various other flags, which are preferably stored as properties. Because the operator tree components point directly to IP and program-defined declaration tree elements, the properties, of declaration, tree elements can be changed and be immediately reflected throughout the IP tree when it is being displayed. For example, if a particular variable is highlighted, then a property of the declaration tree element for the variable is set to highlight. Because each tree element representing the variable points to the declaration tree element for the variable, the highlight property is easily accessible when displaying the IP tree. A declaration tree element for a program-defined declaration of a variable (e.g., "int A") contains an indirect pointer to the declaration tree element for the type (e.g, "int"). When the variable is used in an intentional program as an operand (e.g, "A=B+3*(4-C)"), the tree element that represents the operand contains in its operator tree component a pointer to the declaration tree element of the variable.

Because each tree element contains a pointer to the declaration tree element for its operator, the names of (a property of) each declaration tree element may be arbitrarily assigned. The names are preferably used for display only. Moreover, each declaration tree element does not need a unique name. A declaration tree element can be identified to a user by a non-unique name and other properties or by its location (e.g., containing module name) within the IP tree. In this way, a variable with the same name as a field of a structure can be distinguished. Also, operands can be associated with declarations without the constraints of scoping rules normally associated with typical programming languages. For example, code from different libraries can be combined without causing name conflicts.

Editor

The editor of the IP system allows an IP tree to be created by direct manipulation of the IP tree. The editor provides commands for selecting a portion of an IP tree, for placing an insertion point in the IP tree, and for selecting a node to insert at the insertion point. The editor allows various commands to be performed relative to the currently selected portion and the current insertion point. For example, the currently selected portion can be copied or cut to a clipboard. The contents of the clipboard can then be pasted from the clipboard to the current insertion point using a paste command. Also, the editor provides various commands (e.g., "Paste=") to insert new a node at the current insertion point.

The editor displays an IP tree to a programmer by generating a display representation of the IP tree using the display enzymes. The IP system preferably has display enzymes to display an IP tree in several different popular programming language formats, such as C++, Pascal, Basic, and Lisp. The IP system permits a programmer to select, and change at any time, the format that the editor uses to produce a display representation of the IP tree. For example, one programmer can select to view a particular IP tree in a C++format, and another programmer can select to view the same IP tree in a Lisp format. Also, one programmer can switch between a C++ format and a Lisp format for an IP tree.

When directly manipulating an IP tree, the editor preferably indicates the currently selected portion of the IP tree to a programmer by highlighting the corresponding display representation of the IP tree. Similarly, the editor preferably indicates the current insertion point to a programmer by displaying an insertion point mark (e.g., "|" or "^") within the display representation. The editor also allows the programmer to select a new current portion or re-position the insertion point based on the display representation.

Figure 6:
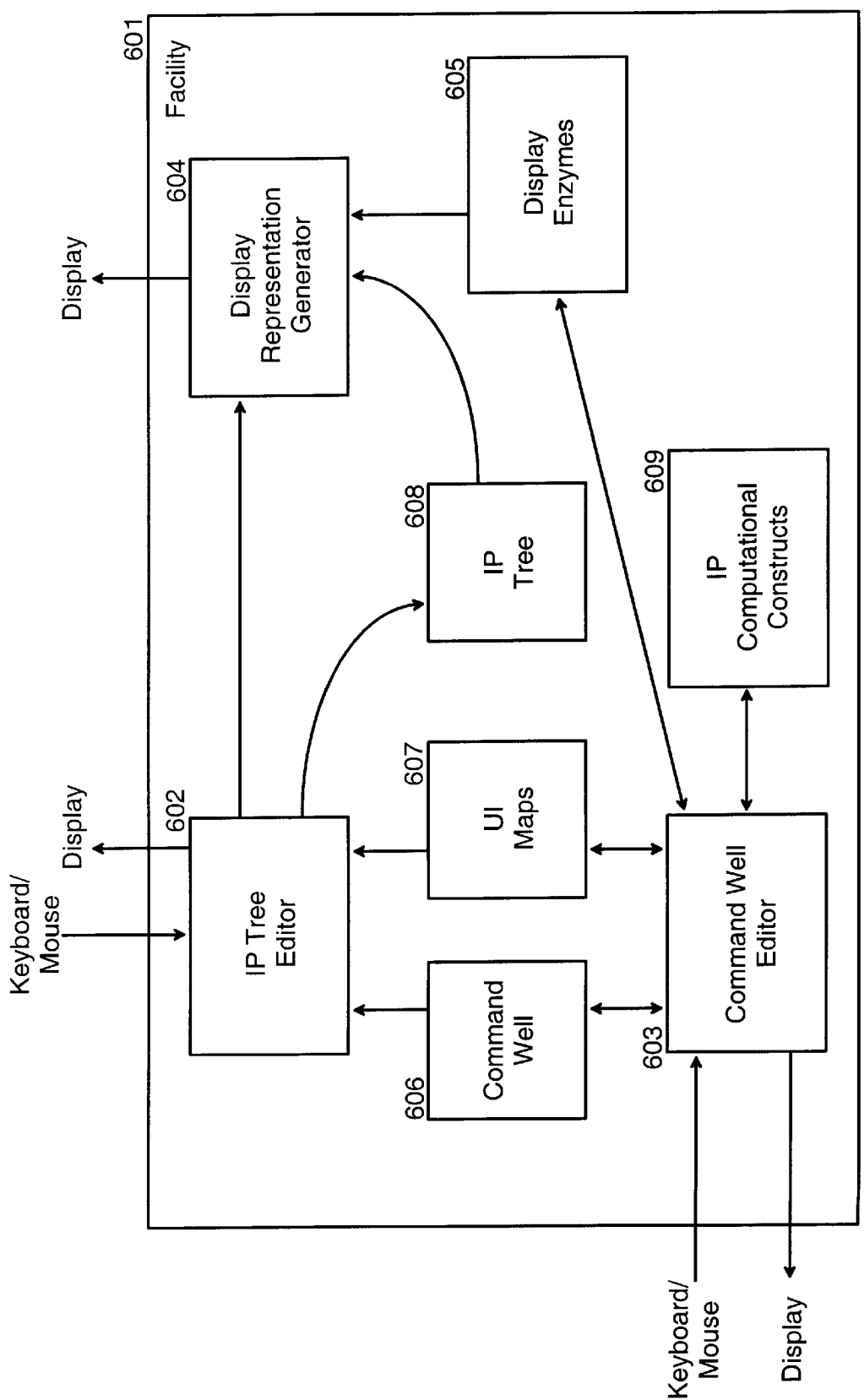
FIG. 6 is block diagram of components of the editor in a preferred embodiment.

FIG. 6 is block diagram of components of the editor in a preferred embodiment. The editor 601 includes IP tree editor 602, command well editor 603, display representation generator 604, display enzymes 605, command well 606, user interface maps 607, IP tree 608, and IP computational constructs 609. The IP tree editor is a command-centered editor that receives from a programmer an indication of a command to perform and retrieves the code of the command from the command well and executes the retrieved code. The IP tree editor controls the selection of the available commands directly from the command well or from the command well based on the user interface maps, and effects the execution of commands selected by a programmer. The user interface maps map menu items, toolbars, and keys to commands. When a menu item, toolbar, or key is selected, the IP tree editor performs the associated command. The command well contains a list of commands that are available for programmer selection and code to effect the performance of each command. The command well editor allows a programmer to customize the user interface provided by the IP tree editor and to maintain the table of IP computational constructs and the display enzymes. The display representation generator generates and displays a display representation of the program tree based on a programmer selected format and the display enzymes.

The IP Tree Editor

The IP tree editor 602 provides commands for creating and modfying IP trees. An IP tree is generated by entering a sequence of editor commands that create and insert nodes (tree elements) into the IP tree. For example, a programmer adds an assignment statement to a compound statement by selecting a node for the compound statement and indicating that a child node is to be added with the assignment operator ("=").

Figure 7A:
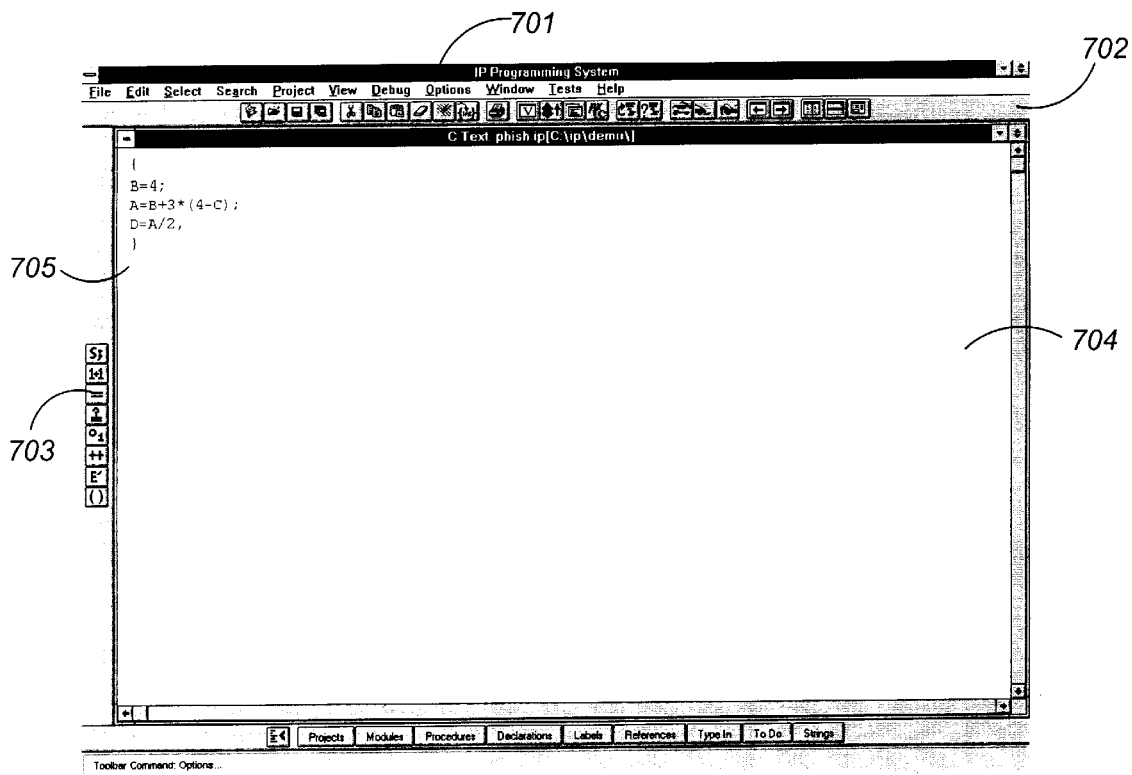
FIG. 7A illustrates the user interface provided by the IP tree editor.
Figure 7B:
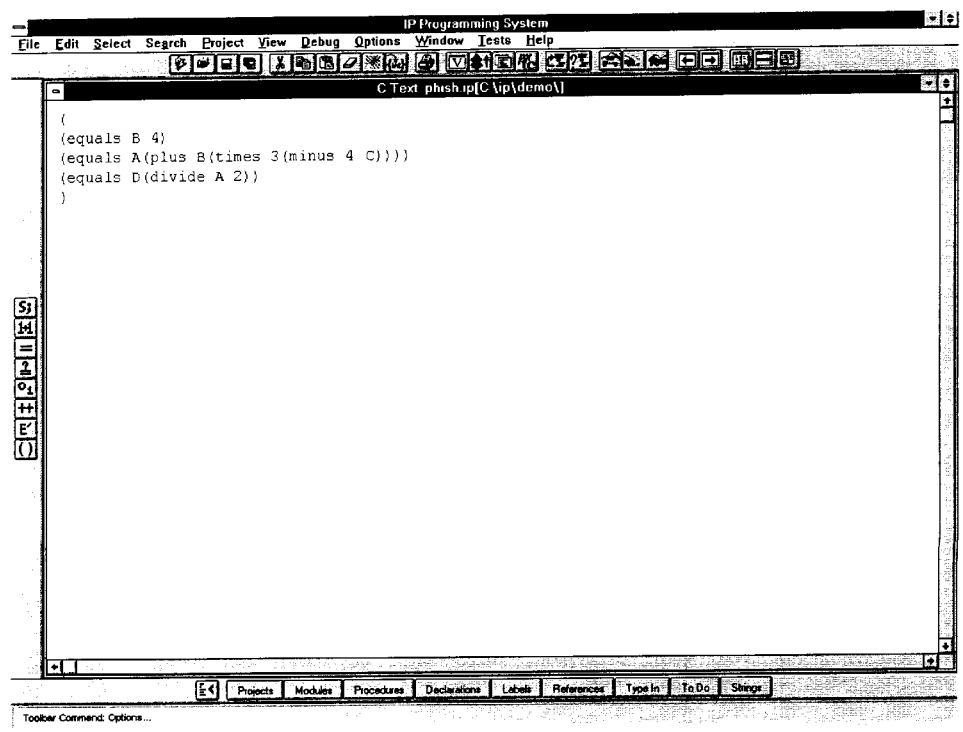
FIG. 7B illustrates a sample program displayed in Lisp format.

FIG. 7A illustrates the user interface provided by the IP tree editor. The IP tree editor directs the display representation generator to display a representation of the IP tree on the display device. The IP tree editor also effects the performance of commands invoked from the command well, from a menu, from a toolbar, or from a keymap. Commands typically manipulate (add nodes to and delete nodes from) the IP tree, change the insertion point, or change the current selection. Other commands allow for storing and retrieving the IP tree. The IP tree editor user interface preferably includes a menu 701, a horizontal toolbar 702, a vertical toolbar 703, a program text area 704, and a left margin area 705 as shown in FIG. 7A. Toolbars, preferably, may be marked visible or invisible. They may be positioned at toolbar areas at the top, bottom, left, or right of the window. They can be repositioned from any of the four toolbar areas to another toolbar area by selecting and dragging with a mouse. FIG. 7A shows a sample program displayed in C++format. FIG. 7B illustrates a sample program displayed in Lisp format.

Figures 7C, 7D:
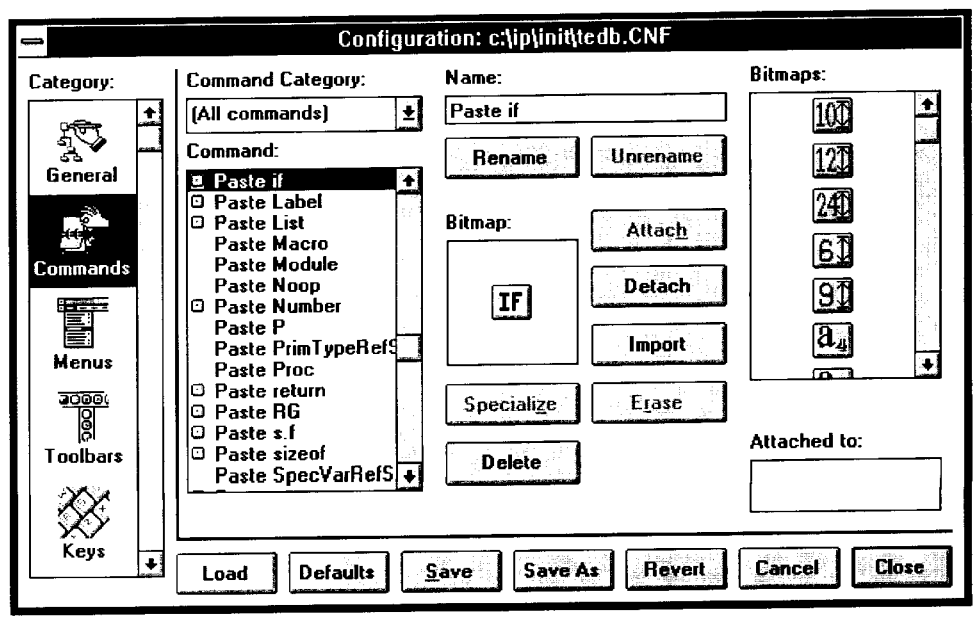
FIG. 7C illustrates the selection of the select menu of the IP tree editor.
FIG. 7D illustrates sample command selection.

FIG. 7C illustrates the selection of the select menu of the IP tree editor. The select menu is a pull down menu that lists various commands for selecting portions of the IP tree and positioning the insertion point.

In one embodiment, the IP tree editor includes a tokenizer for receiving keyboard entered text, recognizing a token, and converting the token into a sequence of editor commands. The IP tree editor provides commands for selecting portions of an IP tree and for placing an insertion point in the IP tree. The IP tree editor allows various commands to be performed relative to the currently selected portion and the current insertion point. For example, the "Paste if" command replaces the currently selected portion of the IP tree by an node pointing to the declaration node that defines the IP computational construct for conditional execution, which is generally denoted as "if" in current programming language syntax. The typing of an "if" token results in the corresponding "Paste if" command being executed relative to the current selection.

The IP tree editor provides various command s for selecting portions, positioning insertion points, adding and deleting nodes in the program tree, and manipulating the IP tree. As described below, the command well editor allows a programmer to customize the mapping of keys to commands. The following describes a typical user interface for manipulating an IP tree.

A subtree is selected by pointing (using the mouse pointer) to the display representation of some tree node and then double clicking the left mouse button. The entire subtree headed by that node is selected. A list of subtrees may be selected by drawing through the list with a mouse button held down. Selection and placement of the insertion point can be effected by a single command. A single click of the left mouse button will select a subtree, but it positions the insertion point at one end of the selection—depending on whether the click was in the left or the right half of the display representation of the node. Although the subtree is selected, the subtree may not be modified. Rather, the selection defines an operand of an operator to be inserted at the insertion point. If the operator (IP computational construct) is binary, the selected subtree will be the right or the left operand of the operator, depending on the placement of the insertion point. Missing operands are displayed as "???". A "Select Crown" command (e.g., control-click right mouse button) selects the head of a subtree, without selecting the whole subtree. This permits replacing an operator, while leaving the operands in place.

The following is a description of various selecting and insertion point positioning commands. The sample IP tree is that shown in FIG. 3.

SELECT NODE CONTENTS select a particular node for the purpose of changing the contents of the node by manipulating its name or constant tree component. For example, when the programmer selects the "4" of the statement "A=B+3*(4-C)", then the IP tree editor selects the node 3111. The programmer can then change the content of the constant tree component for the node. In the following, the selected portion of the IP tree is indicated by a vertical bar for an insertion place. The following illustrates the selection of a node and the changing of the constant value to "40."

A=B+3 *(4-C)

position mouse pointer after "4"

command: select node contents

A=B+3 *(4|-C)

enter "0"

A =B +3 * (401 -C)

SELECT SUBTREE select the entire subtree of the currently selected node. For example, when the currently selected portion is node 305 and the programmer enters the select subtree command, then the IP tree editor selects the subtree comprising nodes 305–313. The following illustrates the select subtree command.

A|=B+3 (4-C)

command: select subtree

A=B+3 * (4-C)

Alternatively, the subtree can be selected by placing the mouse pointer on the "=" and double-clicking the left mouse button.

SELECT CROWN select only the head node of the currently selected subtree. For example, when the currently selected portion is the subtree with the nodes 305–313 and the programmer enters the select crown command, then the IP tree editor selects node 305. The following illustrates the select crown node of subtree command.

A=B+3 *(4-C)

command:select crown

A=B+3 * (4-C)

Alternatively, the crown can be selected by placing the mouse pointer over the operator and the alt-clicking the left mouse button.

SELECT PARENT selects the subtree of the parent node of the currently selected subtree. For example, when the currently selected portion is the subtree with nodes 305–313 and the programmer enters the select parent command, then the IP tree editor selects the subtree of node 301. The following illustrates the select parent of head node command.

{B=4A=B+3 *(4-C) D=A/2} command: select parent

{B=4A=B+3*(4-C) D=A/2}

SELECT FIRST CHILD selects the first child node of the head node of the currently selected subtree or currently selected node. For example, when the currently selected portion is the subtree with nodes 305–313, and the programmer enters the select first child command, then the IP tree editor selects the node 306. The following illustrates the select first child command

A=B++3 *(4-C)

command: select first child

A=B+3 *(4-C)

SELECT LAST CHILD selects the last child node of the head node of the currently selected subtree or currently selected node. For example, when the currently selected portion is the subtree with nodes 305–313 and the programmer enters the select last child of head node command, the IP tree editor selects the node 307. The following illustrates the select last child command.

A=B+3 * (4-C)

command: select last child

A=B±3 *(4-C)

SELECT PREDECESSOR SIBLING selects the predecessor sibling node of the head node of the currently selected subtree or currently selected node. For example, when the currently selected portion is the subtree with nodes 305–313 and the programmer enters the select predecessor sibling command, then the IP tree editor selects the node 303. In an alternate embodiment, if a subtree is currently selected, then the IP tree editor selects the entire sibling subtree. The following illustrates the select predecessor sibling command.

{B=4A=B+3 *(4-C) D=A/2} command: select predecessor sibling

{B=4A 32 B+3 * (4 -C) D=A/2}

SELECT SUCCESSOR SIBLING selects the successor sibling node of the head node of the currently selected subtree or currently selected node. For example, when the currently selected portion is the subtree with nodes 305–313 and the programmer enters the select successor sibling command, then the IP tree editor selects the node 304. In an alternate embodiment, if a subtree is currently selected, then the IP tree editor selects the entire sibling subtree. The following illustrates the select successor sibling command.

{B=4 A=B+3 *(4-C) D=A/2 command: select successor sibling

B=4A=B+3 *(4-C) D=A/2}

SELECT NEXT "???"

selects the next node in IP tree that is undefined (described below) as encountered in a depth first left-to-right traversal of the program tree.

SELECT PLACE places the insertion point between two nodes. The insertion point is indicated by a greater than symbol (">") or a caret ("^"). The insertion point is placed between two sibling nodes, before the first or last sibling node, or where the first child node is to be inserted. For example, the insertion point can be placed between statements in a list or parameters for a function. The insertion point is indicated by clicking the left mouse button. The following illustrates the select place command.

{B=4A=B+3 *(4-C) D=A/2} command:select place with mouse pointer before "D"

{B=46A=B+3 *(4-C)>D=A/2}

SELECT LEFT places the insertion point above the currently selected subtree or node. When a node for a multi-operand operator is inserted, new operand nodes are inserted on the left of the currently selected node. The command is preferably selected by positioning the mouse pointer to the left of the currently selected portion and clicking the left mouse button. For example, when the currently selected portion is the subtree with nodes 309–313 and the insertion point is above the current node to the left, then the IP tree editor inserts the new node above and to the left of the currently selected subtree. The following illustrates placing the insertion point ("I") above the currently selected node to the left.

A=B+3 *(4-C)

command: select left

A=B+13 * (4-C)

command: paste reference (E)

A=B+E?793 *(4-C)

command: paste+

A=B+E+(3 *(4-C))

Note that the selection "3 * (4-C)" defined the right operand of the inserted binary operator "+". Parenthesis are displayed by the display representation generator to illustrate the operator precedence. The "paste reference (E)" command causes the node for the first "+" to be changed to contain as its right operand field a reference to the declaration node for the variable "E." The preferred way to invoke the "Paste Reference (E)" command is by entering the token "E" from the keyboard. Similarly, the preferred way to invoke the "paste +" command is by entering a "+" from the keyboard. All common IP computational constructs have similar keyboard-based ways to invoke the commands.

SELECT RIGHT places the insertion point above the currently selected subtree node. When a node for a multi-operand operator is inserted, new operand nodes are inserted on the right of the currently selected node. The command is invoked preferably by positioning the mouse pointer to the right portion of the currently selected node and single clicking the left mouse button. For example, when the currently selected portion is the subtree with nodes 309–313 and the insertion point is above the current node to the right, then the IP tree editor inserts the new node above and to the right of the currently selected subtree. The following illustrates placing the insertion point above the currently selected node to the right.

A=B+3*(4-C)
A=B+3*(4-C)l
A=B+3*(4-C)+E

Note that the selection "3* (4 -C)" defined the left operand of the inserted binary operator "+".

SELECT BEFORE NODE places the insertion point as a left sibling of the currently selected node or subtree. The command is preferably selected by positioning the mouse pointer to the left of the currently selected subtree and clicking the mouse. For example, when the currently selected portion is the subtree with nodes 305–313 and the programmer places the insertion point as a left sibling, then the IP tree editor inserts subsequently pasted nodes between nodes 303 and 305. The following illustrates the select before node command.

{B =4>A=B+3 *(4-C) D=A/2} new data: C=2

{B=4C=2>A=A=B+3 *(4-C) D =A/2}

SELECT AFTER NODE places the insertion point as a right sibling of the currently selected node or subtree. The command is entered by positioning the mouse pointer to the right of the currently selected subtree and clicking the mouse. For example, when the currently selected portion is the subtree with nodes 305–313 and the programmer places the insertion point as a right sibling, the IP tree editor inserts subsequent nodes between nodes 305 and 304. The following illustrates the select before node command.

{B=4A=B+3*(4-C) D=A/2} new data: C=2

{B 4A=B +3 * (4-C) C=2>D=A/2}

INTERPRETED SELECTION

The IP editor uses an interpreted selection mode for automatic context sensitive selection by the tokenizer during creation of an IP tree. While other forms of selection (e.g., left) use underlining (by default) to explicitly indicate the extent of the selection, interpreted selection mode dispenses with fixed extent indicators and uses the relative precedence and associativity of the operators to determine the implied extent of selections. In other words, the IP editor interprets the extent of the selection based on the operator context.

The IP editor indicates interpreted selection mode by a slightly fattened vertical cursor with no explicit extent indication. The interpreted selection mode is entered upon entering a blank to terminate an entry or upon entering an IP computational construct (operator). The interpreted selection mode is exited upon entering a tab or reverse tab (shift-tab) or by any specific selection made by the user.

For example, if in interpreted selection mode, when entering the expression

5+4* . . .

the multiply is associated with the 4 because multiply precedence is greater than the addition, so that the expression operators associate as if the expression were

5+(4* . . . )

Since the expression is unambiguous without the parentheses, the expression is actually displayed as

5+4 * . . .

The IP display enzymes automatically add the parentheses whenever (and only when) the natural operator precedence is inconsistent with the intent of the expression, i.e., a lower precedence operator is intended to associate with the operand between it and a higher precedence operator.

If the C-like precedence of the interpreted selection mode does not provide the desired precedence, then the IP editor allows the programmer to exit the interpreted selection mode. The programmer uses the tab key or the mouse to leave interpreted selection mode and to right select the "+" operator (i.e., to right select the "5+4" expression as a unit). When the "*" operator is entered, this expression is used as its left operand. If the state of entry in interpreted selection mode is as follows:

5+4| two tabs (or alternatively a mouse selection to the right of the plus) will right select the expression "5+4" as follows:

5+4|

This entire expression will be the operand of the next operator. Thus, entry of the "*" operator followed by a 6 will result in the following.

(5+4)*6|

After entering the 6, the IP editor again enters interpreted selection mode.

The IP editor enters the interpreted selection mode whenever an operand of an expression is entered from the keyboard. The interpreted selection is similar to a right selection without the extent indicator. The cursor becomes a slightly fattened vertical bar and the selection extent indication (whose default representation is an underline for other forms of selection) is not displayed. The way in which data entry is completed determines the resulting selection mode. If a blank is used to complete an operand (e.g., a variable reference), the IP editor remains in interpreted selection mode. If a tab or shift-tab is used to terminate an entry, the IP editor exits interpreted selection mode. Interpreted selection mode is designed to allow sequential entry of expressions without leaving the interpreted selection mode, except in those cases where the natural operator precedence would not produce the desired sequence of execution.

The IP editor also provides navigation techniques for traversing an IP tree. Tab and shift-tab are the canonical methods for moving (forward and reverse) from one type of selection to another and from position to position in a canonical order as defined by the structure of the IP tree. If a programmer is in the middle of entering a terminal node (e.g., a variable name, keyword, string, etc.), the entry of a tab will complete the entry process before moving to the next canonical position.

The IP editor allows the entry of a blank to complete the entry process without changing position. This leaves the programmer positioned to do something more with the item just entered, for example, add an annotation. For example, if the programmer wants to add the annotation const to an int type before completing the rest of the declaration information, a blank after entry of the "int" will complete entry of the "int" token but leave the positioning on the "int" so that the annotation can be added immediately.

The IP editor also allows the completion of an entry to occur conditionally as a consequence of entering an operator at the end of a leaf entry. For example, when entering the sequence "x+", the occurrence of the "+" operator completes the entry of the identifier "x" and the occurrence of the blank completes the entry of the operator and repositions entry to the second operand of the "+", that is, at the "???" in the expression that follows.

x+???

The generic model for selection and navigation is defined by the following recursively invocable state diagrams of FIGS. 7E–7H. In these diagrams, the ellipses represent the state of selection mode for the current node, the arcs represent a state to state (and sometimes node to node) transition that is triggered by the labeled keyboard entry, the boxes represent the recursive invocation of another instance of one of the state diagrams, and the rhomboids represent exit and entry points that also designate the keyboard characters to be applied in calling state diagram after the return.

Figure 7E:
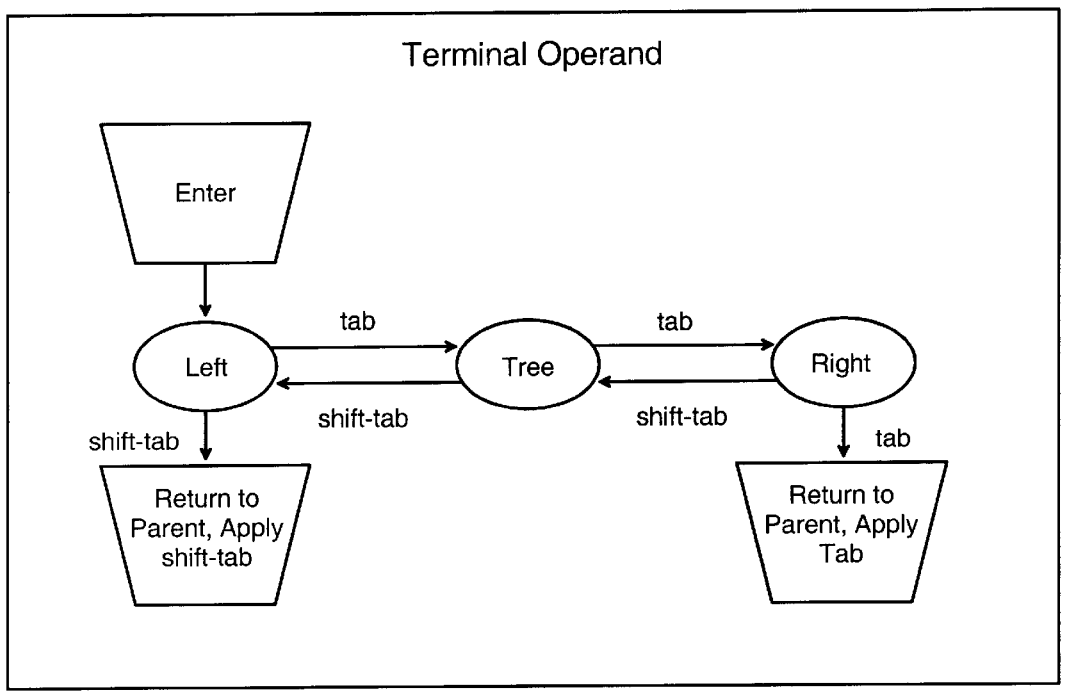
FIG. 7E represents a state diagram illustrating the navigation of terminal operands.

FIG. 7E represents a state diagram illustrating the navigation of terminal operands (e.g., numbers, variable references, strings, etc.). When navigating through a terminal operand, only three selections are meaningful: left selection and right selection to apply operators to the operand and tree selection to replace the operand. The following illustrates the sequence of navigating through a terminal operand.

A+|B command:tab

A+B command:tab

A+B | command:shift-tab

A+B

Figure 7F:
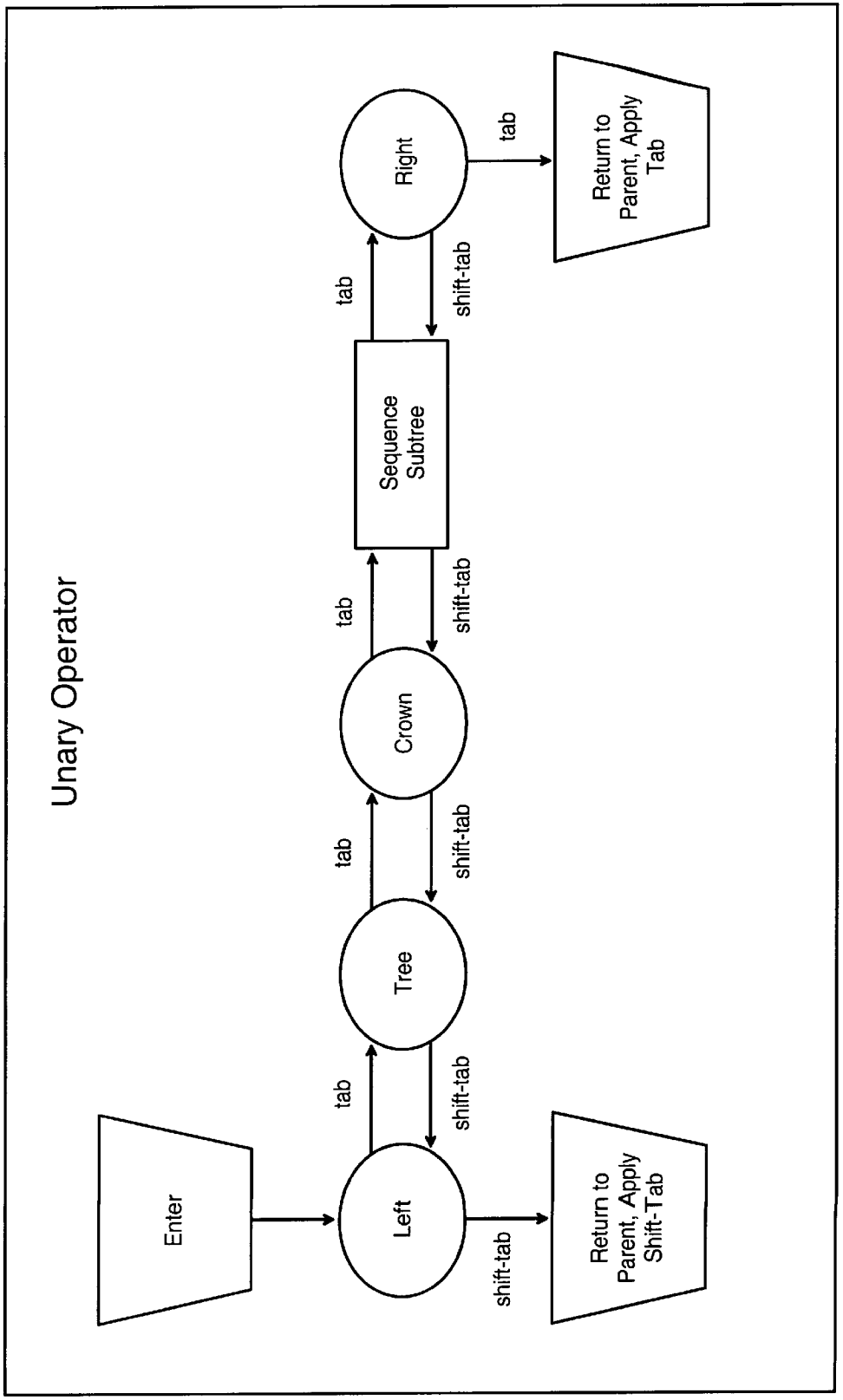
FIG. 7F represents a state diagram illustrating navigation of a unary operator.

FIG. 7F represents a state diagram illustrating navigation of an unary operator. When navigating a unary operator, the IP editor allows selection of the unary operator itself and the operand (which may be an extended subtree). Thus, navigating unary operators allows a crown selection state and the capability to recursively invoke another state diagram model to navigate through the subtree of the operand.

The following illustrates the sequence of navigation through a unary operator for negation ("!").

|!x command:tab

!x command:tab

!x command:tab (navigate operand x)

command:tab

!x!

Figure 7G:
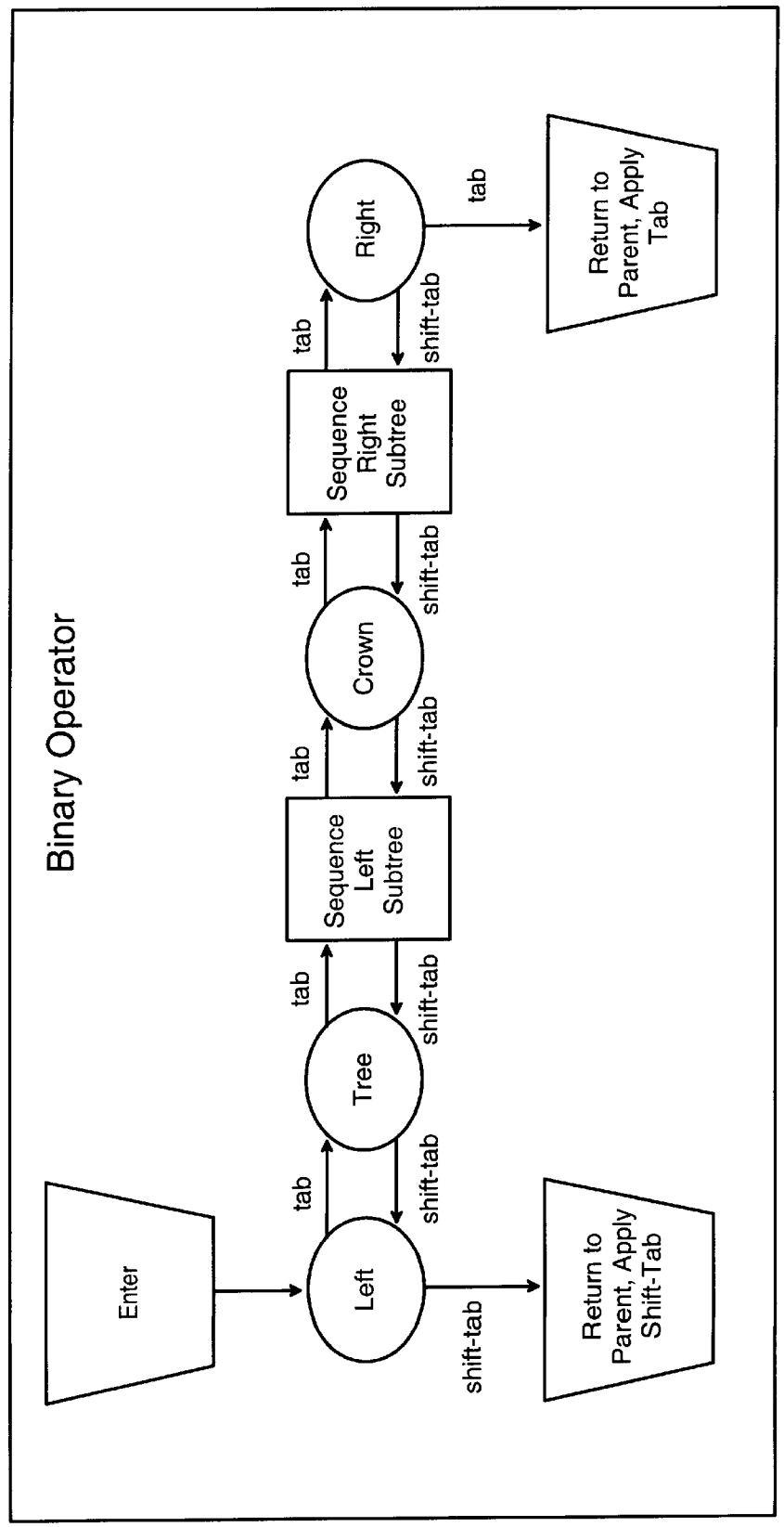
FIG. 7G represents a state diagram illustrating navigation of a binary operator.

FIG. 7G represents a state diagram illustrating navigation of a binary operator. The binary operator model is a generalization of the unary operator state diagram that adds processing for the second operand subtree between the crown selection and the right selection.

Figure 7H:
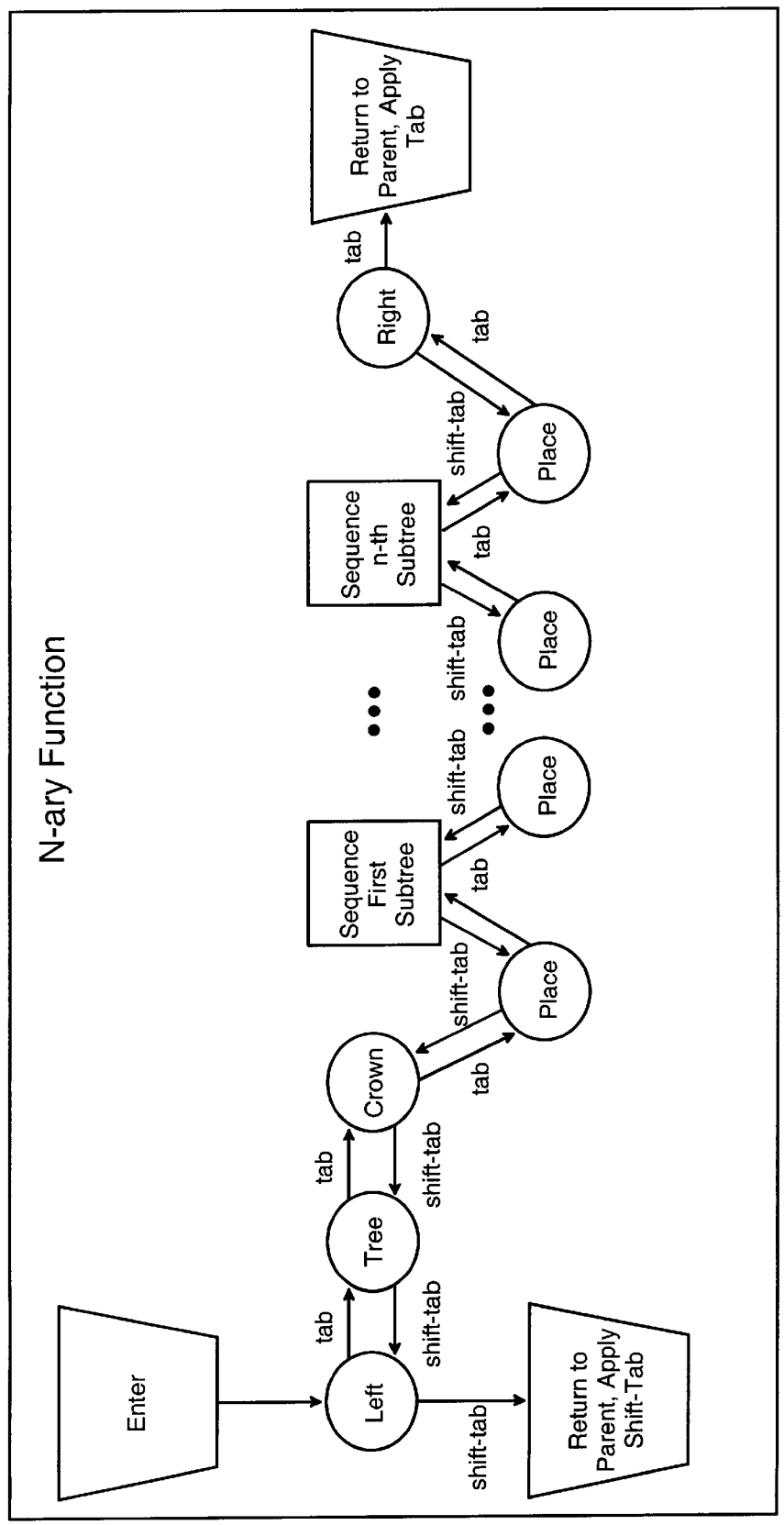
FIG. 7H represents a state diagram illustrating navigation through a function with more than two operands.

FIG. 7H represents a state diagram illustrating navigation through a function with more than two operands. The "place" ellipses indicate that an insertion point place selection exists between operands, thereby allowing for the insertion of additional operands.

Certain operators require a certain number or minimum number of operands. For example, the "+" operator requires two operands. When an "=" operator is being entered, the IP tree editor creates a "=" node with two operand nodes. If the operands have not yet been specified, then the IP tree editor set the operand nodes to "to be determined" (TBD), also referred to as "undefined," which is displayed as "???". For example, when entering the statement "A=B+3* (4-C)" the TBD identifier, "???", is displayed to represent undefined operand nodes. The following illustrates the entering of the statement.

A=???

A=B|

A=B+???

A=B+3|

A=B+3*???

A=B+3 *4|

A=B+3*(4-???)

A=B+3*(4-C|)

The above example illustrates a preferred default selection of a node and an insertion point performed by the IP tree editor during insertion of nodes into an IP tree. If, however, a user wishes to enter the statement "A=B+(3*4)-C", then the user would enter the nodes as above until the following is displayed.

A=B+3*4|

The user would then right select the expression whose top node is represented by the "*" operator to change the current selection, thereby producing the following.

A=B+3 4|

The user would then proceed with entering the "-C" as illustrated by the following.

A=B+(3*4)-|

A=B +(3 * 4)–C

During creation of an IP tree, there can be many undefined nodes. The IP tree editor maintains a "To-Do" list identifying these nodes. The "To-Do" list can be maintained in order of creation of the undefined nodes or other ordering. Before transforming an IP tree a programmer would typically ensure that all nodes on the "To-Do" list are defined. The use of undefined nodes ensures that the IP tree is correctly structured without forcing a programmer to always enter complete computational constructs. For example, a programmer could create a program tree corresponding to the following:

if (???)

???

else

B=1;

The "To-Do" list would contain an undefined node corresponding to the conditional part and the then-part of the if statement. The programmer could then edit other parts of the IP tree and later define these undefined nodes.

The program editor allows data to be pasted at the insertion point. The sources of the data are from the "Source Well," the clipboard, or other secondary source. The Source Well contains all local variables all types all computational constructs all globals all operators all procedures The contents of the Source Well changes as the insertion point changes to represent the data that can be appropriately inserted at the insertion point.

Certain primitive nodes which can be pasted into the IP tree are available via the execution of distinct commands in the command well. For example, "Paste +" will paste a "+" node. The vertical toolbar at the left of the program text area preferably lists these commands, organized into the following categories:

Statements, such as if, for, switch, goto, label, etc.

Arithmetic operations, such as +, − etc.

Assignment operations, such as =, +=, etc.

Relations, such as ==, >, etc.

Boolean and logical operations, such as &, &&, <<, etc.

Increments and Decrements

Data structure operations, such as &, *, >, [], etc.

Groupings and calls, for example {}, a(), specialization, etc.

The keyboard can be used for typing in program text. A substantial portion of keystroke and mouse event sequences are handled by the command keystroke mapping facilities of the IP tree editor. The IP tree editor divides keyboard input into tokens. Before the end of a token is reached, backspace may be used to edit the token and the token text is visible on the screen at the insertion point. Tokens are delimited by either:

A space or spaces

When special characters follow alpha or number characters, as in a +

When alpha or number characters follow special characters, as in+b

Some characters form a token by themselves and terminate what was before, for example, a semicolon There may be other escape conventions for tokens that include both alpha and special characters The tokens are then looked up in the various keymaps and a symbol list:

First, the token may be directly associated with a command in a keymap. For example, the token "if" may result in the execution of the "Paste if" command.

Next, the token is "looked up" by traversing the tree from the selection towards the root. The tokenizer searches for right operands of field selections in structure declarations. The tokenizer also searches local declarations in procedures, global declarations in modules, and declarations in the system libraries. The IP tree editor also preferably maintains a symbol list containing the names associated with the various declaration tree elements. The tokenizer can search this list for matching names. If token does not represent a unique name, the tokenizer can present the programmer with further identifying information to help the programmer identify the appropriate node with a non-unique name.

Thus, the IP tree editor will find the token "+", for example, as the name of an operation typically in a system library. The effect of this token will be to execute a "Paste +" command to paste a "+" operator node into the IP tree.

The IP tree editor also provides commands for expanding and collapsing the display representation of an IP tree. The display representation of an IP tree can be expanded and collapsed, in whole, or in part, in outline fashion. A collapsed element is identified by a gray bullet in the left margin. The following commands may be used to expand and collapse a display representation: expand all, expand next level, collapse all, and collapse next level.

Figure 8:
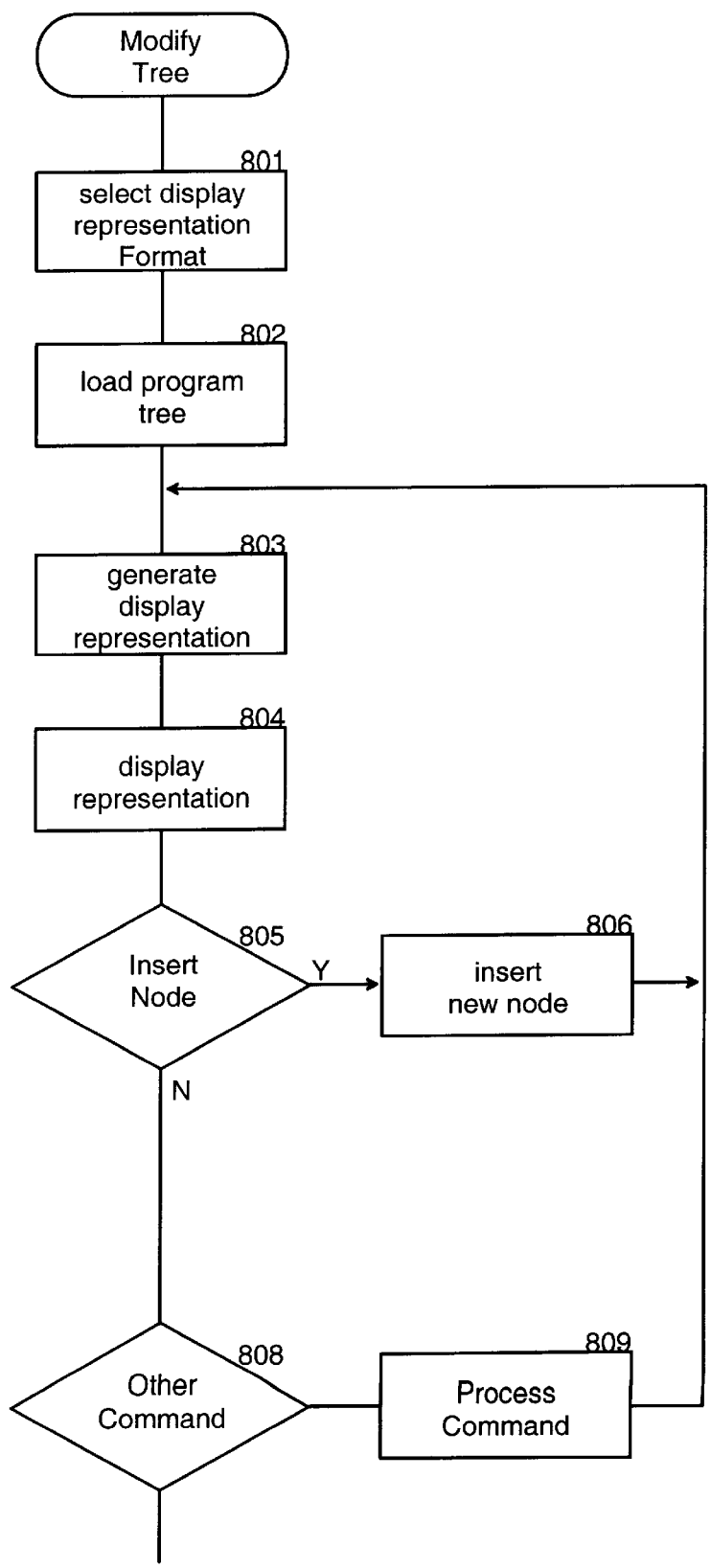
FIG. 8 is a flow diagram of the modify IP tree routine of the IP tree editor.

FIG. 8 is a flow diagram of the modify IP tree routine of the IP tree editor. In steps 801–806, the routine loads an IP tree, generates and displays a representation of the IP tree, and allows a programmer to insert nodes into the IP tree. In step 801, the routine allows the programmer to select an available display representation format. In a preferred embodiment, the user may select another display representation format at a later time, and the routine will instead use the newly selected format when displaying the IP tree.

In step 802, the routine loads an IP tree into memory in response to a command from the programmer. The IP tree that is loaded may have been stored by a previous invocation of the modify IP tree routine. The IP tree may also have been created in other ways, such as parsing conventional source code. The routine preferably can omit this step in order to construct an IP tree initially, rather than modifying an existing IP tree.

In step 803, the routine uses the selected representation format to generate a display representation of the IP tree. To generate a display representation, the routine traverses the IP tree in a depth-first manner and representing each node in the IP tree with text or graphics specified by the representation format. The use of graphics or bitmaps allows pictures to be used for operator, operand, and declaration names or pointers (directed arc) could be drawn to the corresponding declaration. For example, if a constant value represents an I-beam cursor, then an I-beam bitmap itself can be, used to represent the identifier of the constant. Also, there can be several representation formats (stored as properties) for a name. For example, a declaration tree element can have a short name and a long name. The programmer could display the IP tree using the short name, but when debugging a section that the programmer is unfamiliar with the programmer could display the long name (which are presumably more descriptive). Alternative names could also be stored in various foreign languages. The display representation generator is described below in detail.

In step 804, the routine displays the representation on the display device. The routine displays an insertion point indication at a position within the display representation that corresponds the insertion point. In a preferred embodiment, the routine preferably displays only a portion of long display representations, and allows the user to scroll within the display representation, causing the routine to display a different portion of the IP tree. The routine preferably generates in step 803 only as much of the display representation of the IP tree as is necessary to produce the displayed portion of IP tree.

In step 805, if the programmer wishes to insert a node, then the routine continues at step 806 to insert the node, else the routine returns. In step 806, the routine inserts a new node. A programmer inserts a new node by selecting a type of node to insert and a position in the IP tree at which to insert the node. The process of inserting a node is described in detail below. After step 806, the routine continues at step 803 to generate the display representation for the IP tree containing the inserted node, to display the generated representation, and to allow the programmer to insert further nodes. In step 808, if a command other than an insert node command is received (e.g., selection or re-position insertion point), then the routine processes the command in step 809 is and loops to step 803 to update the display device.

Figure 9:
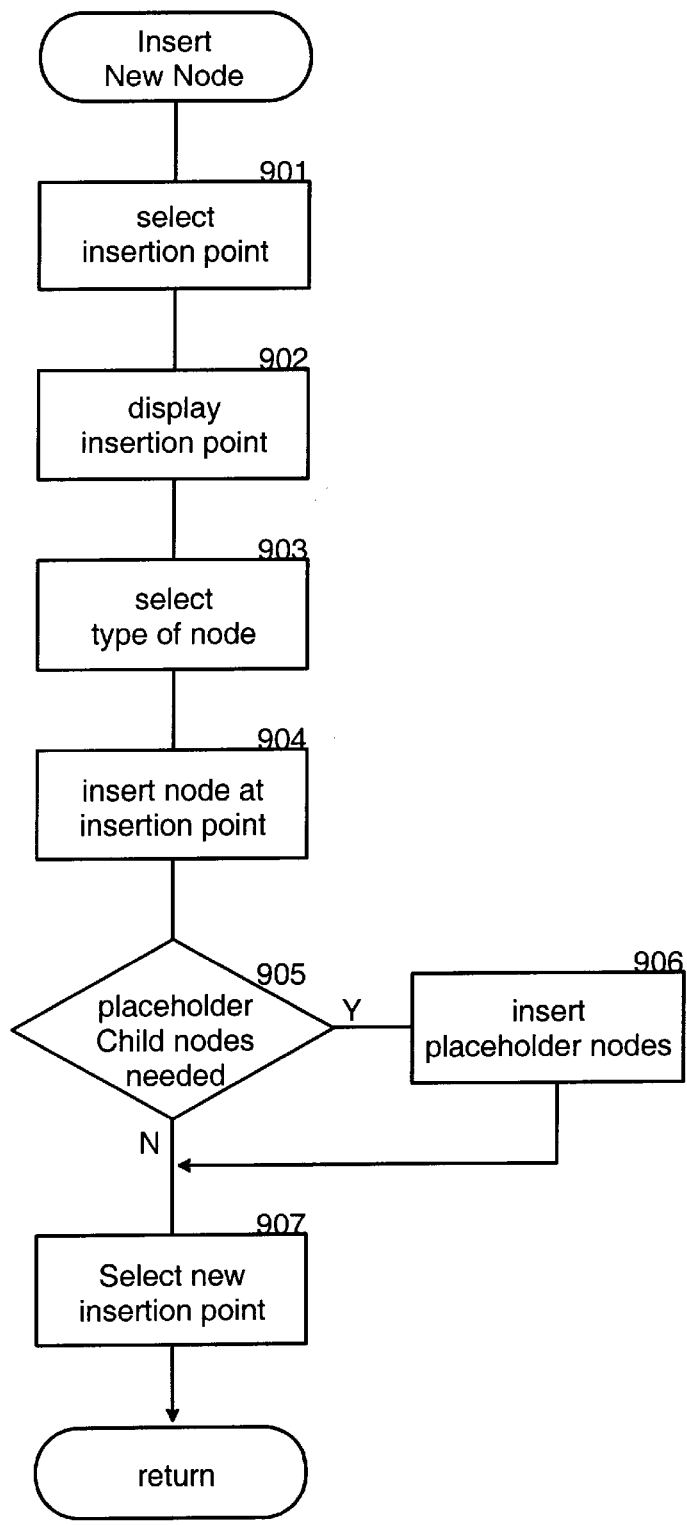
FIG. 9 is a flow diagram of the insert new node routine.

FIG. 9 is a flow diagram of the insert new node routine that shows step 806 in greater detail. In steps 901–907, the routine inserts a node of a type specified by the programmer at an insertion point, then inserts any placeholder nodes required by the new node, and selects a new insertion point.

In step 901, the routine allows the user to select an insertion point with reference to the display representation. In this step, the routine allows the programmer to select as the insertion point any position in the display representation that corresponds to either a node of the IP tree or a separation between nodes of the IP tree. The programmer may select the insertion point by pointing to the display representation using the pointing device. The programmer may also use the keyboard to select insertion point by pressing a combination of cursor positioning keys that moves the cursor to the insertion point within the display representation. The programmer may also use an insertion point positioning command provided by the IP system. These commands move the insertion point to a given position in the IP tree, either absolute or relative to the current position of the insertion point.

In step 903, the routine allows the programmer to select the type of node that should be inserted at the insertion point. In a preferred embodiment, the programmer uses the keyboard to enter a token corresponding to a paste command (e.g., "if" for the "paste if" command). Alternately, the routine displays a list of paste commands for available node types and allows the user to select one. The routine preferably specifies the types of nodes which may inserted as children of each node type. After the user has selected to paste a node type, the routine verifies that a node of the selected type may properly be inserted at the insertion point. This involves checking that a node of this type is a proper child of the node above the insertion point. If a node of the selected type may not properly be inserted at the insertion point, the routine preferably permits the programmer to choose another node type or insertion point.

In step 904, the routine inserts a node of the selected type into the IP tree at the insertion point. If the insertion point is at a node of the IP tree, then the routine replaces the node at the insertion point with the inserted node. On the other hand, if the insertion point is a separation between nodes of the IP tree, then the routine makes the inserted node a child of the node above the insertion point. If the insertion point is a crown select (e.g., of a "+"), the operator is replaced by the insertee (e.g., by a "*") and the operands remain unchanged. If the insertion point is a left (or right) selection, the inserted node becomes the operator of the new node, the selection extent becomes the last operand for a left (or the first operand for a right) selection, and any required (but as yet unspecified) arguments of the new operator are filled in by To-Do's (i.e., ???'s)

The IP system preferably specifies a minimum number of children for each type of node. In step 905, the routine checks to see how many children are required for a node of the selected type. If a node of the selected type requires more children than the inserted node presently has, then the routine continues at step 906 to insert nodes of a special type, called placeholder nodes, as children of the inserted node until the inserted node has the required number of children, else the routine continues at step 907.

In step 907, the routine selects a new insertion point. The routine selects the insertion point that the programmer is likely to select next. To this end, if the routine inserted any placeholder nodes in step 906, then the routine preferably selects one of the inserted placeholder nodes. If the routine selects the correct insertion point, then the programmer can skip the step of selecting the next insertion point and proceed directly to selecting the next type of node to insert.

The Command Well Editor

The command well editor controls configuration of the user interface of the IP tree editor. The IP system provides a command well that contains each command provided by the IP system. In a preferred embodiment, each command has associated with it a unique identifier and function for implementing the command. A preferred command well is described in U.S. Pat. No. 5,287,514, entitled "METHOD AND SYSTEM FOR CUSTOMIZING A USER INTERFACE IN A COMPUTER SYSTEM." The IP tree editor provides a user interface that includes a menu hierarchy, various toolbars, and various keymaps. The command well editor allows a programmer to customize the user interface. The command well editor allows a programmer specify the menu hierarchy. A programmer can specify the names of menu items and the corresponding command to perform when the menu item is selected. The user interface preferably includes an arbitrary number of toolbars that can be individually and optionally placed on any of the four borders of IP's main window (oriented horizontally or vertically) according to the user's preferences. The command well editor allows a programmer to specify which commands are to be included on the toolbars. Each command typically has a bitmap specifying a button for the toolbar. The user interface preferably includes an arbitrary number of keymaps that are chosen during the course of input based on the context of the current selection, e.g., a left margin keymap for when the mouse is over the left margin area of the window and a program text keymap for when the mouse is over the program text area of the window. The command well editor allows a programmer to specify the mapping of a key (or mouse event) or sequence of keys to commands. For example, a double click in the program text area may map to a command to select a node, whereas a double click in the left margin may map to a command to display a subtree. Also, if a programmer maps the letters "if" (the "if" token) to the "Paste if" command in the program text keymap, then when the programmer types "if" within the program text area the "Paste if" command is executed which causes a node to be inserted at the current insertion point.

FIG. 7D illustrates components of the user interface of the command well editor. The command well editor provides a list of all commands implemented by the IP tree editor. The command well editor allows a programmer to specify a bitmap associated with each command. The command well editor provides a category list box to allow the programmer to select which category of the user interface to customize. The menus category allows a programmer to customize the menu hierarchy. The toolbars category allows a programmer to customize the toolbars. The keys category allows a programmer to customize the keymaps.

The Display Representation Generator

The display representation generator receives requests from the IP tree editor to display representations of the IP tree on the display device. The display representation generator requests each node of the IP tree to display its representation based on the currently selected display representation format. The display representation generator uses a depth-first left-to-right traversal of the IP tree. Since not all IP computational constructs have a corresponding syntax in each programming language, the display representation generator generates a representation that, although not syntactically correct, conveys the semantics of the computational construct correctly.

Figure 10:
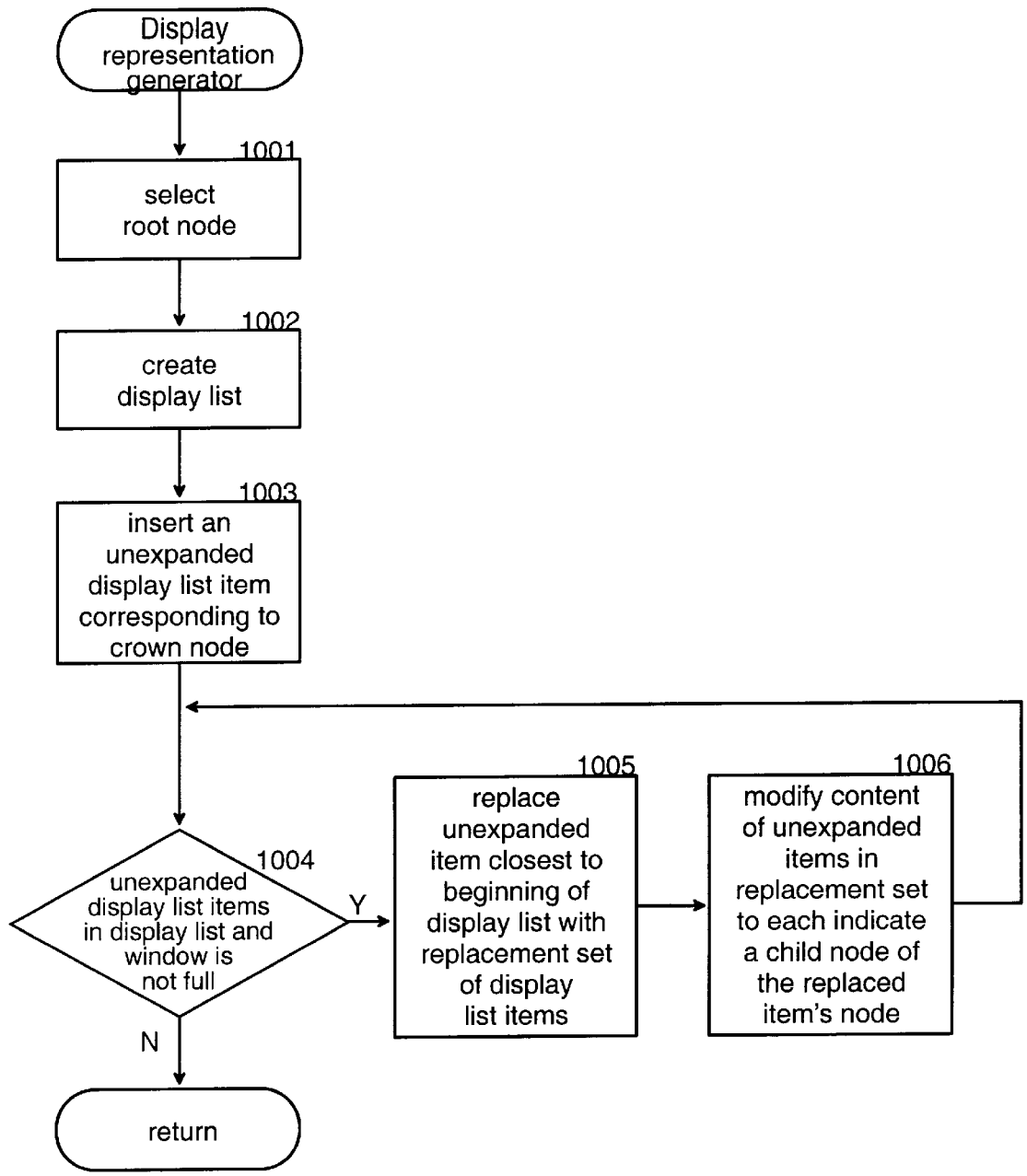
FIG. 10 is a flow diagram of the generate display representation routine.

FIG. 10 is a flow diagram of the generate display representation routine that shows step 803 in greater detail. One skilled in the art would appreciate that well-known techniques exist for displaying trees. In steps 1001–1006, the routine generates a display representation of the IP tree by traversing the IP tree in a depth-first, left-to-right manner and by generating the display representation for each node. In step 1001, the routine determines the portion of the IP tree for which to generate a display representation by selecting a subtree of the IP tree. A subtree is defined by a root display node, and contains the root display node and all of the descendants of the root display node. The routine preferably selects the root display node by moving up the tree from the insertion point until the current node defines a subtree whose display representation is likely to fill the space of the display device allocated for the display representation.

In step 1002, the routine creates a data structure called a display list. After the routine completely expands the display list, the routine uses it to display the representation. The display list is a linked list that contains display list items, each of which can either be unexpanded or expanded. Unexpanded display list items correspond to a node (within the subtree defined by the root display node) whose display representation details have not yet been computed. Expanded display list items, on the other hand, correspond to one of one or more pieces of the display representation details associated of the type of a particular node of the subtree. In step 1003, the routine inserts into the display list an unexpanded display list item corresponding to the root display node. In steps 1004–1006, the routine progressively expands the display list items until the display list is completely expanded.

In step 1004, if the display list contains unexpanded display list items and the display window is not yet full of displayed information, then the routine continues at step 1005, else the routine returns. In step 1005, the routine replaces the unexpanded display list item closest to the beginning of the display list with a replacement set of display list items specified by the selected representation format. Some of the display list items may be expanded and correspond to the actual display representation, while others may be unexpanded and correspond to nodes of the subtree that are children of the node to which the replaced display list entry corresponds. In step 1006, the routine modifies the content of the unexpanded display list items of the replacement set to each indicate a particular child node of the node to which the replaced display list entry corresponds.

Figure 11A:
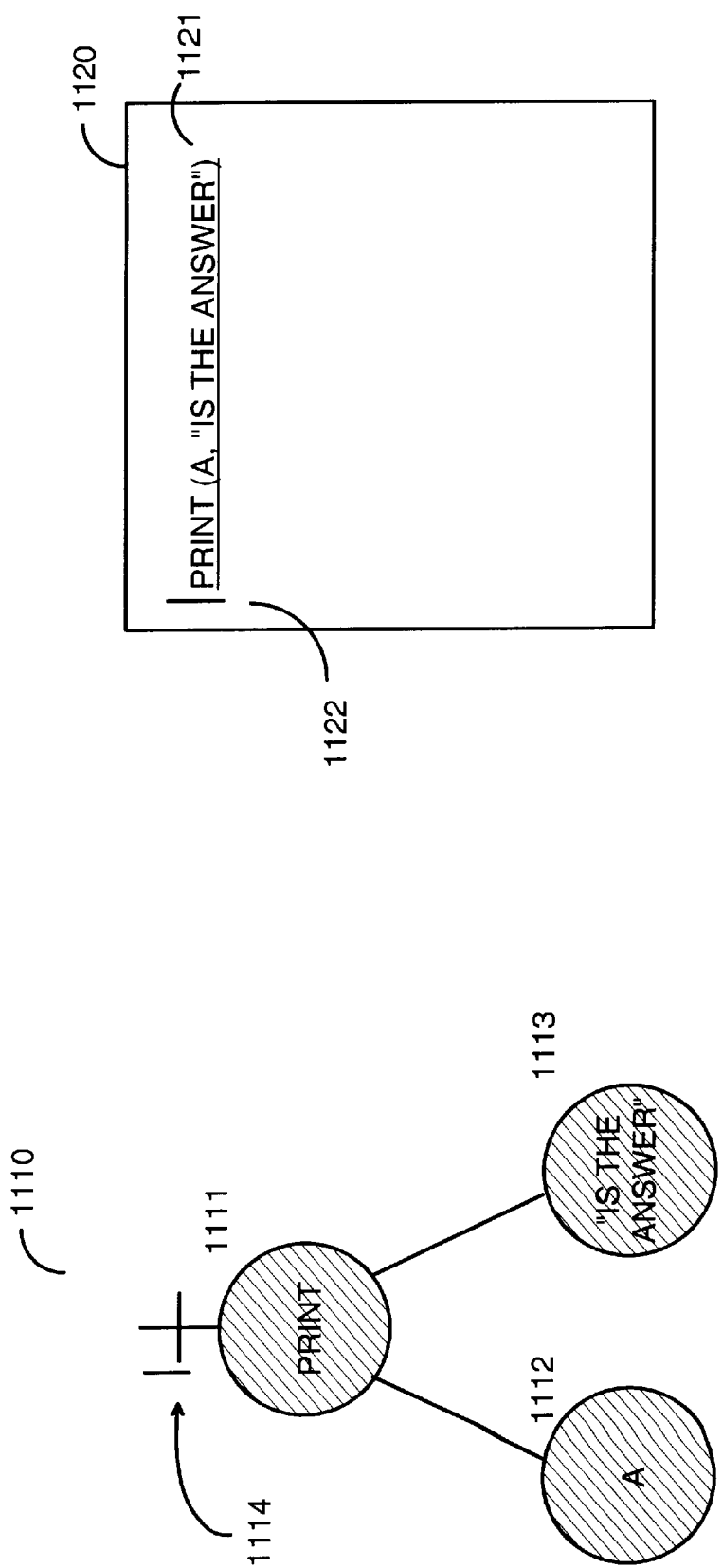
FIGS. 11A–11D are sample diagrams showing the contents of a subtree and the display representation at various times during the insertion of two new nodes into the subtree.

FIGS. 11A–11D are sample diagrams showing the contents of a subtree and the display representation at various times during the insertion of two new nodes into the subtree. FIG. 11A is a sample diagram showing the contents of the subtree and the display representation before any insertion has been performed. The subtree 1110 is defined by its root display node, a print node 1111, specifying a display operation. The print node is a child of another node, such as a grouping node, not shown. An "A" variable reference node 1112 and a "IS THE ANSWER" string node 1113 are children of the print node. The insertion point left selection 1114, shown as an "|_" symbol, is located on the line above the print node. The extent of the left selection, as indicated by the shading of the nodes, includes nodes 1111, 1112, and 1113. The display representation 1120 contains a line of text 1121 corresponding to the subtree. An insertion point left selection 1122 is shown as a vertical bar cursor positioned at the beginning of the line and an underscored indicating the extent of the selection.

Figure 11B:
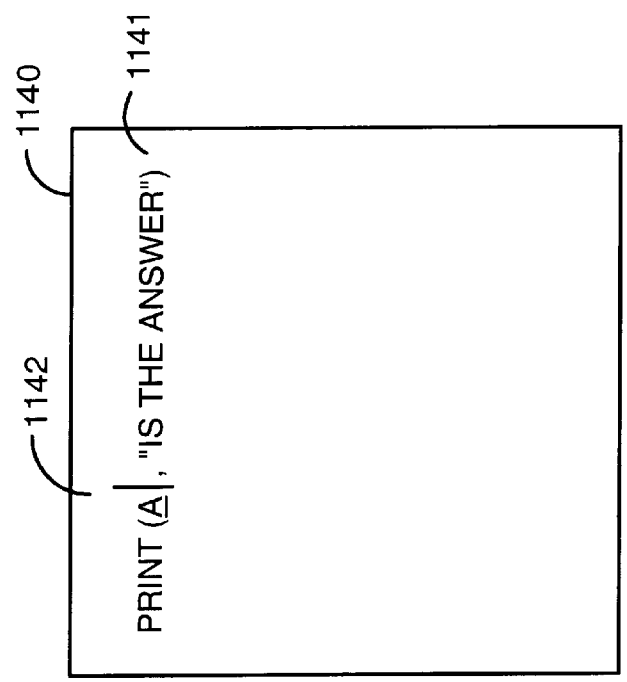
Figure 11B:
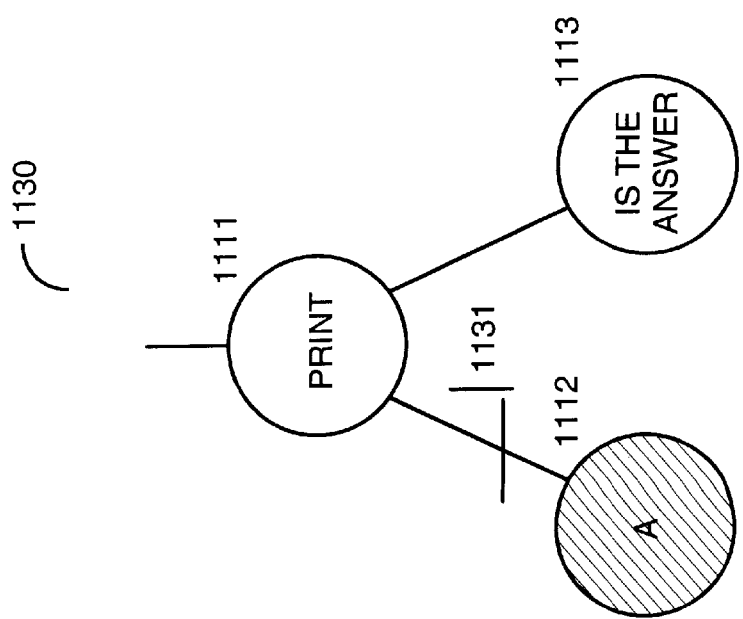

The programmer then moves the insertion point to between the characters "A" and "," in the display representation. The programmer moves the insertion point by either pointing to the new position with a pointing device, using cursor positioning keys to move the cursor to the new position, or using a move to child positioning command. FIG. 11B is a sample diagram showing the IP tree and the display representation after the IP tree editor has moved the insertion point 1131 to above the "A" variable reference node as a right selection of "A". The right selection insertion point 1131 is represented in the diagram as an "_|" on the line above the node 1112 and the extent of the selection is indicated by the shading of node 1112. On the display, insertion point right selection, item 1142, is now positioned between the "A" character and the character and the extent is indicated by the underscoring of "A".

Figure 11C:
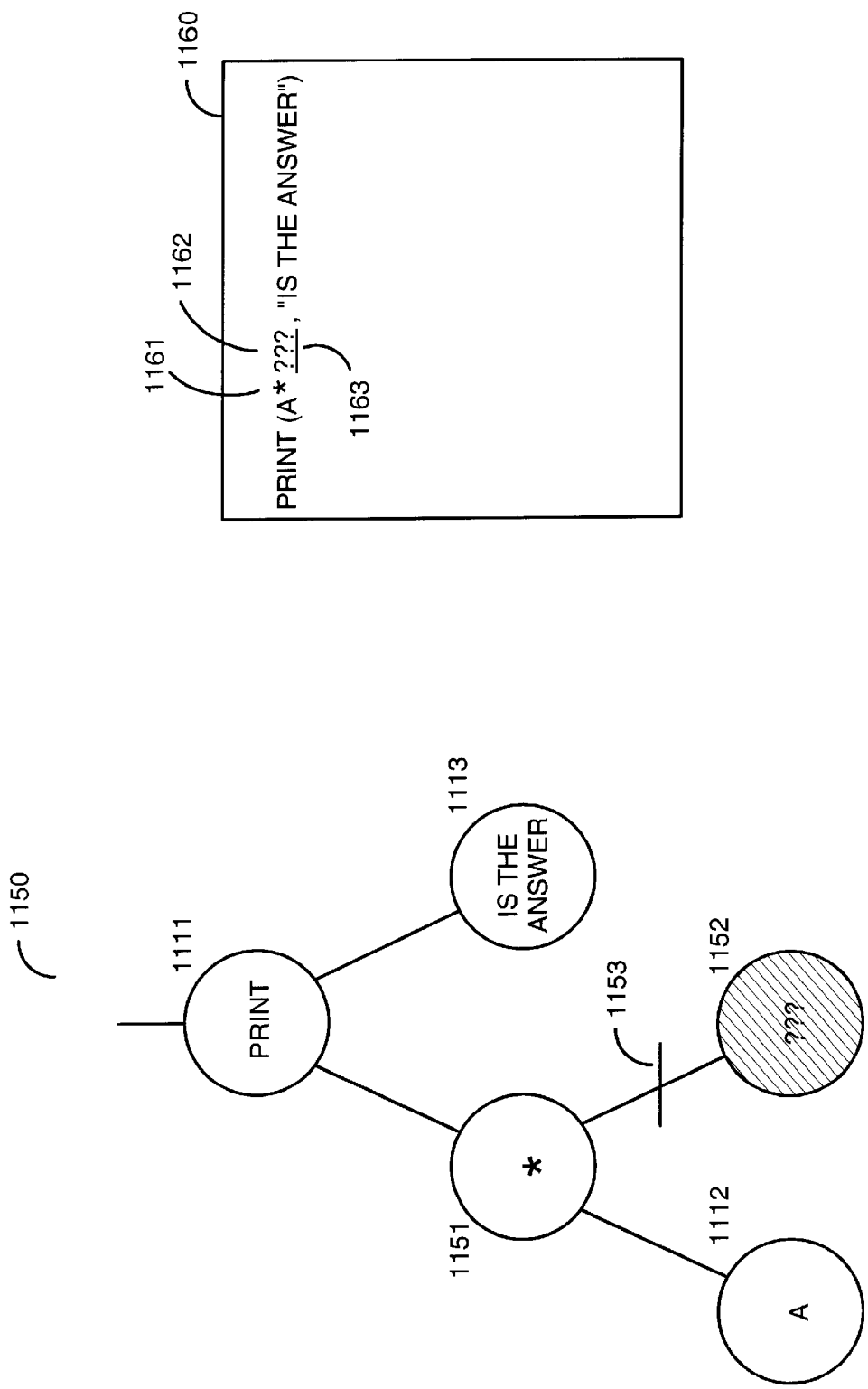

The programmer then selects the multiplication node type to insert (paste) at the current insertion point. FIG. 11C is a sample diagram showing the IP tree and the display representation after the IP tree editor has inserted a multiplication node as the parent of the "A" variable reference node. In the subtree, the IP tree editor has inserted a multiplication node 1151 as a parent of the "A" variable reference node. Because multiplication nodes require at least two children (as multiplication is a binary operation), the IP tree editor has also inserted a placeholder node 1152 as a second child of the new multiplication node. Because the user is likely to next insert a node to replace the placeholder node, the IP tree editor has moved the insertion point 1153 to the placeholder node as a tree selection. This tree selection insertion point 1153 is indicated by the horizontal bar on the line above node 1152. In the display representation, the IP tree editor has generated an asterisk as the display representation for the new multiplication node and question marks for the new placeholder node, and moved the tree selection insertion point 1163 to the question marks.

Figure 11D:
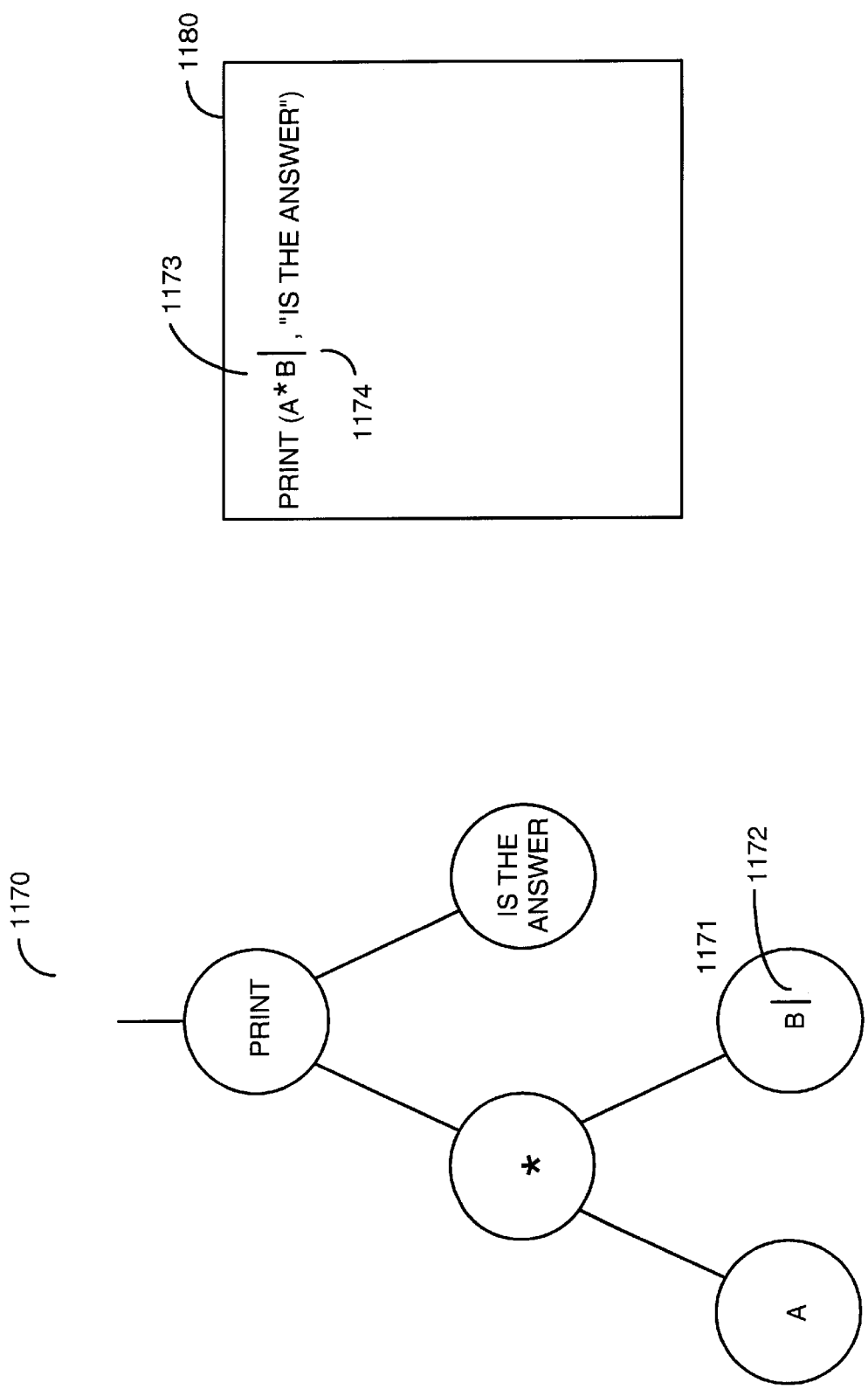

The programmer then selects the "B" variable reference node type to insert at the insertion point and inserts it. The "B" variable reference node may be selected and insert by typing it directly from the keyboard or via a copy and paste operation. FIG. 11D is a sample diagram showing of the IP tree and the display representation after the IP tree editor has inserted a "B" variable reference node as a child of the multiplication node. In the subtree, the IP tree editor has inserted a "B" variable reference node 1171 to replace the placeholder node. If "B" is entered via the keyboard, then IP editor will place the insertion point to just after "B" and leave the user in interpreted selection mode in anticipation that the expression may be extended by the user. This situation is illustrated in FIG. 11D by the vertical cursor bar 1172 shown just after the "B" in node 1171. In the display, item 1180, the interpreted selection insertion point is shown as a vertical cursor bar, item 1174, with no explicit extent indication.

Figure 12A:
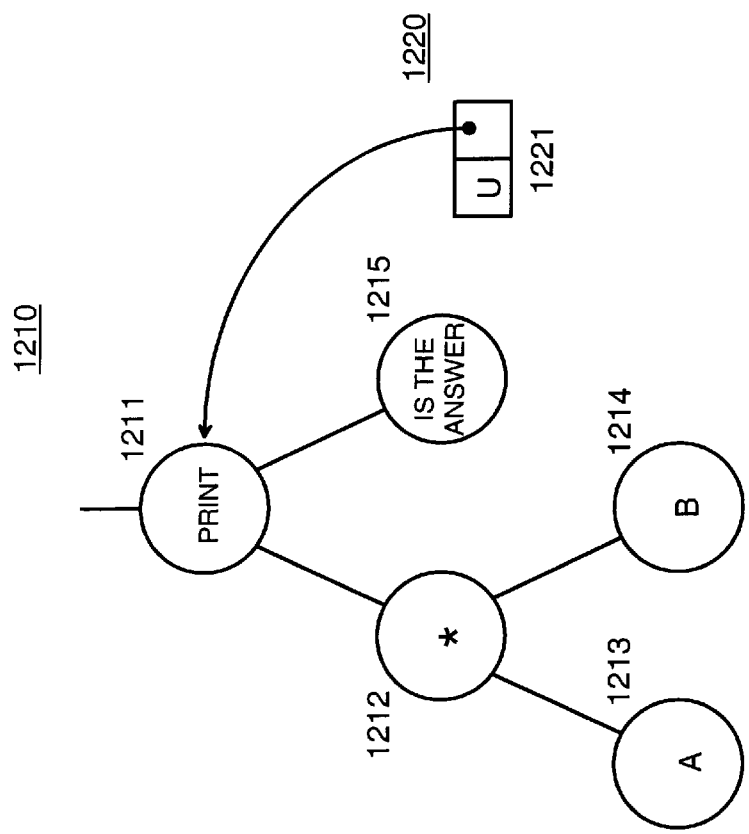
FIGS. 12A–12F show the execution of the generate display representation routine to produce the display representation shown in FIG. 11D.

To produce each display representation in FIGS. 11A–11D, the IP system executes the generate display representation routine. FIGS. 12A–12F show the execution of the generate display representation routine to produce the display representation 1180 shown in FIG. 11D. FIG. 12A is a diagram of the display list at the beginning of the generation of a display representation. The subtree 1210 has nodes 1211–1215. The display list 1220 has a single display list entry 1221. Display list entry 1221 is unexpanded, as shown by the character "U" inside the display list entry, and its content indicator indicates the print node 1211.

Figure 12B:
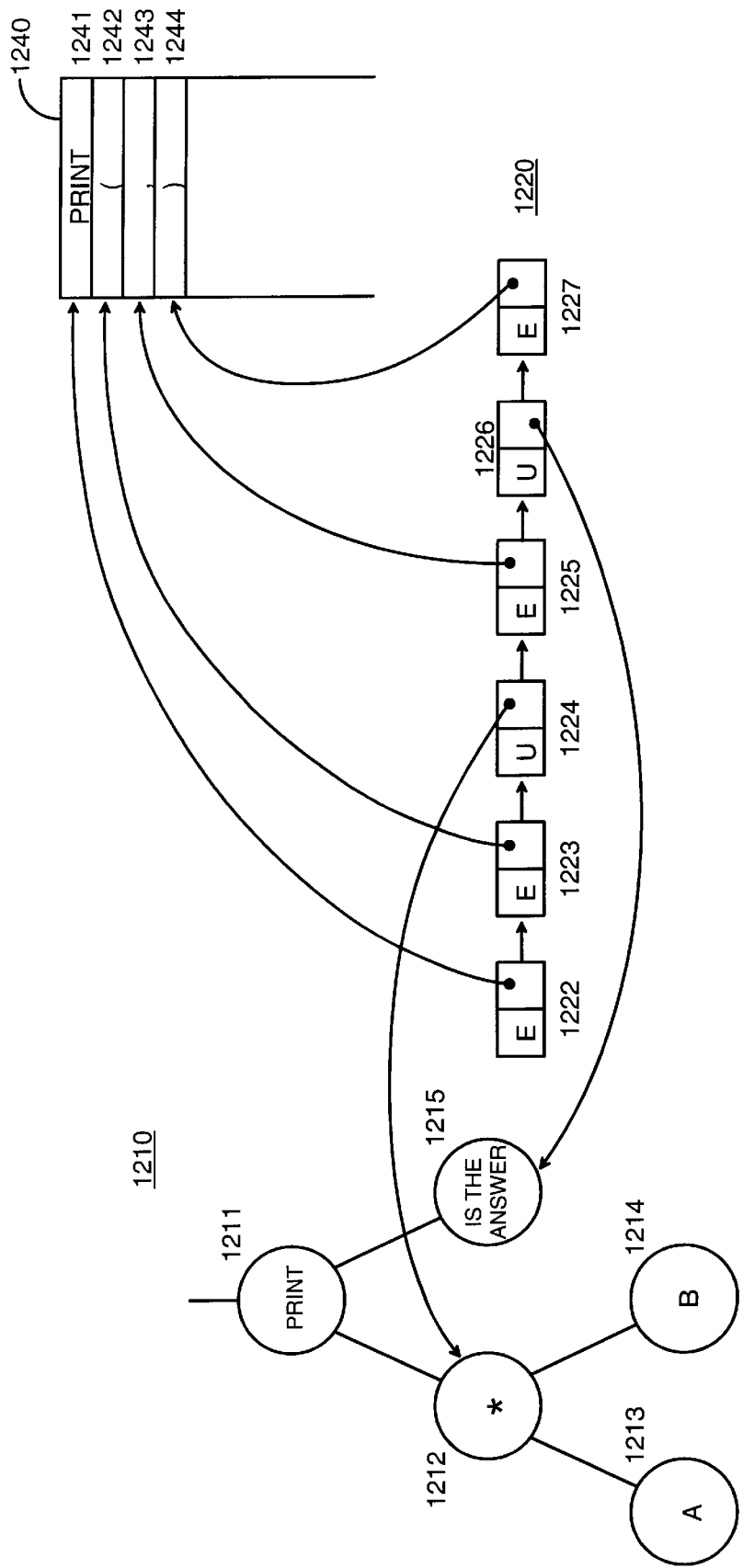

FIG. 12B is a diagram of the display list showing the expansion of display list entry 1221. The display list has display list items 1222–1227. These display list entries are those in the replacement set for print nodes of the display representation format of the Basic language. The diagram also shows a string table 1240 having entries 1241–1244. Display list entry 1222 is expanded, and its content indicator indicates the "PRINT" string 1241. When display list entry 1222 is displayed, the "PRINT" string will be displayed. Display list entries 1223, 1225, and 1227 are also expanded, and their content indicators also each indicate a string that will be displayed when the display list is displayed. Display list entry 1224 is unexpanded, and its content indicator indicates the multiplication node 1212. Display list entry 1226 is similarly unexpanded, and its content indicator indicates the "IS THE ANSWER" string node 1215. The unexpanded nodes will be expanded further.

Figure 12C:
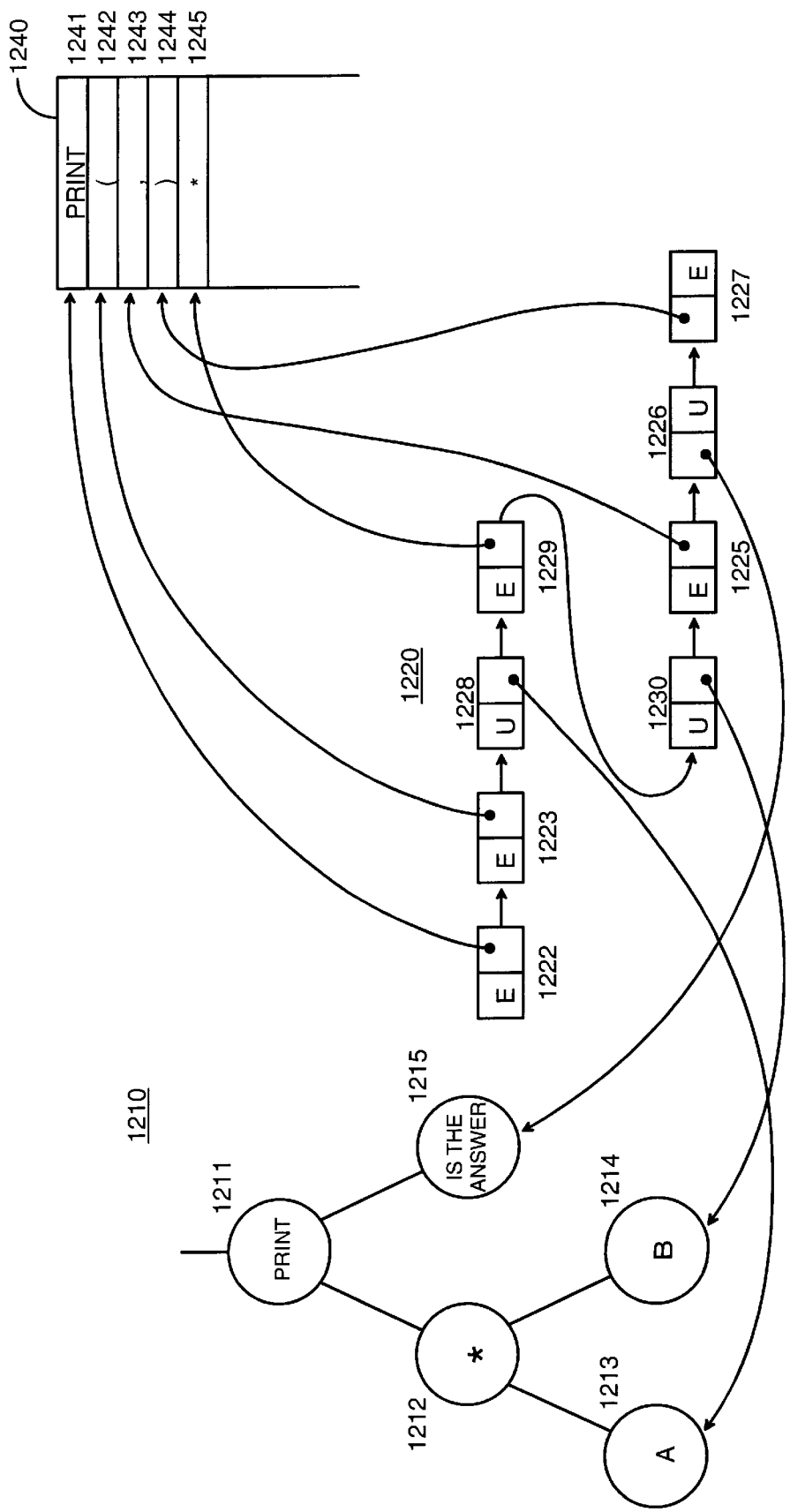

FIG. 12C is a diagram of the display list showing the expansion of display list entry 1224. The IP system selects display list entry 1224 to expand because it is the first unexpanded display list entry in the display list. Display list entry 1224 has been expanded into display list items 1228–1230. Display list entry 1228 is unexpanded, and its content indicator indicates the "A" variable reference node 1213. Display list entry 1229 is expanded, and its content indicator indicates a "*" string 1241. Display list entry 1224 is unexpanded, and its content indicator indicates the B variable reference node 1214.

Figure 12D:
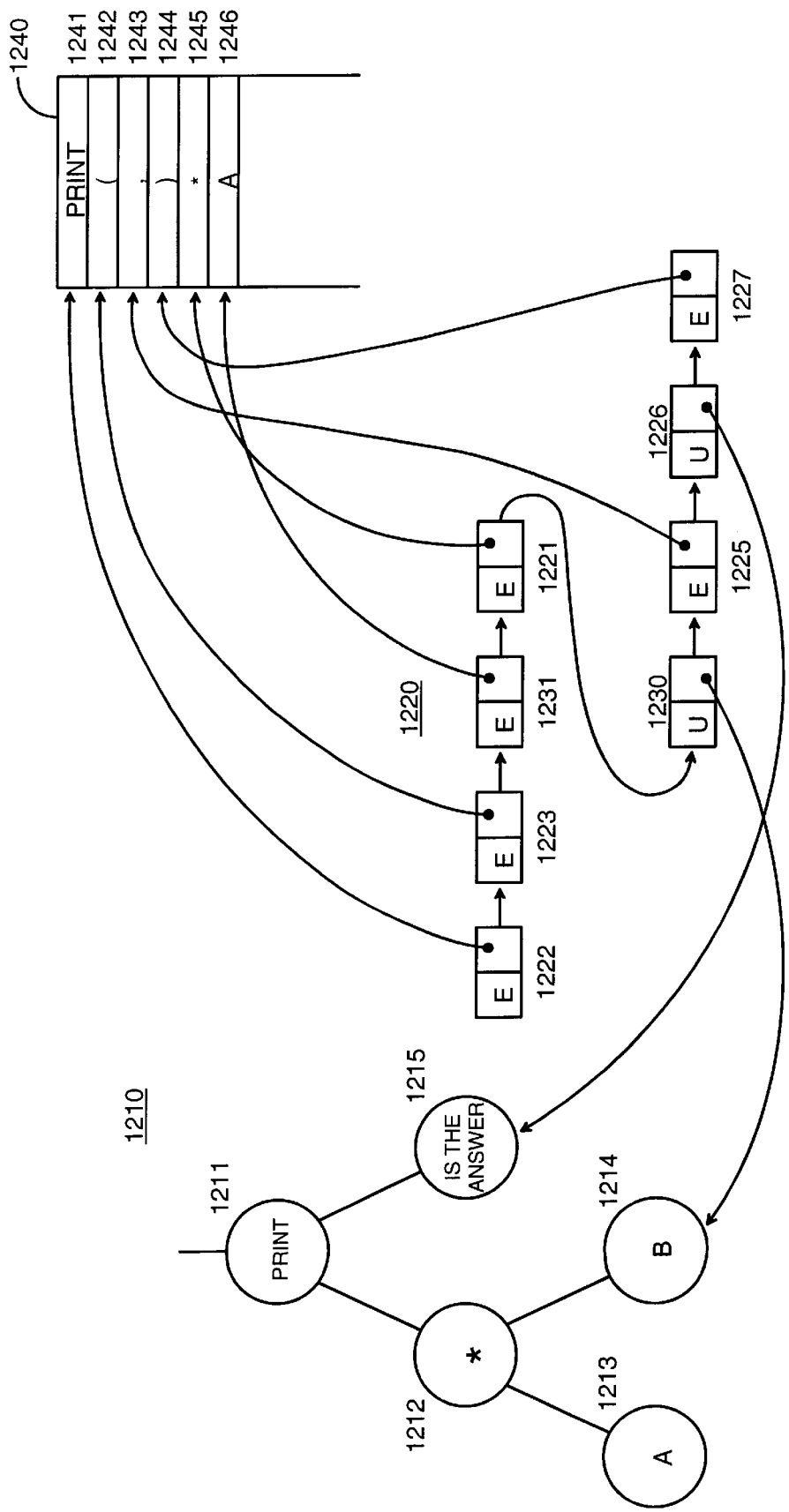
Figure 12E:
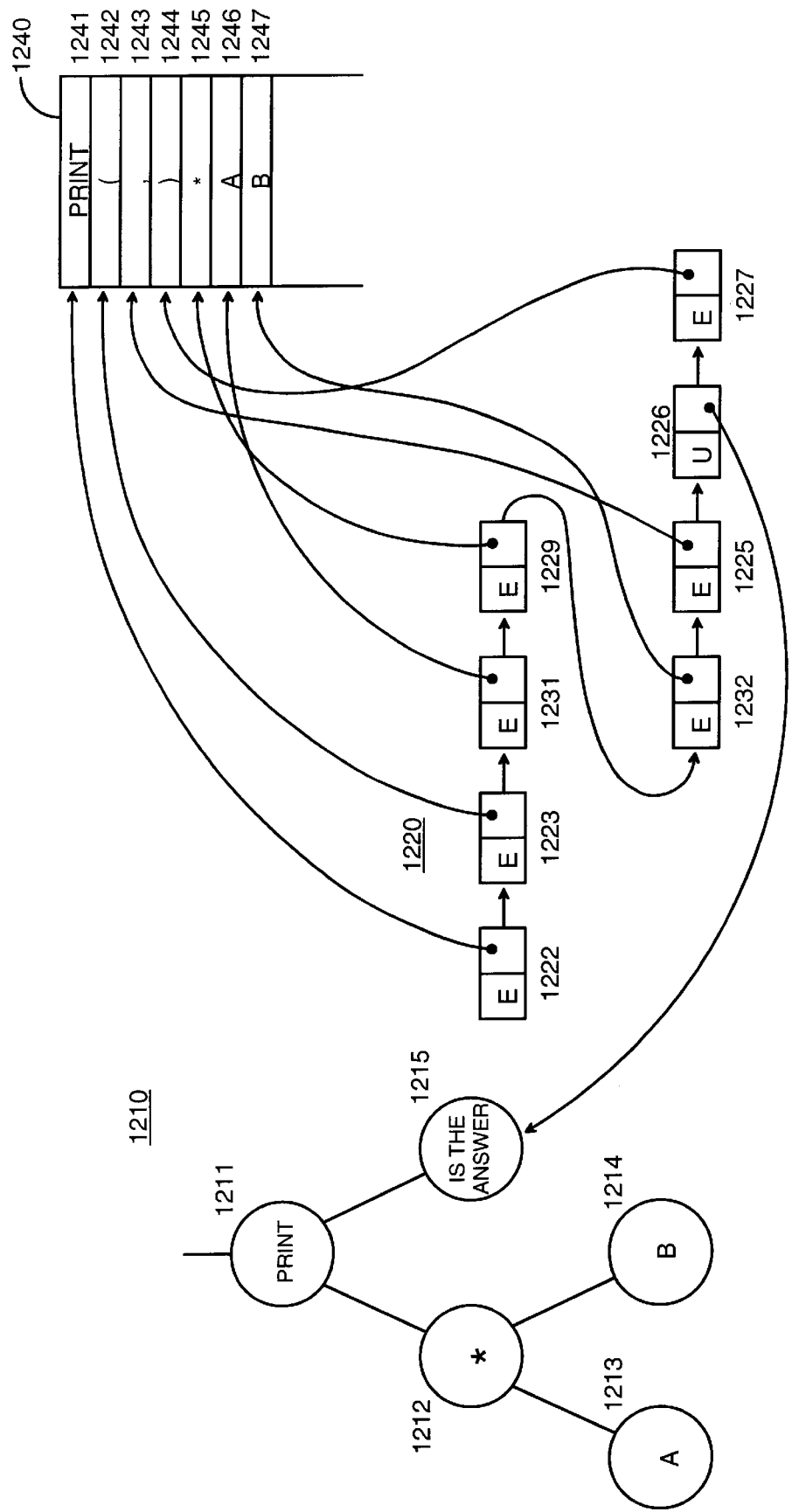
Figure 12F:
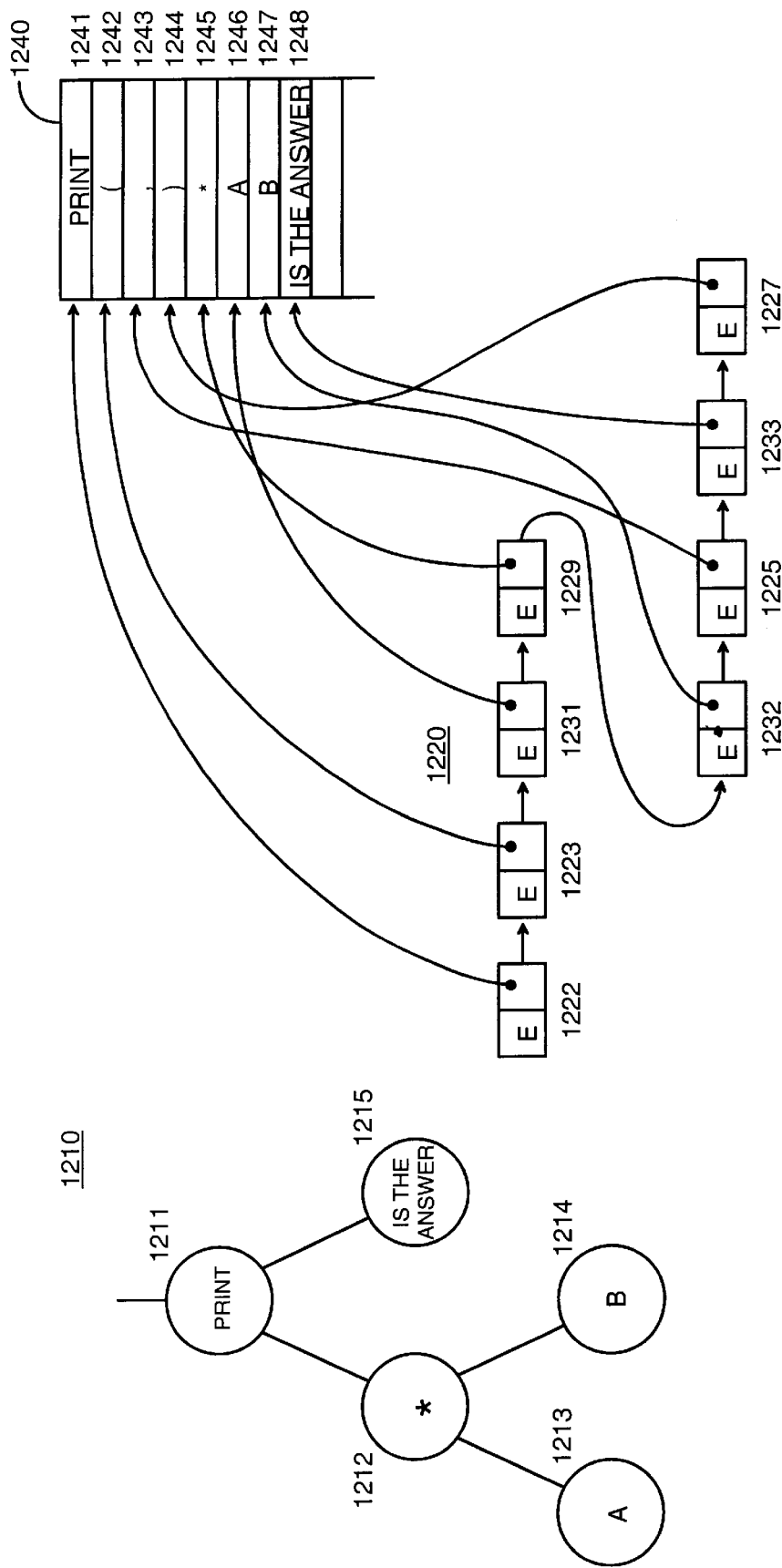

FIGS. 12D–12F are diagrams of the display list showing the expansion of display list entries 1226, 1228, and 1230. In FIG. 12F, the display list is fully expanded. The IP system displays the fully expanded display list to display the unparsed text as shown in FIG. 11D by traversing the display list from beginning to end, displaying the text of the string indicated by the content indicator of each display list entry.

The Reducer

In a preferred embodiment, the reduction of an IP tree occurs in two phases: markup and transform. The markup phase is a preprocessing phase that traverses the IP tree and generates data to facilitate the transform phase. For example, the markup phase may determine that a polymorphic operator "+" should be replaced with a floating point addition operator during the transform phase. During markup phase, data that indicates the polymorphic operator is to be replaced by a floating point addition is stored in the tree element. During the transform phase, the data is checked and the operator is replaced. During the markup phase, the structure of the IP tree is not modified. Rather, additional tree components (called annotations) are added to existing tree elements. In this way, markup phase can be performed concurrently (in the background) with the data entry of an IP tree. While the tree is marked up in a pass that precedes the tree transformation phase, there are situations where new, interim subtrees are created in the course of reduction and these new subtrees are marked up before tree transformation resumes. Marking up the newly created subtrees sets them up for further reduction. This strategy allows the tree to be reduced in a series of simple transformations each of which produces a somewhat simpler version of the tree and eventually leads to a machine level RP tree that can be turned directly into machine code. An example of interleaving transformation and markup is provided by the Average enzyme described later.

The markup phase performs operations, such as, (1) simplifying expressions (e.g., "2+3" becomes "5");

(2) matching actual arguments with formal arguments and indicating any necessary type conversions or type errors;

(3) matching types of variable (e.g., for assignments); and (4) determining which function should be used to transform the subtree.

During the markup phase, various match functions can be invoked to determine which reduction enzyme should be used. An indication of the reduction enzyme is stored in the tree elements so that the reduction enzyme can be invoked during the transform phase.

After the markup pass over the tree, the IP Reducer receives a copy of marked up IP tree (i.e., a tree whose nodes have been annotated with markup information as described above) and a set of reduction enzymes and uses the reduction enzymes to reduce (i.e., to transform) the IP tree to an RP tree. In one embodiment, the reduction enzymes are stored as an array of enzymes. Each reduction enzyme has a Match function and an Xform function. The Match function is passed a pointer to a tree element and returns and indication as to whether the Xform function should be performed on the passed tree element. The Xform function reduces the passed tree element. Each IP computational construct has one or more reduction enzymes. Each reduction enzyme may have been itself an IP tree that was reduced and compiled. During bootstrapping of the IP system, an initial set of reduction enzymes is developed using conventional programming techniques. However, once bootstrapping is complete, these initial enzymes are preferably replaced with enzymes developed with the IP system. (Display enzymes are developed in a similar manner.)

The IP system starts the reduction process by invoking the ProcessTE function passing the root tree element of a copy of the IP tree. The ProcessTE function loops invoking each Match function checking for a match and, when a match is found, invokes the corresponding Xform function. The Xform function typically replaces the pointer to the tree element it is passed with a pointer to a tree element that is the root of a reduced subtree and then recursively invokes the ProcessTE function to processes the reduced subtree. For example, the Xform function for the _List IP computational construct recursively invokes the ProcessTE function each tree element pointed to by an operand tree component. When an Xform function has completed the reduction of the subtree that was passed to it, it returns the resultant (transformed) subtree which will be used by the calling function to replace one of the operands in its subtree, thereby completing one of the steps in transforming its subtree.

Code table 1 contains pseudo-code for the ProcessTE function. The ProcessTE function is passed a pointer to a tree element that is the root of an IP subtree and returns a pointer to a tree element that is the root of RP (i.e., transformed) subtree for the IP subtree. Before the tree is transformed, ProcessTE function checks to see if the subtree is a new subtree that was created in the course of previous reduction and if so, the new subtree is marked up before tree transformation resumes. Then, the ProcessTE function loops through the reduction enzymes invoking the Match function until a match is found for the passed tree element and then invokes the Xform function for the enzyme. One skilled in the art would appreciate that various search techniques could be used to optimize the search for a match.

| Code Table 1 |
|---|

```
ProcessTE(pTE)
    if pTE is newly created and not marked up
        Markup(pTE)
    for i=1,cEnzyme
        if (Enzyme[i].Match(pTE))
            Return results of Enzyme[i].Xform(pTE)
    endfor
```

Code Tables 2–8 contain pseudo-code for sample enzymes. Code Table 2 contains pseudo-code for the _Module IP computational construct. The Xform function recursively invokes the. ProcessTE function passing the pointer in the operand[1] tree component, which points to a list of all of the functions or other modules within the starting module. Upon completion of its computation, the recursively called ProcessTE function returns a pointer to a new list which is the reduce form of all of the functions and modules within the subtree of operand[1]. The returned pointer is used to replace operand[1] and pTE, which now points to the newly reduced subtree, is returned.

Code Table 3 contains pseudo-code for the __List computational construct. The Xform function recursively invokes the ProcessTE function for each operand tree component passing the pointer in the operand tree component, and uses the result as a replacement for the corresponding operand field.

Code Table 2

```
Enzyme.__Module
Match(pTE)
    return    (pTE→tcOp==__DCL && pTE→tcOpnd[0]==__Module)
Xform(pTE)
    Replace pTE→tcOpnd[1] with result of
    ProcessTE(pTE→tcOpnd[1])
    Return pTE
```

Code Table 3

```
Enzyme.__List
Match(pTE)
    return (pTE→tcOp== reference to DCL of __List)
Xform(pTE)
    for each tcOpnd[i] in pTE,
        Replace pTE→tcOpnd[i] with results of ProcessTE(pTE→tcOpnd[i])
    Return pTE
```

Code Table 4 contains pseudo-code for the assignment ("=") computational construct. The Xform function recursively invokes the ProcessTE function for the operand[0] and operand[1] tree components passing the pointer in the operand tree components. The enzyme replaces the generic assignment operator "=" with the appropriate machine level assignment based on the markup on the operator. (The markup pass, which precedes the tree transformation pass that is being described here, recursively processes the types of the operands and marks them up in order to derive the appropriate markup for the operator. Hence, the markup on the operator is, in effect, inferred from the types of the operands.) The subtree for each operand is reduced and the operand field is replaced by the corresponding result. The pTE pointer to the transformed subtree is then returned.

Code Table 4

```
Enzyme.=
Match(pTE)
    return (pTE→tcOp== reference to the DCL of "=")
Xform(pTE)
    if markup on operator specifies half word.
        replace pTE→tcOp with half word assignment operator,
    else if markup on operator specifies full word,
        replace pTE→tcOp with full word assignment operator,
    else if markup on operands specifies double word,
        replace pTE→tcOp with double word assignment operator,
    Replace pTE→tcOpnd[0] with result of ProcessTE(pTE→tcOpnd[0])
    Replace pTE→tcOpnd[1] with results of ProcessTE(pTE→tcOpnd[1])
    Return pTE
```

Code Table 5 contains pseudo-code for the addition ("+") computational construct. The Xform function recursively invokes the ProcessTE function for the operand[0] and operand[1] tree components passing the pointer in the operand tree components. Analogous to the assignment operator replacement, this Xform function replaces the generic addition operator "+" with the appropriate machine level addition operator based on the markup on the operator. Then the operand's subtrees are recursively reduced and the operand fields are replaced by the result. The pTE pointer to the transformed subtree is then returned.

Code Table 5

```
Enzyme.+
Match(pTE)
    return    (pTE→tcOp== reference to the DCL of "+")
Xform(pTE)
    if markup on operator specifies integer,
        replace pTE→tcOp with integer + operator,
    else if markup on operator specifies real,
        replace pTE→tcOp with real + operator,
    Replace pTE→tcOpnd[0] with results of ProcessTE(pTE→tcOpnd[0])
    Replace pTE→tcOpnd[1] with results of ProcessTE(pTE→tcOpnd[1])
    Return pTE
```

Code Table 6 contains pseudo-code for the "Average" enzyme, which transforms an expression such as "Average (3.4,2.8,1.5)" (as shown in FIG. 1A) into the simpler, prefix form that uses only binary operators, "divide(add(add(3.4, 2.8),1.5),3)" (as shown in FIG. 1B, in the pseudo code, the shorthand for the "divide" operator is "/" and for the "add" operator is "+"). The Xform function creates sufficient new tree elements with the binary "+" (or add) operator to arrive at a total of the values to be averaged, which are pointed to by the operand tree elements. The Xform function then creates an expression tree element with the "/" (or divide) operator with an operand[0] tree component that points to a tree element representing the total and an operand[1] tree component that points to a tree element representing the number of values to be averaged. Because each value to be averaged is not necessarily a constant value (i.e., it may be an expression requiring further reduction), the Xform function invokes the ProcessTE function for each operand tree component in the passed tree element. Also, the Xform function recursively invokes the ProcessTE function passing the tree element with the "/" operator to check whether an enzyme has be defined for the "/" operator that would further reduce it. (Since this is a newly created subtree, the ProcessTE function will call the mark up routine to mark it up before transformation resumes. This annotates the divide and add operators so that they can be further reduced to machine level operators (to floating point operations in this case).) This recursive invocation of the ProcessTE function will transform the divide ("/") and add ("+") operators to the appropriate machine level operations in the same way that Code Table 5 reduced the add ("+") operator. Code Table 5 is the specific enzyme that reduces the add ("+") operators in this subtree. The pTE pointer to the transformed subtree is then returned.

Code Table 6

```
Enzyme.Average
Match(pTE)
    return    (pTE→tcOp== reference to the DCL of Average)
Xform(pTE)
    pTEleft = pTE→tcOpnd[0]
    pTEleft = ProcessTE(pTEleft)
    for each tcOpnd[i] of pTE not yet processed
        pTEright = pTE→tcOpnd[i]
        pTEright = ProcessTE(pTEright)
        pTEadd = new(TE)
        pTEadd→tcOp = reference to DCL of +
```

-continued

Code Table 6

```
    pTEadd→tcOpnd[0] = pTEleft
    pTEadd→tcOpnd[1] = pTEright
    pTEleft=pTEadd
pTE1=new(TE)
pTE1→tcOp =reference to DCL of /
pTE1→tcOpnd[0] = pTEleft
pTE1→tcOpnd[1] = pTE2= new(TE)
    pTE2→tcConst = number of operands in pTE
    pTE2→tcOp = reference to DCL of_CConstant
pTEl=ProcessTE(pTE1)
pTE=pTE1
Return pTE
```

The IP system, in addition to providing predefined IP computational constructs, allows a programmer to define and add new IP computational constructs. To add an IP computational construct, a programmer needs to create a display enzyme and a reduction enzyme and then register the enzymes with the IP system. Once the enzymes are registered, the programmer can then use the new IP computational construct when creating an intentional program.

One such IP computational construct that a programmer may want to add is the "forall" computational construct. The "forall" construct is used to specify execution of a statement (typically a compound statement) once for each element in a collection. In addition to defining the "forall" construct, the programmer defines the "collection" construct, which is a generic data holder that has no a priori commitment to an implementation, such as an array implementation or a linked list implementation or some other implementation.

The following statements represent a display of a declaration of the variable "coll" as a type of collection and a display of a statement in which the "forall" construct is used to process each element in the collection "coll."

Collection(int) coll attrib:ArrayCollection();

forall (x, coll)

{bar(x)}

The term "Collection(int)" in the declaration identifies the type of the variable "coil." That is, the variable "coil" is declared to be of a type that is a collection of integers. The term "attrib:ArrayCollection()" is a an annotation that is added by the programmer once an implementation form is decided upon and it indicates the kind of implementation the programmer desires (an array implementation in this example). In this annotation, the programmer indicates that the variable "coll" is to be implemented as an array. The "forall" statement has three operands: the index variable ("x"), the collection variable ("coil"), and the statement to execute for each element in the collection.

Figure 13:
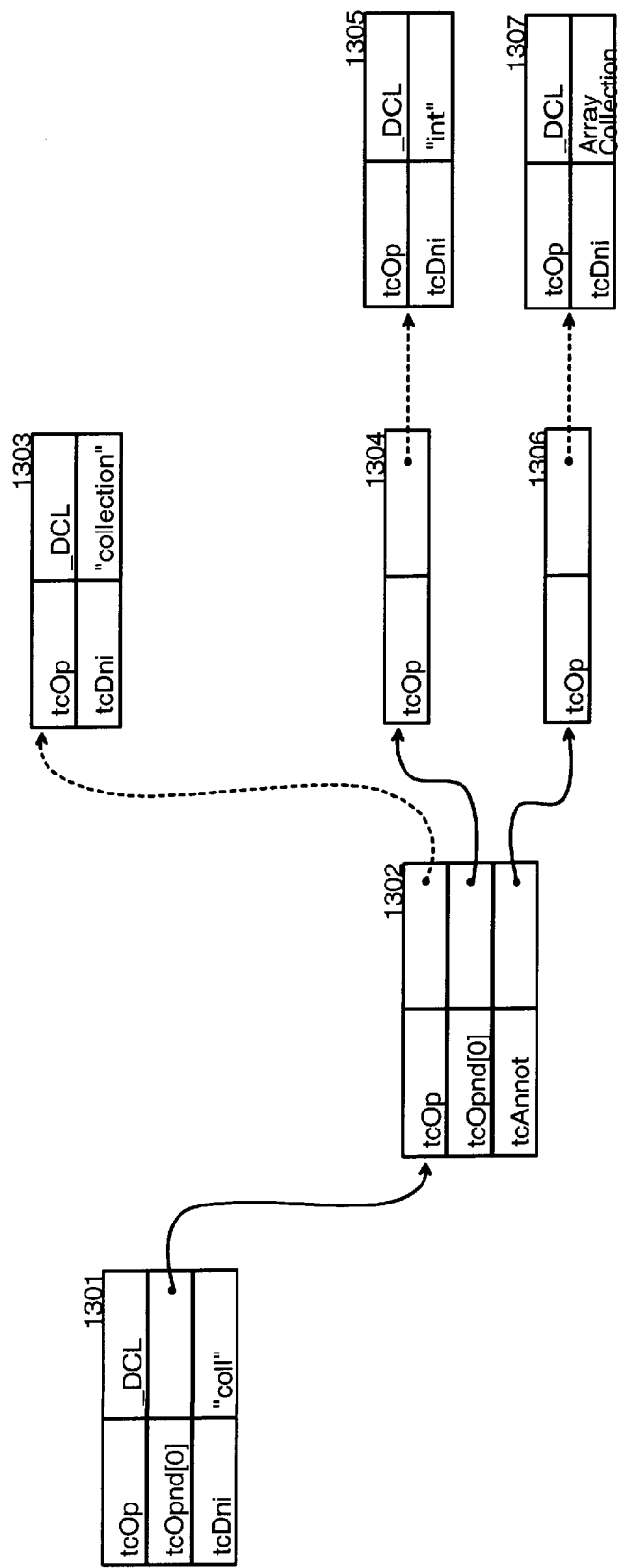
FIG. 13 shows an IP subtree corresponding to the declaration statement for the variable "coll."

FIG. 13 shows an IP subtree corresponding to the declaration statement for the variable "coll." The declaration tree element 1301 contains an operator tree component that indicates that the operator is a declaration, an operand tree component that points to tree element 1302, and a name tree component that contains the name of the variable "coil." The tree element 1302 contains an operator tree component that points to the declaration tree element 1303 for a "collection," an operand tree component points to tree element 1304 corresponding to the type of the collection, and optionally, an annotation tree component that points to tree element 1306 corresponding to the type of collection to implement.

Figure 14:
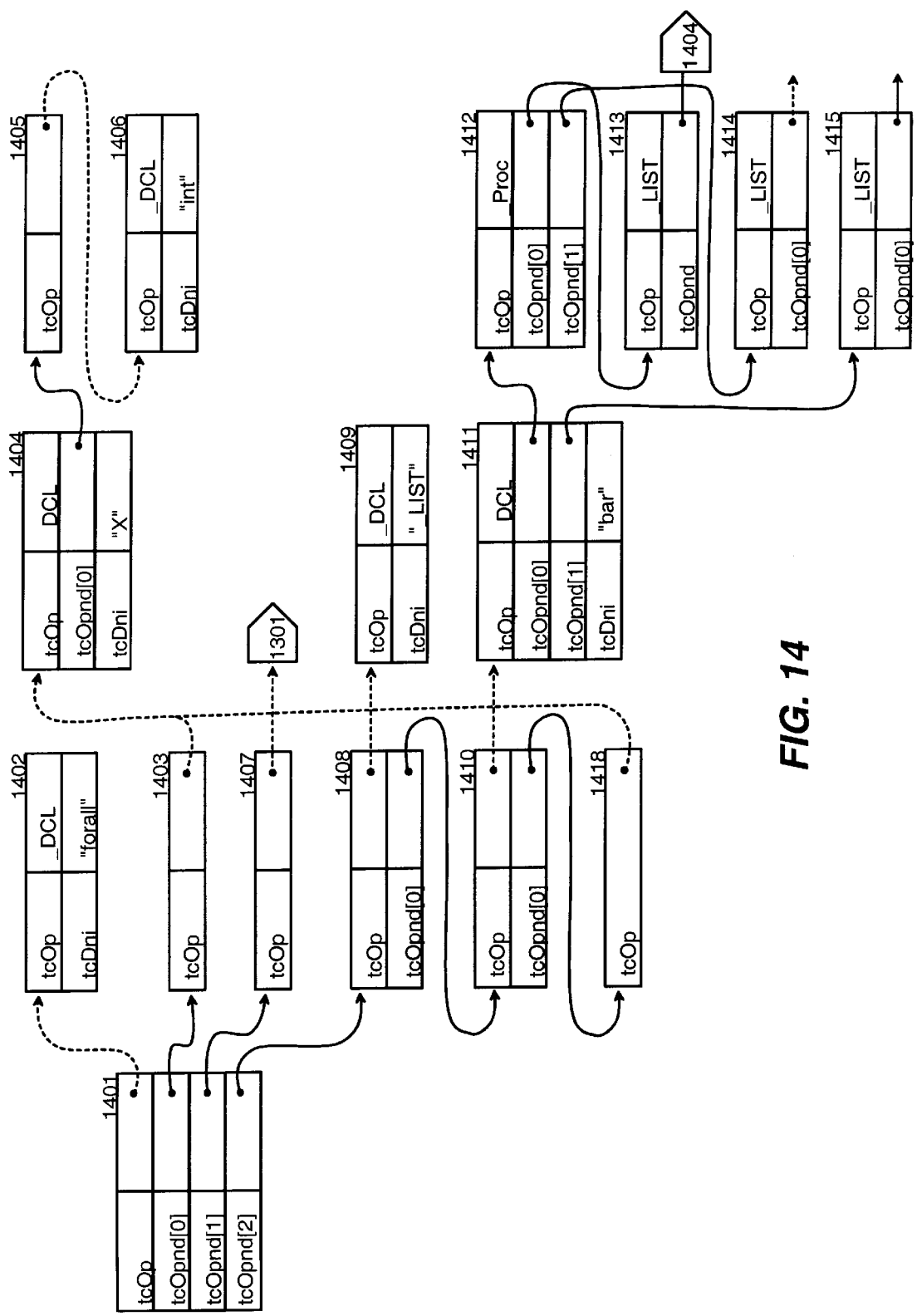
FIG. 14 is a diagram illustrating an IP subtree corresponding to the "forall" statement.

FIG. 14 is a diagram illustrating an IP subtree corresponding to the "forall" statement. The tree element 1401 contains an operator tree component that points to a declaration tree element 1402 for the "forall" statement, and operand tree components that point to the index variable, the collection variable, and the body of the "forall" statement. The first operand tree component points to the tree element 1403, which has an operator tree component that points to the declaration tree element 1404 that declares the index variable "x" to be an integer. The second operand tree component points to tree element 1407, which has an operator tree component that points to the declaration tree element 1301 for the variable "coll." The third operand tree component points to tree element 1408 corresponding to the body of the "forall" statement. The operator tree component of tree element 1408 points to the declaration tree element 1409 for a "List." The operand tree component of tree element 1408 points to tree element 1410 corresponding to the single statement in the body. The tree element 1410, which corresponds to the "bar(x)" statement, contains an operator tree component that points to the declaration tree element 1411 for the function "bar" and contains an operand tree component with an operator tree component that points to tree element 1418. Tree element 1418 corresponds to the actual parameter to be passed to the function "bar." The declaration tree element 1411 has an operator tree component that indicates a declaration, an operand tree component that points to tree element 1412 to indicate that "bar" is declared as a function. Another operand field that points to tree element 1415 that lists the body of the function. The tree element 1413 corresponds to the formal parameters and tree element 1414 corresponds to the return value of the function. The name tree component contains the name of the function.

Figure 15:
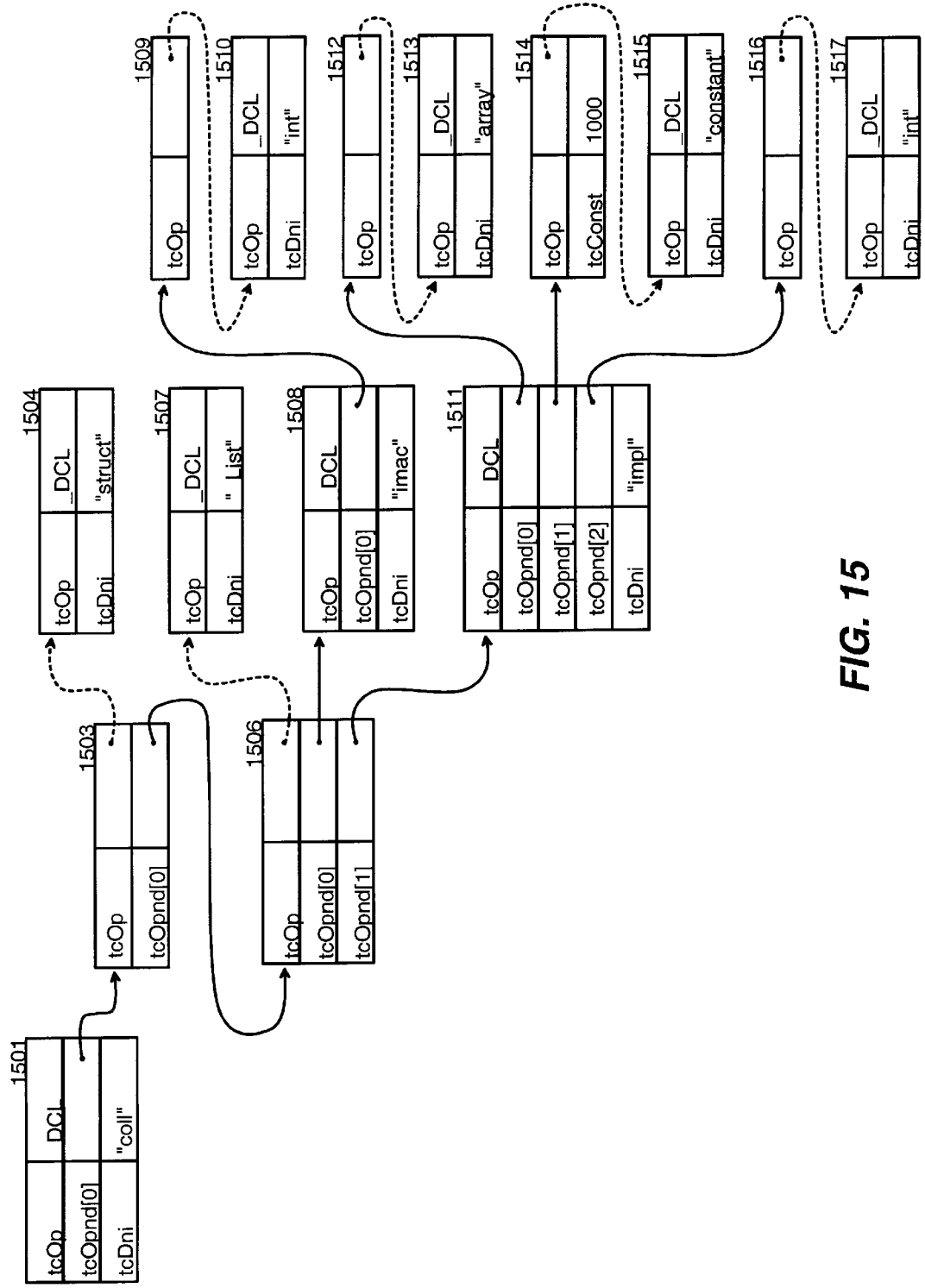
FIG. 15 is a diagram of an RP subtree corresponding to the declaration of the variable "coll."

FIG. 15 is a diagram of an RP subtree corresponding to the declaration of the variable "coll." This RP subtree corresponds to the following C programming language statement.

struct {int iMac; //current number of items used in array int impl[1000]; //collection array}Coil;

The variable "iMac" is used to store the current number of items in the array, and the variable "impl" is the array. Since the declaration for the variable "coll" did not specify the size of the array, as indicated by the empty parentheses after "ArrayCollection" designation, a default size of 1000 is used. A collection could also be implemented as a linked list, rather than an array. With a linked list implementation, the RP subtree for the declaration of the variable "coll" may correspond to the following C programming language statements.

struct {int element node* ptr node}node;

struct {node* head}coll;

The nodes of the linked list would be dynamically allocated and deallocated. Referring to FIG. 15, which shows an RP subtree for an array implementation, the declaration tree element 1501 contains an operator tree component that indicates it is a declaration, an operand tree component that points to the implementation, and a name tree component that contains the name of the variable "coll." The tree element 1503 contains an operator tree component that points to the declaration tree element for a "struct" statement and an operand tree component that points to the tree element 1506 for the body of the "struct" statement. The tree element 1506 contains an operator tree component that points to declaration tree element 1507 that declares the body to be a "list," contains a first operand tree component that points to tree element 1508 corresponding to the first statement in the list, and contains a second operand tree component that points to the tree element 1511 that corresponds to the second statement in the list. The tree element 1508 declares the variable "iMac" to be an integer. The tree element 1511 declares the variable "impr" to be an array of integers of size 1000.

Figure 16A:
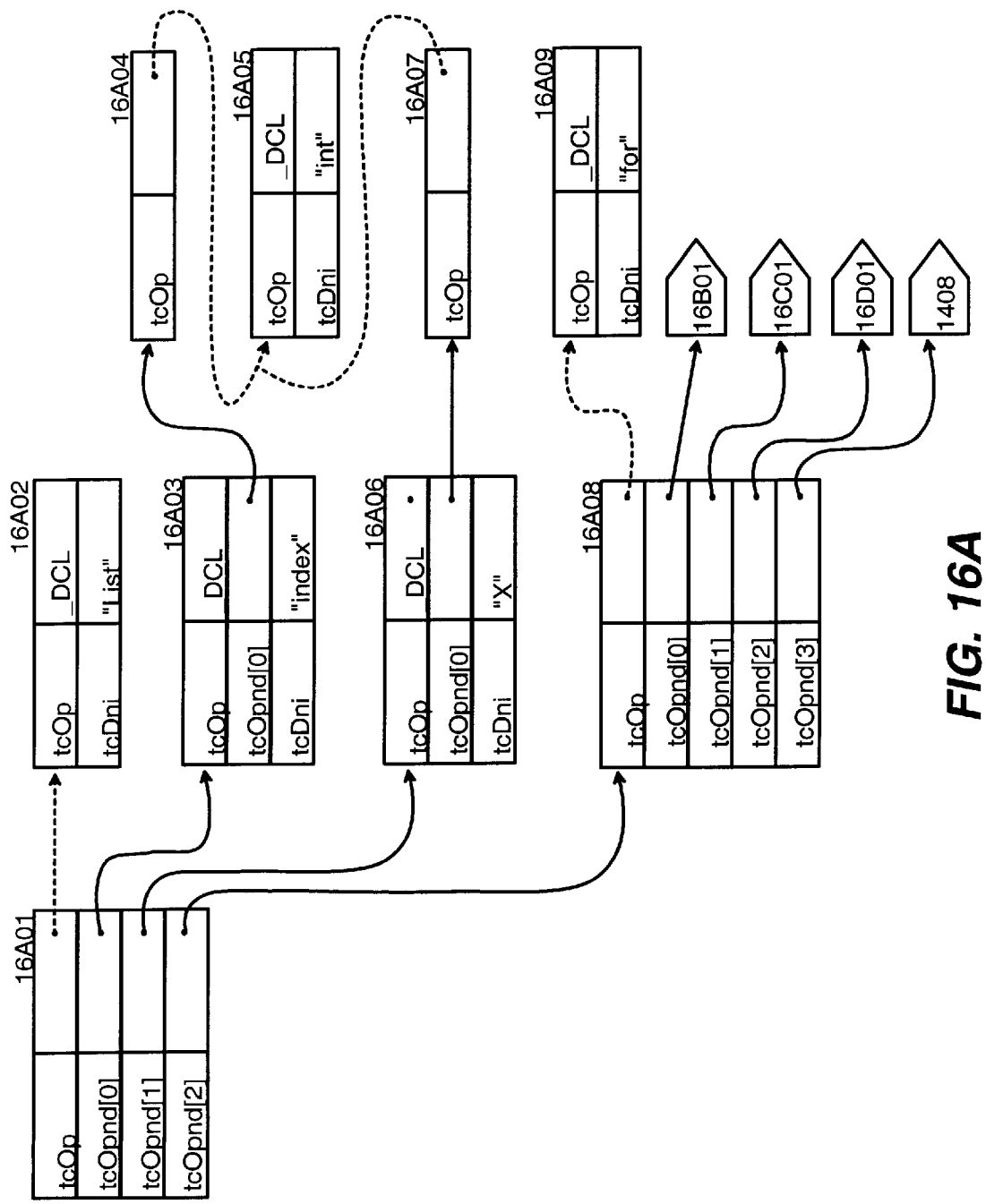
FIGS. 16A–16D are diagrams of the RP subtree for the "forall" statement shown above.

FIGS. 16A–16D are diagrams of the RP subtree for the "forall" statement shown above. The RP subtree represents the following C programming language statements.

int index;
    int x;
    for (index=0, x=coll.impl[0]; index<coll.iMac;
        x=coll.impl[++index])
    {bar(x)};

The C programming language implementation of the "forall" statement defines the temporary variable "index" which is incremented each time through the "for" statement and is an index into the array "coll.impl." The "for" statement is executed while the value of the variable "index" is less than the number of elements in the collection as indicated by the variable "coll.iMac." FIG. 16A is a high-level diagram of the RP subtree for the "forall" statement. Tree element 16A01 contains an operator tree component that points to the declaration tree element 16A02 for a list and contains three operand tree components that point to tree elements 16A03, 16A06, and 16A08 which correspond to statements in the list. The tree element 16A03 corresponds to the statement to declare the variable "index" and integer. The tree element 16A06 corresponds to the statement to declare the variable "x" an integer. The tree element 16A08 corresponds to the RP computational construct "for" that is used to implement the IP computational construct "forall." The operator tree component of tree element 16A08 points to the declaration node for the "for" statement and the operand tree components that point to the initialization expression, conditional expression, loop expression, and body of the "for" statement.

Figure 16B:
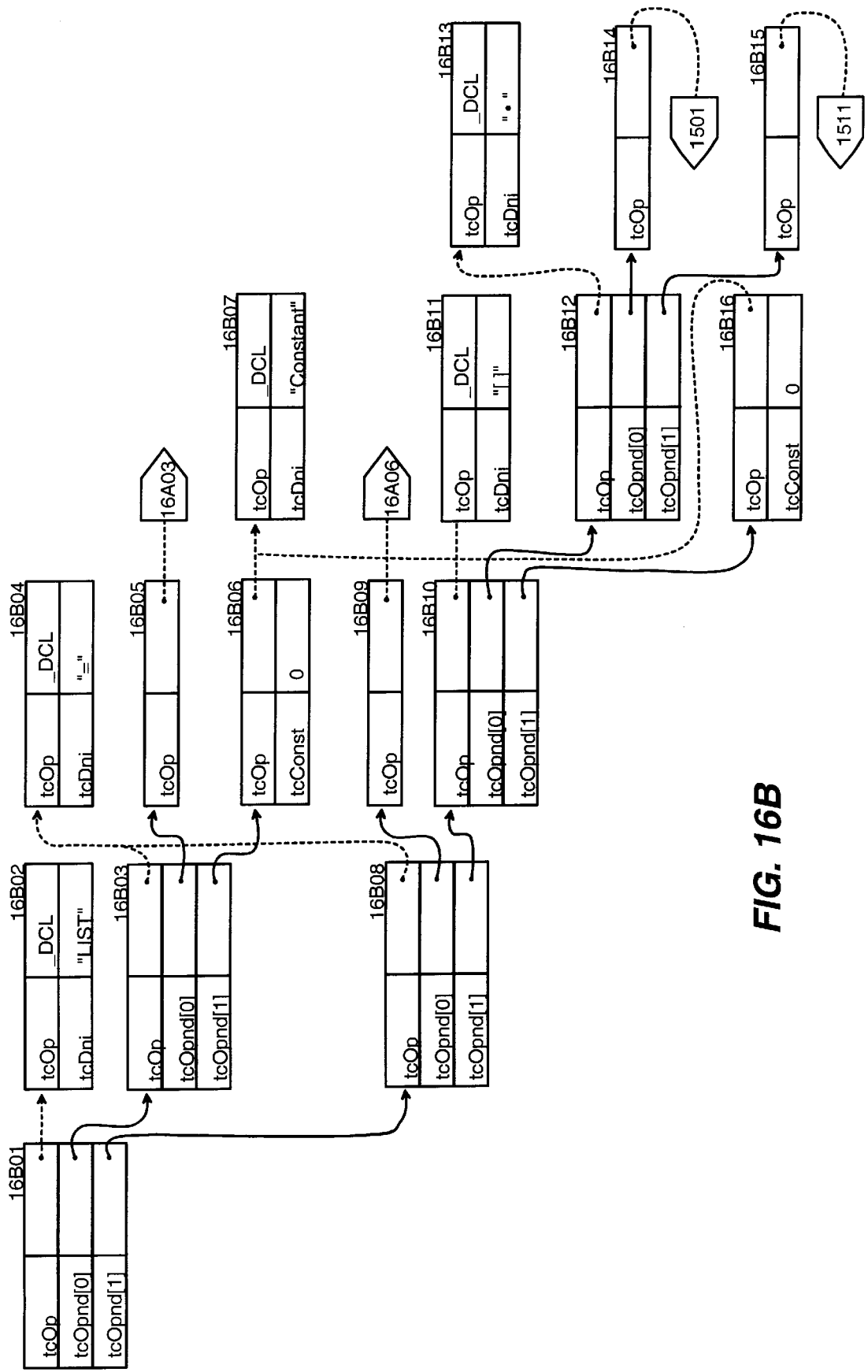
Figure 16C:
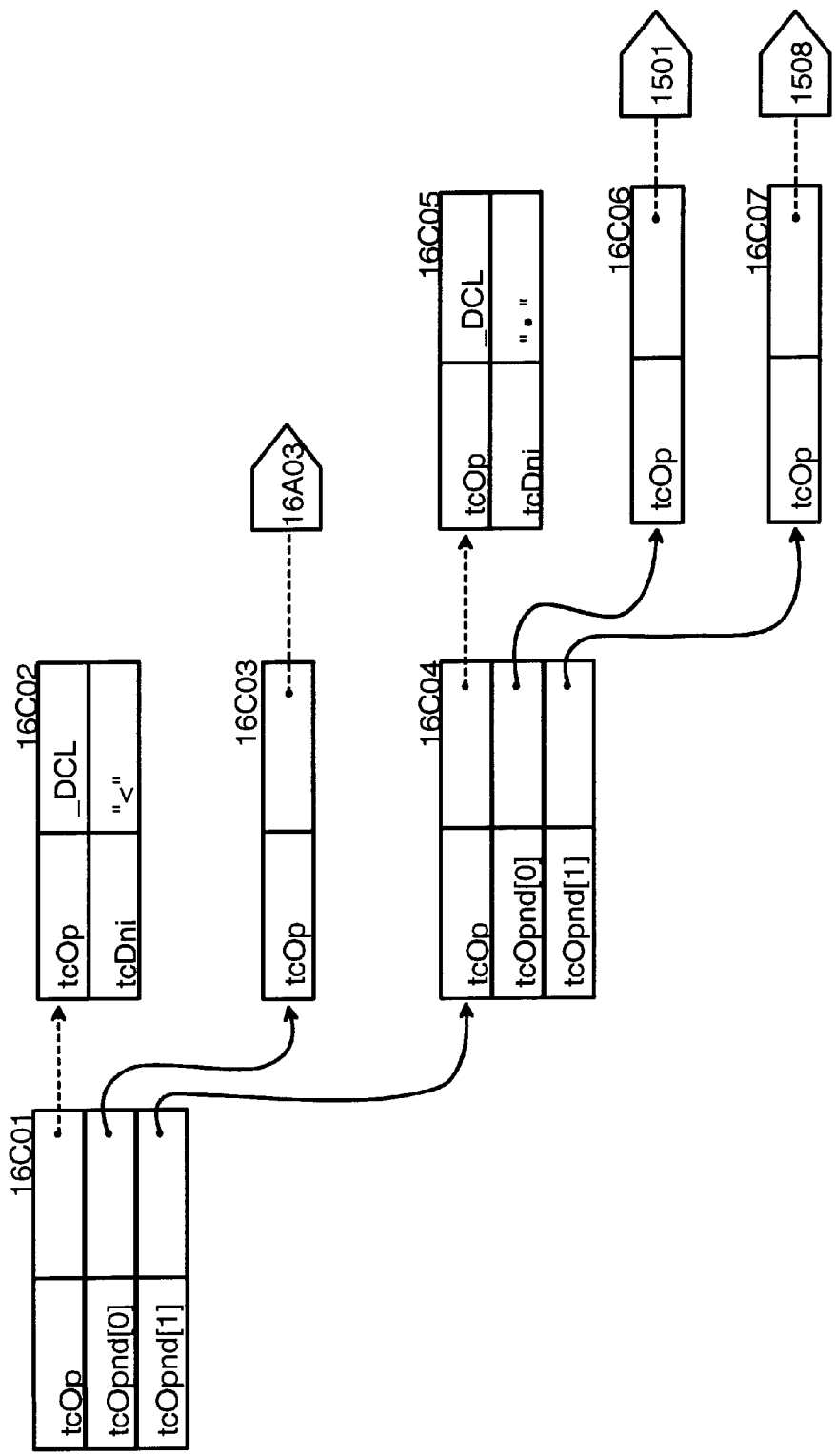

FIG. 16B is a diagram showing the RP subtree for the initialization expression of the "for" statement. The tree element 16B01 contains an operator tree component that indicates a list of statements and contains operand tree components that point to tree elements 16B03 and 16B08 corresponding to the statements in the list. The tree element 16B03 corresponds to the statement "index =0," and contains an operand tree component that points to tree element 16B05 with an operator tree component that points to the declaration tree element 16A03 for the variable "index." The tree element 16B08 corresponds to the statement "x=coll.impl [0]" and contains an operand tree component that points to tree element 16B09 with an operator tree component that points to the declaration tree element 16A06 for the variable "x." The tree element 16B10 corresponds to the indexing of the array "coll.impl." The operator tree component of tree element 16B10 points to the declaration tree component for the indexing of an array. The operand tree component points to tree element 16B12 corresponding to the array. The operator tree component of tree element 16B12 points to a declaration tree element 16B13 that indicates the array is within a "struct." The operand tree components point to the declaration of the "struct" (declaration tree element 1501) and the item within the "struct." FIG. 16C is a diagram showing the RP subtree for the conditional expression of the "for" statement. The tree element 16C01 contains an operator tree component that points to the declaration tree element 16C02 for the "less than" construct, contains an operand tree component that points to the tree element 16C03 for the left operand, and contains an operand tree component that points to the tree element 16C04 for the right operand. The tree element 16C03 contains an operator tree component that points to the declaration tree element 16A03 for the variable "index." The tree element 16C04 contains an operator tree component to the declaration tree element 16C05 for the data member access computational construct, contains an operand tree component to the tree element 16C06 that points to declaration tree element 1501 for the structure, and contains a pointer in the operand to the tree element 16C07 that points to declaration tree element 1508 for the member "iMac."

Figure 16D:
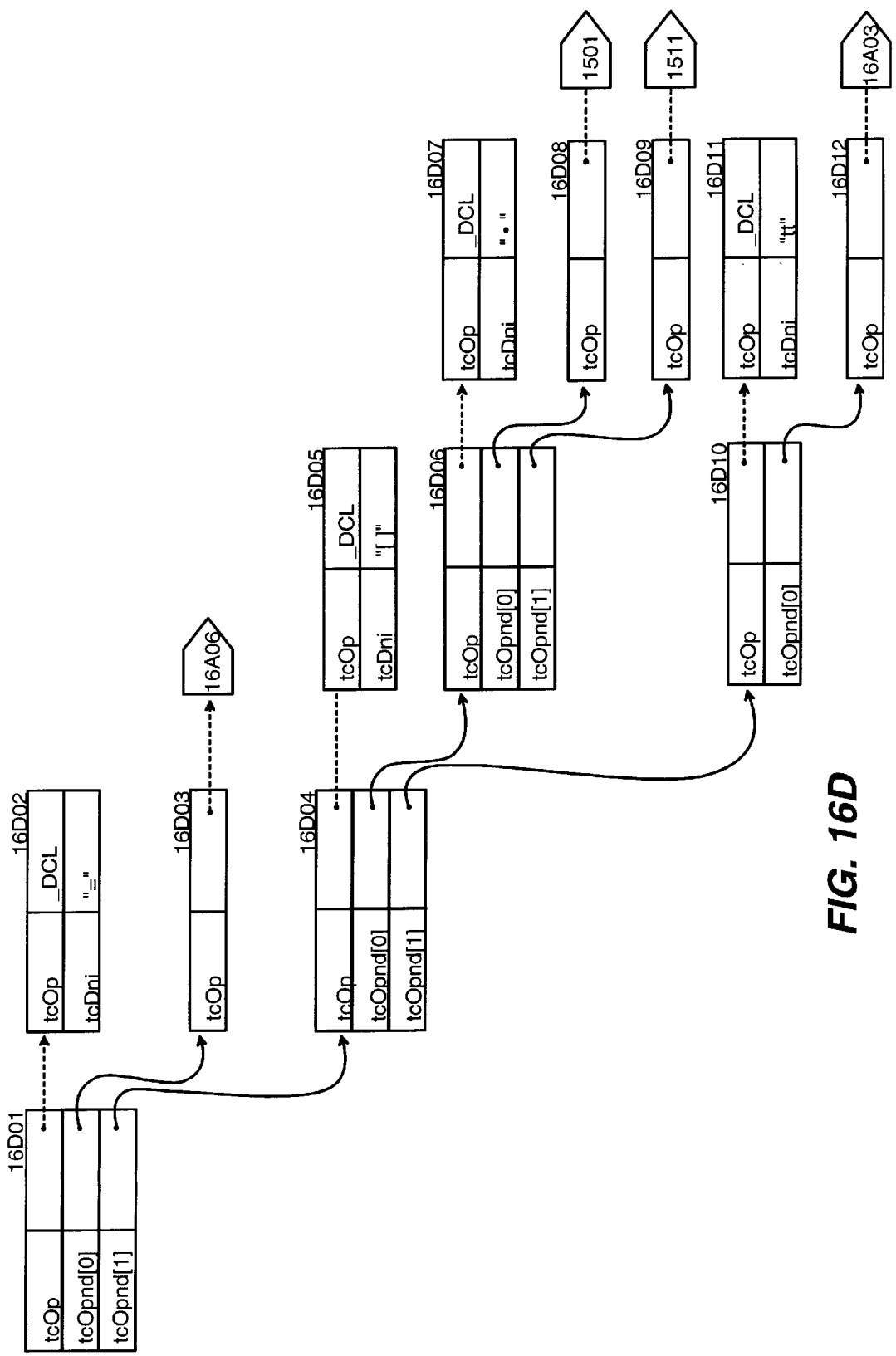

FIG. 16D is a diagram of the subtree for the loop expression of the "for" statement. The tree element 16D01 contains an operator tree component that points to the declaration tree element 16D02 for the "assignment" computational construct, contains an operand tree component that points to tree element 16D03 for the left operand, and contains an operand that points to tree element 16D04 for the right operand. The tree element 16D03 contains an operator tree component that points to the declaration tree element 16A06 for the variable "x." The tree element 16D04 contains an operator tree component that points to the declaration tree element 16D05 for the array indexing construct (i.e., "[]"), contains an operand tree component that points to the tree element 16D06 for the variable "coll.impl" and contains an operand tree component that points to the tree element 16D10 for the increment computational construct and the variable "index."

Code table 7 contains an implementation of a reduction enzyme for the declaration of a variable of the type collection that is implemented as an array.

---

Code Table 7

Enzyme.ArrayCollection
Match(pTE)
    return  (pTE→tcOp==_DCL) &&
              (pTE→tcOpnd[0] →tcOp== reference to the DCL
              of Collection) &&
              (pTE→tcOpnd[0]→tcAnnot→tcOp== reference to the DCL
              of ArrayCollection) &&
              (pTE→tcOpnd[0]→tcAnnot→tcOpnd[0]==NIL))
Xform(pTE)
    pTE1=new(TE)
    pTE1→tcOp= reference to the DCL of struct
    pTE1→tcOpnd[0]=pTE2=new(TE)
        pTE2→tcOp= reference to the DCL of_List
        pTE2→tcOpnd[0]=pTE3=new(TE)
            pTE3→tcOp=_DCL
            pTE3→tcDni="iMac"
            pTE3→tcOpnd[0]=pTE4=new(TE)
                pTE4→tcOp= reference to the DCL of int
        pTE2→tcOpnd[1]=pTE5=new(TE)
            pTE5→tcOp=_DCL
            pTE5→tcDni="imp1"
            pTE5→tcOpnd[0]=pTE6=new(TE)
                pTE6→tcOp= reference to the DCL of _RG
                pTE6→tcOpnd[0]=pTE7=new(TE)
                    pTE7→tcOp= reference to the DCL of int
                pTE6→tcOpnd[1]=pTE8=new(TE)
                    pTE8→tcOp= reference to the DCL
                    of_CConstant
                    pTE8→tcConst=1000
    pTE→tcOpnd[0]=pTE1
    Return results of processTE(pTE)

---

Figure 17:
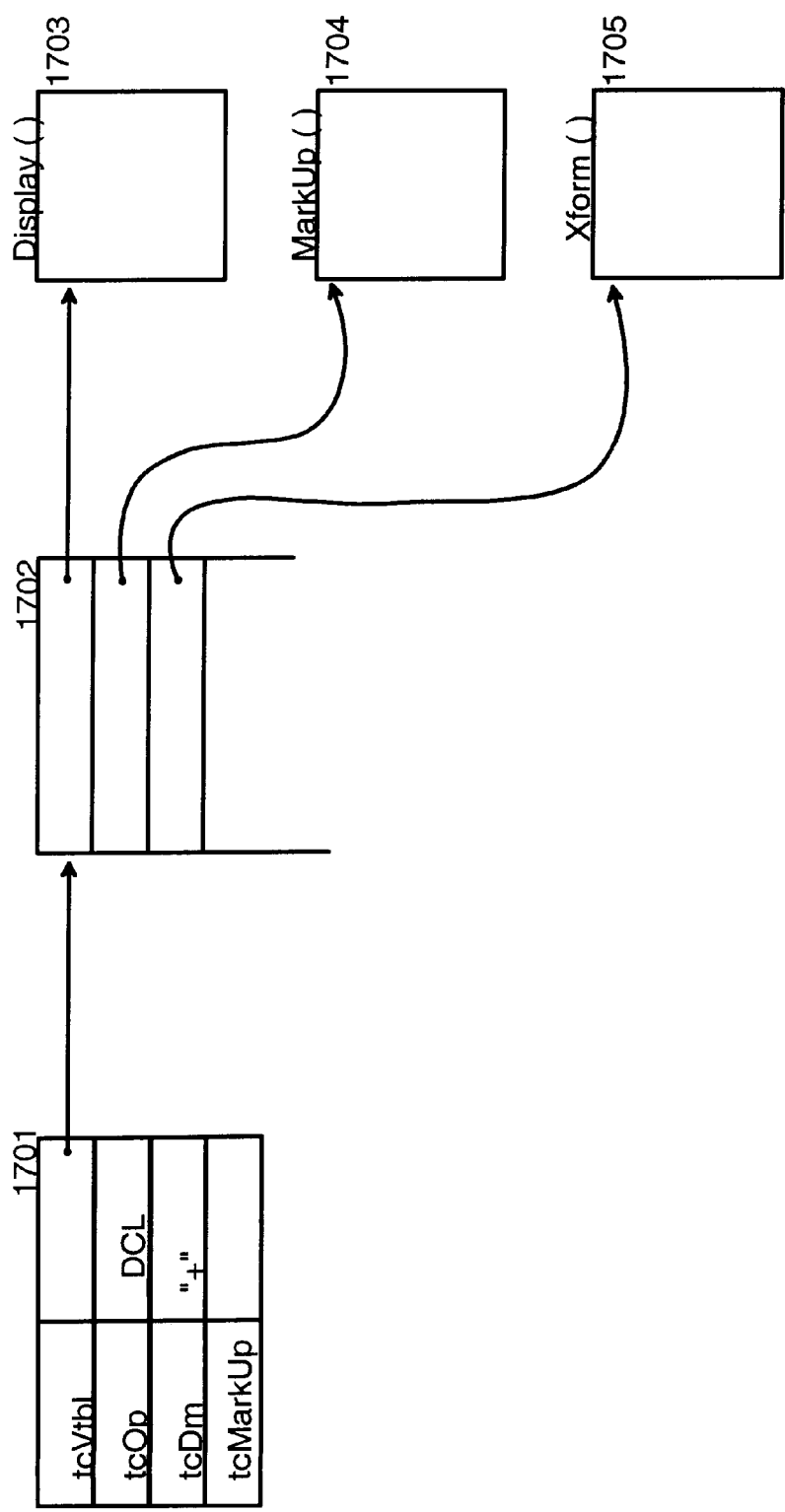
FIG. 17 is a block diagram illustrating a declaration tree element.

In an alternate embodiment, the declaration of each IP computational construct has a function table that contains a list of pointers to enzymes associated with the IP computational construct. When processing an IP tree, these enzymes are invoked to process tree elements with operator tree components that point to the declaration tree element for the computational construct. FIG. 17 is a block diagram illustrating a declaration tree element. Declaration tree element 1701 for the "addition" IP computational construct contains a tree component ("tcVtbl") that points to a function table 1702. Each entry in the function table contains a pointer to a function that implements an enzyme for processing tree elements whose operator tree component points to the declaration tree element 1701. The Display function 1703 controls the displaying of tree elements whose operator tree component points to the declaration tree element 1701. The MarkUp function 1704 and the Xform function 1705 control the marking and transforming (reducing) of tree elements whose operator tree component points to the declaration tree element 1701.

This alternate embodiment corresponds to the use of object-oriented programming techniques, such as, a virtual function table. Each IP computational construct has virtual functions for controlling processing. Code Table 8 contains pseudo-code illustrating functions for displaying (display enzymes) tree elements.

Code Table 8

```
DisplayTE(pTE)
    pTE→tcOp→Display(pTE)
+.Display(pTE)
    DisplayTE (pTE→tcOpnd[0])
    Output("+")
    DisplayTE (pTE→tcOpnd[1])
forall.Display(pTE)
    DisplayTE (pTE→tcOpnd[0])
    DisplayTE (pTE→tcOpnd[1])
    DisplayTE (pTE→tcOpnd[2])
=.Display(pTE)
    DisplayTE(pTE→tcOpnd[0])
    Output "="
    DisplayTE(pTE→tcOpnd[1])
List.Display(pTE)
    for each tcOpnd i
        DisplayTE(pTE→tcOpnd[i])
```

An IP tree is displayed by invoking the function DisplayTE passing a pointer to the root tree element. The function DisplayTE invokes the function Display associated with the declaration tree element that is pointed to by the operator tree component of the root tree element. The function Display controls creating the display for the IP computational construct declared by the declaration tree element. The function "+.Display" controls the displaying of an IP subtree when the root tree element of the IP subtree contains an operator tree component for the addition operator. This function display invokes the function DisplayTE to display the left operand, outputs a "+," and then invokes the function DisplayTE to display the right operand. This function "+.Display" controls the displaying of the operator in an "infix" format. Code Table 9 contains pseudo-code corresponding to the "+.Display" function that uses a "prefix" format.

Code Table 9

```
+. Display
    Output("Add(")
    DisplayTE(pTE→tcOpnd[0])
    Output(",")
    DisplayTE(pTE→tcOpnd[i])
    Output(")")
```

In this alternate embodiment, analogous functions are used to control the markup and transforming (reduction) phases. During transformation, the function Xform is invoked to effect the transformation of an IP subtree to an RP subtree.

Although the present invention has been described in terms of a preferred embodiment, it is not intended that the invention be limited to these embodiments. Modifications within the spirit of the invention will be apparent to those skilled in the art. The scope of the present invention is defined by the claims that follow.

What is claimed is:

1. A method in a computer system for specifying a new computational construct for use in defining a computer program, comprising:

providing a display enzyme for each of a plurality of computational constructs, each display enzyme for displaying a representation of the computational construct;

when displaying a computer program represented by an intentional program tree;

for each computational construct represented by a node in the intentional program tree;

identifying a display enzyme for the computational construct from among the provided display enzymes; and invoking the identified display enzyme passing a reference to the node wherein the identified display enzyme displays a representation of the computational construct represented by the passed node; and adding a new display enzyme for the new computational construct to the provided display enzymes so that the new computational construct can be specified in another computer program and wherein previously defined computer programs can be displayed without conflict with the new computational construct.

2. The method of claim 1 wherein the identifying includes searching the provided display enzymes for a display enzyme for the computational construct represented by the node.

3. The method of claim 2 wherein the searching includes invoking a matching function associated with a display enzyme passing a reference to the node wherein the matching function returns an indication whether the associated display enzyme is for the computation construct represented by the node.

4. The method of claim 2 wherein each node contains a reference to a display enzyme for the computational construct represented by the node.

5. The method of claim 4 wherein the reference is an indirect reference through a declaration node corresponding to the computational construct.

6. The method of claim 1 wherein each computational construct has a plurality of display enzymes and wherein the identifying includes selecting one of the plurality of display enzymes for the computational construct.

7. A method in a computer system for displaying a computer program represented by an intentional program tree, the method comprising:

providing a display enzyme for each of a plurality of computational constructs, each display enzyme for displaying a representation of the computational construct; and for each computational construct represented by a node in the intentional program tree;

identifying a display enzyme for the computational construct from among the provided display enzymes; and when such a display enzyme is found, invoking the identified display enzyme passing a reference to the node wherein the identified display enzyme displays of a representation of the computational construct represented by the passed node.

8. The method of claim 7 wherein the identifying includes searching the provided display enzymes for a display enzyme for the computational construct represented by the node.

9. The method of claim 8 wherein the searching includes invoking a matching function associated with a display enzyme passing a reference to the node wherein the matching function returns an indication whether the associated display enzyme is for the computational construct represented by the node.

10. The method of claim 8 wherein each node contains a reference to a display enzyme for the computational construct represented by the node.

11. The method of claim 10 wherein the reference is an indirect reference through a declaration node corresponding to the computational construct.

12. The method of claim 7 wherein each computational construct has a plurality of display enzymes and wherein the identifying includes selecting one of the plurality of display enzymes for the computational construct.

13. A method in a computer system for displaying a representation of a computer program, the computer system having a memory, a display device, and an input device, the method comprising:

receiving, through the input device, data representing a plurality of nodes for a program tree, the program tree being a representation of the computer program, each node having one of a plurality of node types, the nodes of the program tree specifying operators and operands of the computer program;

storing the received data representing the nodes in the memory in a program tree structure;

retrieving an indication of one of a plurality of display representation formats for displaying a representation of the program tree based on the stored data, each display representation format having a display representation for each of the plurality of node types, each display representation being a visual indication of the node type;

generating a display representation of the program tree in accordance with the retrieved indication of the display representation format, the generated display representation including the visual indication of the node type of each node in the program tree; and displaying the generated display representation on the display device.

14. The method of claim 13 wherein each node has an associated display enzyme for displaying a representation of the node, and wherein the step of generating a display representation includes retrieving data representing the nodes of the program tree from the program tree structure; and invoking the display enzyme associated with the retrieved node to generate a display representation of the retrieved node.

15. The method of claim 13 wherein the generating includes invoking a display enzyme associated with a node of the program tree to generate a display representation for the node.

16. The method of claim 15 wherein the display enzyme generates a graphics-based representation of the node.

17. The method of claim 15 wherein the display enzyme generates a bitmapped representation of the node.

18. The method of claim 15 wherein the display enzyme generates an iconic representation of the node.

19. The method of claim 13 wherein the nodes include declaration nodes corresponding to definitions and nodes in the program tree structure contain references to corresponding declaration nodes.

20. The method of claim 19 wherein a declaration node has a corresponding display enzyme for generating a display representation for a node that contains a reference to the declaration node and wherein the generating of a display representation for the node containing the reference invokes the display enzyme corresponding to the declaration node referenced by the node.

21. The method of claim 20 wherein the declaration node contains a resettable display attribute and wherein the corresponding display enzyme generates a display representation based on the setting of the display attribute.

22. A method in a computer system for displaying a computer program generated by direct manipulation of a program tree so that new computational constructs can be defined, the method comprising:

receiving data representing a plurality of nodes of a program tree representing the computer program, the received data representing operations and operands that comprise the computer program;

storing the received data representing the plurality of nodes within a program tree data structure of the computer system, the nodes of the program tree data structure forming a tree data structure containing the specification of the computer program;

generating a display representation of the computer program in a display representation format from the data stored in the program tree data structure by invoking display enzymes based on the operations and operands of the nodes; and displaying the generated display representation on a display device of the computer system.

23. The method of claim 22 including selecting one of a plurality of display representation formats for use in generating the display representation.

24. The method of claim 23 including selecting a second one of the plurality of display representation formats; and generating a second display representation of the computer program from the data stored in the program tree data structure in the second selected display representation format by invoking display enzymes based on the operations and operands of the nodes.

25. The method of claim 23 wherein the program tree has a plurality of subtrees, wherein the generating includes:

traversing a subtree of the program tree data structure by visiting each node of the subtree, each node of the subtree having a display representation for each of the plurality of display representation formats; and for each visited node, inserting the display representation of the visited node corresponding to the selected display representation format into a display representation of the computer program at a position corresponding to the position of the visited node in the subtree.

26. The method of claim 22 wherein the receiving includes:

positioning an insertion point within the program tree; and wherein the storing of the received data includes inserting a node into the program tree data structure at a position corresponding to the positioned insertion point.

27. The method of claim 26, further including receiving an insertion point positioning instruction from a user of the computer system, and wherein the positioning positions in response to the receiving of an insertion point positioning instruction.

28. The method of claim 27 wherein receiving an insertion point positioning instruction includes receiving an absolute insertion point positioning instruction.

29. The method of claim 26 wherein receiving an insertion point positioning instruction includes receiving an insertion point positioning instruction chosen from a menu by the user.

30. The method of claim 26 wherein each node of the program tree is of one of a plurality of types, further including receiving an insert node instruction specifying the type of node to insert, and wherein the inserting inserts a new node of the type specified in the received insert node instruction.

31. The method of claim 30 wherein the receiving of an insert node instruction specifying the type of node to insert includes receiving an insert node instruction specifying the type of node chosen from a menu by the user.

32. The method of claim 26, further including inserting a placeholder node into the program tree to reserve a place for a required child node of the inserted node.

33. The method of claim 32, further including repositioning the insertion point at the placeholder node.

34. A method in a computer system for displaying a representation of a program tree when modifying a program tree in a way that allows new computational constructs to be defined, the program tree representing a computer program, the program tree having nodes describing elements of the computer program, a representation of the program tree being stored in a program tree data structure in memory of the computer system, the method comprising:

retrieving the nodes of the program tree from the program tree data structure for generating a display representation of the program tree based on the retrieved nodes;

displaying the display representation of the program tree on a display device;

selecting a displayed representation of a node of the program tree to effect the selection of the node as a currently selected node;

receiving from a user of the computer system a location of an insertion point relative to the displayed representation of the currently selected node;

positioning the insertion point at the received location;

receiving from the user a computational construct to insert into the program tree;

creating a node corresponding to the received computational construct;

inserting the created node into the program tree data structure at a point corresponding to the insertion point; and re-displaying the display representation of the program tree with the inserted node on the display device.

35. The method of claim 34 wherein the receiving from a user of a location of an insertion point includes receiving an indication that the location is above the currently selected node.

36. The method of claim 35 wherein the inserting of the created node inserts the node such that the currently selected node is a child node of the created node.

37. The method of claim 36 wherein the inserting of the created node inserts the node such that the currently selected node is a left child node of the created node.

38. The method of claim 36 wherein the inserting of the created node inserts the node such that the currently selected node is a right child node of the created node.

39. A method in a computer system of displaying selected portions of a program tree so that new computational constructs can be defined, the program tree representing a computer program, the computer program having a plurality of computational constructs, the program tree having nodes describing each computational construct of the computer program, the program tree being stored in a program tree data structure in memory of the computer system, the method comprising:

selecting a node as a currently selected node;

receiving from a user of the computer system an indication to select a subtree of the program tree with the currently selected node as the root of the subtree;

selecting the subtree of the currently selected node as the selected portion of the program tree;

generating and displaying a display representation of the program tree from the nodes of the program tree stored in the program tree data structure, the display representation being generated by invoking display enzymes for the nodes of the program tree; and highlighting the display representation corresponding to the selected subtree.

40. A method in a computer system for displaying representations of computer programs so that a new computational construct can be added to a current set of computational constructs without affecting the computer programs that are already represented, each computer program having a plurality of computational constructs from the current set of computational constructs, the method comprising:

for each computer program;

storing the computer program in a program tree data structure having a plurality of nodes, each node corresponding to a computational construct of the computer program and having a reference to any node corresponding to an operand of the computational construct;

modifying the computer program by directly manipulating the nodes of a program tree data structure;

displaying the computer program by retrieving the nodes of the program tree data structure, generating a display representation corresponding to the computational construct of each retrieved node, and displaying the generated display representations; and generating object code for the computer program by retrieving the nodes of the program tree data structure and generating code corresponding to the computational constructs of the retrieved nodes wherein when the new computational construct is added to the current set of computational constructs, the object code of each computer program can be regenerated without modification to the program tree data structure of the computer program.

41. A computer-readable medium containing instructions for causing a computer system to specify a new computational construct for use in defining a computer program, the computer system having a display enzyme for each of a plurality of computational constructs, each display enzyme for displaying a representation of the computational construct, by:

when displaying a computer program represented by program tree, for each computational construct represented by a node in the program tree, identifying a display enzyme for the computational construct from among the display enzymes; and invoking the identified display enzyme passing a reference to the node wherein the identified display enzyme displays of a representation of the computational construct represented by the passed node; and adding a new display enzyme for the new computational construct to the display enzymes so that the new computational construct can be specified in another computer program and wherein previously defined computer programs can be displayed without conflict with the new computational construct.

42. The computer-readable medium of claim 41 wherein the identifying includes searching the display enzymes for a display enzyme for the computational construct represented by the node.

43. The computer-readable medium of claim 42 wherein the searching includes invoking a matching function associated with a display enzyme passing a reference to the node wherein the matching function returns an indication whether the associated display enzyme is for the computational construct represented by the node.

44. The computer-readable medium of claim 42 wherein each node contains a reference to a display enzyme for the computational construct represented by the node.

45. The computer-readable medium of claim 44 wherein the reference is an indirect reference through a declaration node corresponding to the computational construct.

46. The computer-readable medium of claim 41 wherein each computational construct has a plurality of display enzymes and wherein the identifying includes selecting one of the plurality of display enzymes for the computational construct.

47. A computer-readable medium containing instructions for causing a computer system to display a computer program represented by a program tree, the computer system having a display enzyme for each of a plurality of computational constructs, each display enzyme for displaying a representation of the computational construct; and for each computational construct represented by a node in the program tree,
searching for a display enzyme for the computational construct from among the provided display enzymes; and
when such a display enzyme is found, invoking the identified display enzyme passing a reference to the node wherein the identified display enzyme displays of a representation of the computational construct represented by the passed node.

48. The computer-readable medium of claim 47 wherein the identifying includes searching the provided display enzymes for a display enzyme for the computational construct represented by the node.

49. The computer-readable medium of claim 48 wherein the searching includes invoking a matching function associated with a display enzyme passing a reference.

50. The computer-readable medium of claim 48 wherein each node contains a reference to a display enzyme for the computational construct represented by the node.

51. The computer-readable medium of claim 50 wherein the reference is an indirect reference through a declaration node corresponding to the computational construct.

52. The computer-readable medium of claim 47 wherein each computational construct has a plurality of display enzymes and wherein the identifying includes selecting one of the plurality of display enzymes for the computational construct.

53. A method in a computer system for specifying a new computational construct for use in defining a computer program, comprising:

providing a display enzyme for each of a plurality of computational constructs;

identifying a display enzyme for each computational construct from among the provided display enzymes; and invoking the identified display enzyme to display a representation of the computational construct.

54. The method of claim 53 and further comprising adding a new display enzyme for a new computational construct for a further computer program such that the previously provided computational constructs can be displayed without conflict with the new computational construct.

55. A method in a computer system for displaying a representation of a computer program, the computer system having a memory, a display device, and an input device, the method comprising:

receiving, through the input device, data representing a plurality of nodes for a program tree wherein the nodes of the program tree specify operators and operands of the computer program;

storing the received data representing the nodes in the memory in a program tree structure;

retrieving an indication of one of a plurality of display representation formats for displaying a representation of the program tree based on the stored data;

generating a display representation of the program tree in accordance with the retrieved indication of the display representation format; and displaying the generated display representation on the display device.

56. A method in a computer system for displaying a representation of a computer program, the computer system having a memory, a display device, and an input device, the method comprising:

receiving, through the input device, data representing a plurality of nodes for an intentional program tree wherein the nodes of the program tree specify operators and operands of the computer program;

storing the received data representing the nodes in the memory in an intentional program tree structure;

retrieving an indication of one of a plurality of display representation formats for displaying a representation of the intentional program tree based on the stored data;

generating a display representation of the intentional program tree in accordance with the retrieved indication of the display representation format; and displaying the generated display representation on the display device.

57. A computer readable medium having instructions stored thereon for causing a computer to implement a method for specifying a new computational construct for use in defining a computer program, comprising:

providing a display enzyme for each of a plurality of computational constructs;

identifying a display enzyme for each computational construct from among the provided display enzymes; and invoking the identified display enzyme to display a representation of the computational construct.

58. The computer readable medium of claim 57 and further comprising instructions for adding a new display enzyme for a new computational construct for a further computer program such that the previously provided computational constructs can be displayed without conflict with the new computational construct.

59. A computer readable medium having instructions stored thereon for causing a computer to implement a method for displaying a representation of a computer program, the computer system having a memory, a display device, and an input device, the method comprising:
- receiving, through the input device, data representing a plurality of nodes for a program tree wherein the nodes of the program tree specify operators and operands of the computer program;
- storing the received data representing the nodes in the memory in a program tree structure;
- retrieving an indication of one of a plurality of display representation formats for displaying a representation of the program tree based on the stored data;
- generating a display representation of the program tree in accordance with the retrieved indication of the display representation format; and
- displaying the generated display representation on the display device.

60. A computer readable medium having instructions stored thereon for causing a computer to implement a method for displaying a representation of a computer program, the computer system having a memory, a display device, and an input device, the method comprising:
- receiving, through the input device, data representing a plurality of nodes for an intentional program tree wherein the nodes of the program tree specify operators and operands of the computer program;
- storing the received data representing the nodes in the memory in an intentional program tree structure;
- retrieving an indication of one of a plurality of display representation formats for displaying a representation of the intentional program tree based on the stored data;
- generating a display representation of the intentional program tree in accordance with the retrieved indication of the display representation format; and
- displaying the generated display representation on the display device.

61. A system for specifying a new computational construct for use in defining a computer program, comprising:
- means for providing a display enzyme for each of a plurality of computational constructs;
- means for identifying a display enzyme for each computational construct from among the provided display enzymes; and
- means for invoking the identified display enzyme to display a representation of the computational construct.

62. A system for displaying a representation of a computer program, the computer system having a memory, a display device, and an input device, the system comprising:
- means for receiving, through the input device, data representing a plurality of nodes for a program tree wherein the nodes of the program tree specify operators and operands of the computer program;
- means for storing the received data representing the nodes in the memory in a program tree structure;
- means for retrieving an indication of one of a plurality of display representation formats for displaying a representation of the program tree based on the stored data;
- means for generating a display representation of the program tree in accordance with the retrieved indication of the display representation format; and
- means for displaying the generated display representation on the display device.

63. A system for displaying a representation of a computer program, the computer system having a memory, a display device, and an input device, the system comprising:
- means for receiving, through the input device, data representing a plurality of nodes for an intentional program tree wherein the nodes of the program tree specify operators and operands of the computer program;
- means for storing the received data representing the nodes in the memory in an intentional program tree structure;
- means for retrieving an indication of one of a plurality of display representation formats for displaying a representation of the intentional program tree based on the stored data;
- means for generating a display representation of the intentional program tree in accordance with the retrieved indication of the display representation format; and
- means for displaying the generated display representation on the display device.

64. A method in a computer system for specifying a new computational construct for use in defining a computer program by using multiple computational constructs, the method comprising:
- providing a plurality of display enzymes for a plurality of computational constructs, each display enzyme for displaying a representation of one of the computational constructs;
- identifying a display enzyme for each computational construct from the plurality of display enzymes;
- invoking the identified display enzyme to display a representation of each computational construct forming the computer program; and
- adding a new display enzyme to the plurality of display enzymes for the new computational construct.

* * * * *